United States Patent [19]
Taylor et al.

[11] Patent Number: 6,034,687
[45] Date of Patent: *Mar. 7, 2000

[54] GRAPHICAL INTERFACE FOR A COMPUTER HARDWARE RESOURCE HAVING A SURREALISTIC IMAGE OF A REAL OFFICE MACHINE

[75] Inventors: Billy P. Taylor, Houston; Mary P. Czerwinski, The Woodlands; Willie Lawson Schoggins, III, Spring; Young Howard Lee, Houston, all of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/450,732

[22] Filed: May 26, 1995

Related U.S. Application Data

[63] Continuation of application No. 08/303,627, Sep. 9, 1994.

[51] Int. Cl.[7] ........................................... G06F 3/14
[52] U.S. Cl. ............................................... 345/351
[58] Field of Search .................................... 395/700, 650, 395/682, 680, 683, 326, 330, 334, 348, 349, 358; 345/473, 349, 348, 351, 335

[56] References Cited

U.S. PATENT DOCUMENTS

| | | |
|---|---|---|
| 5,283,856 | 2/1994 | Gross et al. . |
| 5,327,558 | 7/1994 | Burke et al. . |
| 5,347,628 | 9/1994 | Brewer et al. ........................... 345/351 |
| 5,423,000 | 6/1995 | Kimura et al. . |
| 5,455,854 | 10/1995 | Dilts et al. ............................... 379/201 |
| 5,596,694 | 1/1997 | Capps ...................................... 395/152 |
| 5,684,970 | 11/1997 | Asuma et al. ........................... 345/348 |

FOREIGN PATENT DOCUMENTS

| | | |
|---|---|---|
| 0 444 251 A3 | 9/1991 | European Pat. Off. . |
| 2 276 520 | 9/1994 | United Kingdom . |

OTHER PUBLICATIONS

Clark, "How a Woman's Passion and persistence Made [Bob]", *The Wall Street Journal*, Section B, Tuesday, Jan. 10, 1995.

"New program opens doors into Windows", undated article about Packard Bell's Navigator package.

BusinessWire Bulletin Board article entitled "Packard Bell delivers first all–in–one software program that entertains, organizes, troubleshoots: breakthrough Windows shell defines user–friendly", Mar. 8, 1994, NOTE: Best available copy.

(List continued on next page.)

*Primary Examiner*—Thomas M. Heckler
*Attorney, Agent, or Firm*—Conley, Rose & Tayon, P.C.; Michael F. Heim; Jonathan M. Harris

[57] ABSTRACT

A method for controlling flow, through a computer hardware resource, of information to and from computer applications. When a flow of information is initiated from one of the applications, a determination is made whether the resource is being accessed by another one of the applications and, if so, the flow of information from the first application is delayed. If not, then the flow of information is enabled. When a flow of information is initiated toward the applications, a determination is made to which one of the applications the information is flowing, and the flow is directed to that one application. A graphical interface associates, in the mind of a user, a computer hardware resource with a corresponding real office device, the computer resource enabling the computer to function like the consumer device. The graphical interface includes a surrealistic image having physical features which represent functional components of the resource, the physical features of the image resembling corresponding features of the office device; and an animation routine which causes the image to change when the user selects one of the features of the image, thereby invoking the change occurring in a manner which resembles changes to the office device when the corresponding feature of the office device is invoked.

6 Claims, 52 Drawing Sheets

OTHER PUBLICATIONS

Katsuyama et al., "Multimedia [Paper] Services/Human Interfaces and Multimedia Communication Workstation for Broadband ISDN Environments", IEICE Transactions on Communications, vol. E76–B, No.3, Mar. 1993, Tokyo, Japan, pp. 220–228.

McNinch, "Screen–Based Telephony", IEEE Communications Magazine, vol. 28, No. 4, Apr. 1990, pp. 34–38.

Yvon, "Intelligent Telecommunication Services: Adaptive And Demonstrational User Interfaces", Proceedings of the Third Golden West International conference On Intelligent Systems, vol. 2, Jun. 6–8, 1994, Las Vegas, Nevada, pp. 691–698.

Hirsch et al., "ProgREDSI: A Communications Manager", SuperCOMM/ICC '92; Discovering A New World of Communications, vol. 4, Jun. 14–18, 1992, pp. 1898–1902.

Foulks, "Best Voice Forward", PC World, vol. 11, No. 12, Dec. 1993, pp. 290–291.

Kalimantzalis et al., "PC–Phone: Adding special telephone secretary functions to a PC", 6th Meiterranean Electrotechnical Conference Proceedings, vol. 1, May 22–24, 1991, pp. 530–533.

| CONTROL | TYPE | ACTION |
|---|---|---|
| 1. DO YOU WANT TO HERE THE TELEPHONE RING? | YES/NO | DECIDES WHETHER THE OPERATOR WILL PRODUCE AN AUDIBLE RING WHEN THE PHONE RINGS. DEFAULT – YES |
| 2. HOW LOUD? | LISTBOX | DETERMINES THE AUDIBLE RING VOLUME. CHOICES ARE LOW, MEDIUM AND HIGH. DEFAULT – MEDIUM |
| 3. CHANGE RING | BUTTON | LETS THE USER CHOOSE THE SOUND THAT IS PLAYED WHEN THE PHONE RINGS |
| 4. A SIMPLE "BEEP" | RADIO BUTTON | TELLS THE OPERATOR TO SIGNAL EACH RING WITH A SINGLE BEEP THAT MATCHES THE CADENCE FROM THE MODEM. IN THE U.S., THIS LETS US SUPPORT RBOC *DISTINCTIVE RING*. IT MIGHT BE USEFUL TO BE ABLE TO ADJUST THE FREQUENCY IN AN INI FILE SO THAT, ON A COUNTRY-BY-COUNTRY BASIS, WE CAN ADJUST THE PITCH TO SOMETHING USERS ARE FAMILIAR WITH. MUTUALLY EXCLUSIVE TO THE ".WAV FILE" RADIOBUTTON. THIS BUTTON IS THE DEFAULT. |
| 5. A SOUND IN A .WAV FILE | RADIO BUTTON | TELLS THE OPERATOR TO PLAY A .WAV FILE FOR EACH RING. MUTUALLY EXCLUSIVE TO THE "BEEP" RADIOBUTTON. |
| 6. AVAILABLE SOUNDS | LISTBOX | LISTS .WAV FILES IN THE USER'S COLLECTION. IF THE ".WAV FILE" BUTTON IS SELECTED, THE CURRENT/LATEST SELECTION IS HIGHLIGHTED. |
| 7. LISTEN | BUTTON | LETS THE USER LISTEN TO THE CURRENT RING SOUND. ALSO LETS THEM AUDITION .WAV FILES IN THEIR COLLECTION. |
| 8. FIND FILE | BUTTON | LAUNCHES A STANDARD WINDOWS FIND FILE DIALOG BOX. IF THE USER SELECTS A FILE, IT IS COPIED INTO THEIR COLLECTION AND HIGHLIGHTED. |
| 9. SAVE SETTINGS | BUTTON | SAVES CHANGES AND RETURNS TO THE PREVIOUS SCREEN. |
| 10. CANCEL | BUTTON | DISCARDS CHANGES AND RETURNS TO THE PREVIOUS SCREEN. |

*FIG. 6G*

| CONTROL | TYPE | ACTION |
|---|---|---|
| 1. SHALL I TAKE VOICE MESSAGES WHILE YOU ARE AWAY? | YES/NO RADIO BUTTON | EFFECTIVELY TURNS THE ANSWERING MACHINE ON OR OFF. THIS DECIDES WHETHER CALLERS CAN LEAVE VOICEMAIL IF THE OPERATOR PICKS UP THE PHONE (UNATTENDED) AND DETECTS A VOICE CALL |
| 2. TAKE MESSAGES AFTER # RINGS IF I HAVE MESSAGES | SPINBOX | THE OPERATOR AUTOMATICALLY ANSWERS THE PHONE AFTER THIS MANY RINGS IF ANY VOICEMAIL BOX CONTAINS NEW (UNLISTED) MESSAGES. RANGE-2 TO 9. DEFAULT-3. GRAYED OUT IF CONTROLS 1 AND 2 ARE BOTH NO. |
| 3. TAKE MESSAGES AFTER # RINGS IF THERE ARE NONE | SPINBOX | THE OPERATOR AUTOMATICALLY ANSWERS THE PHONE AFTER THIS MANY RINGS IF NO VOICEMAIL BOX CONTAINS NEW (UNLISTED) MESSAGES. RANGE-2 TO 9. DEFAULT-5. GRAYED OUT IF CONTROLS 1 AND 2 ARE BOTH NO. |
| 4. MAXIMUM LENGTH OF EACH ANSWERING MACHINE MESSAGE | SPINBOX | LIMITS THE LENGTH, IN SECONDS, OF EACH VOICEMAIL MESSAGE. RANGE-10 TO 60. DEFAULT-30. |
| 5. WHEN I TAKE A MESSAGE, DO YOU WANT TO HEAR THE CONVERSATION? | YES/NO RADIO BUTTON | IF YES, THE OPERATOR TELLS THE TAM APPLICATION TO TURN THE PC SPEAKERS ON WHILE PLAYING A GREETING AND RECORDING A VOICEMAIL MESSAGE. DEFAULT-YES |
| 6. COMPRESS MESSAGES? | YES/NO RADIO BUTTON | DECIDES WHETHER TO ENABLE COMPRESSION WHEN RECORDING MESSAGES. SEE TAM SPECIFICATION FOR MORE INFORMATION. |
| 7. SHALL I WARN YOU IF YOU RUN LOW ON DISK SPACE? | YES/NO RADIO BUTTON | IF YES, THE OPERATOR ALERTS THE USER WHEN DISK SPACE FALLS BELOW THE ESTABLISHED THRESHOLD. DEFAULT-YES |
| 8. BEGIN WARNING WHEN THE DISK IS ??% FULL? | SPINBOX | THE OPERATOR SHOWS THE FIRST DISK SPACE WARNING MESSAGE (SEE LAST SECTION OF THIS DOCUMENT) WHEN THIS THRESHOLD IS REACHED. RANGE-50 TO 90. DEFAULT-80. GRAYED OUT IF CONTROL 6 IS NO. |
| 9. STOP TAKING MESSAGES WHEN THE DISK IS ??% FULL. | SPINBOX | THE OPERATOR STOPS TAKING MESSAGES AND RECEIVING FAXES (SEE LAST SECTION OF THIS DOCUMENT) WHEN THIS THRESHOLD IS REACHED. RANGE-50 TO 100. MUST BE GREATER THAN THE VALUE GIVEN IN CONTROL #7. DEFAULT-95. GRAYED OUT IF CONTROL 6 IS NO. |
| 10. SAVE SETTINGS | BUTTON | SAVES CHANGES AND RETURNS TO THE PREVIOUS SCREEN. |
| 11. CANCEL | BUTTON | DISCARDS CHANGES AND RETURNS TO THE PREVIOUS SCREEN. |

*FIG. 6H*

| CONTROL | TYPE | ACTION |
|---|---|---|
| 1. WHAT WOULD YOU LIKE TO NAME YOUR FAX MACHINE? | EDITBOX | LETS THE USER SET THE FAX MACHINE'S STATION NAME. |
| 2. ...WAIT N RINGS FOR THE OTHER MACHINE TO ANSWER | SPINBOX | DECIDES HOW LONG TO LET THE PHONE RING (WHEN SENDING A FAX) BEFORE DECIDING THE OTHER STATION IS NOT GOING TO ANSWER. VALUES ARE 1-10. DEFAULT-5 |
| 3. ...TRY TO SEND A FAX N TIMES BEFORE GIVING UP | SPINBOX | DECIDES HOW MANY TIMES TO TRY SENDING A FAX BEFORE GIVING UP AND MARKING IT "ABORTED" IN THE OUT BOX. VALUES ARE 1-5. DEFAULT-2 |
| 4. ...WAIT N MINUTES BETWEEN TRIES | SPINBOX | IF A FAX TRANSMISSION ABORTS, THIS DECIDES HOW LONG TO PAUSE BEFORE TRYING AGAIN. VALUES ARE 1-10. DEFAULT-5 |
| 5. LEAVE THE SPEAKER ON | DROPDOWN LISTBOX | DECIDES WHETHER THE SPEAKER IS ON WHILE SENDING/RECEIVING A FAX. CHOICES ARE NEVER, ALWAYS, UNTIL CONNECTED. DEFAULT-UNTIL CONNECTED |
| 6. SPEAKER VOLUME | DROPDOWN LISTBOX | DETERMINES THE SPEAKER VOLUME. CHOICES ARE LOW, MEDIUM AND HIGH. DEFAULT-MEDIUM |
| 7. ...THE BUILT-IN ONE | RADIO BUTTON | TELLS THE FAX APPLICATION TO USE THE BUILT-IN QUICK NOTE EDITOR WHEN THE USER PRESSES CREATE FAX |
| 8. ...ANOTHER PROGRAM OR WORD PROCESSOR | RADIO BUTTON | TELLS THE FAX APPLICATION WHICH EDITOR TO LAUNCH WHEN THE USER PRESSES CREATE FAX |
| 9. COMMAND LINE | EDITBOX | LETS THE USER ENTER A COMMAND LINE FOR THEIR FAX EDITOR. DEFAULT-C:\WINDOWS\WRITE.EXE |
| 10. FIND FILE | BUTTON | LAUNCHES A STANDARD WINDOWS FIND FILE DIALOG BOX. ITS RESULT IS COPIED INTO THE COMMAND LINE EDITBOX. |
| 11. SAVE SETTINGS | BUTTON | SAVES CHANGES AND RETURNS TO THE PREVIOUS SCREEN |
| 12. CANCEL | BUTTON | DISCARDS CHANGES AND RETURNS TO THE PREVIOUS SCREEN |
| 13. ADVANCED | BUTTON | INVOKES THE ADVANCED FAX OPTIONS DIALOG BOX (SEE FIGURE 6E) |

*FIG. 6I*

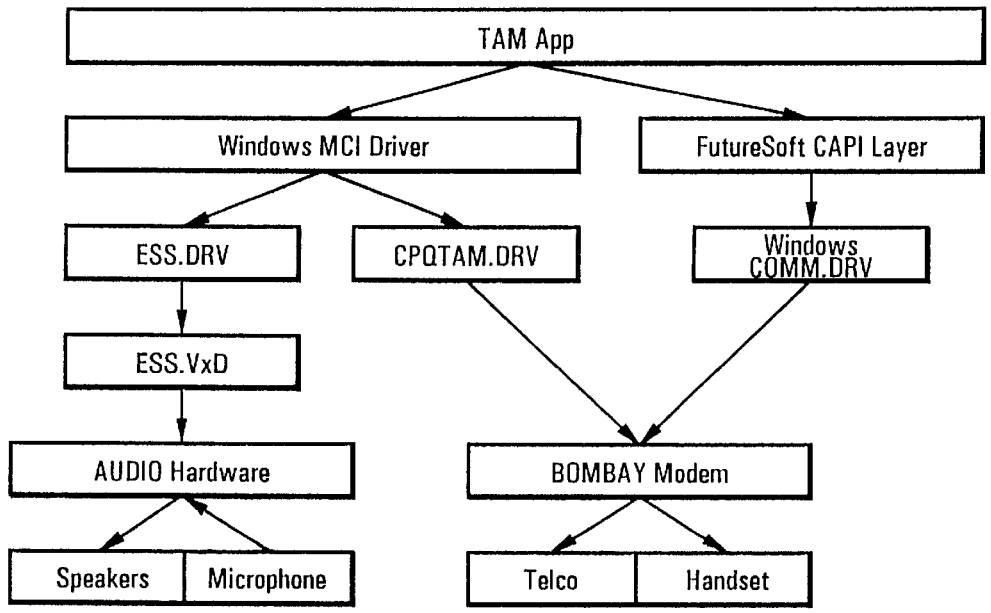
FIG. 9E
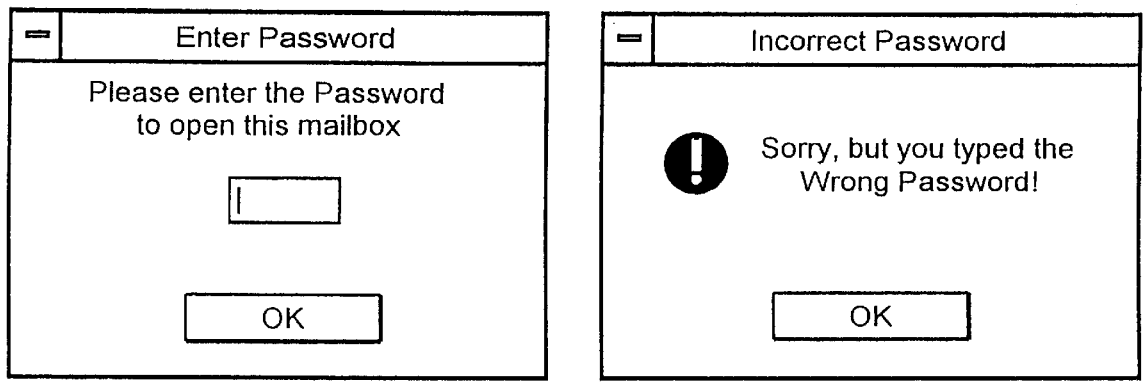
FIG. 9F(a)  FIG. 9F(b)

| BUTTON | ACTION |
|---|---|
| MAILBOXES | DISPLAYS THE MAILBOX SCREEN |
| MEMO | LEAVES A MEMO IN THE CURRENT MAILBOX (NO PASSWORD REQUIRED) |
| OPTIONS | INVOKES THE OPERATOR'S OPTIONS DIALOG BOX |
| CLOSE | EXITS THE APP |
| ? | DISPLAYS PROGRAM HELP (TBD) |
| 📇 | INVOKES THE ADDRESS BOOK |

*FIG. 9G*

[ Next Mailbox ]          [ Memo ]

| BUTTON | ACTION |
|---|---|
| ▶ | PLAYS THE LAST RECORDED MEMO. GRAYED OUT UNTIL A MEMO HAS BEEN RECORDED. |
| ● | BEGINS RECORDING A NEW MEMO |
| ◀◀ | GRAYED OUT - INACTIVE |
| ■ | STOPS RECORDING |
| ▶▶ | GRAYED OUT - INACTIVE |
| VOLUME | ADJUST THE PLAYBACK VOLUME |
| DELETE | DELETES THE CURRENT/LAST RECORDED MEMO |
| SAVE | SAVES THE LAST RECORDING AS THE MEMO |
| CANCEL | RETURNS TO THE PREVIOUS SCREEN -- NO MEMO IS RECORDED |
| ? | DISPLAYS PROGRAM HELP (TBD) |

*FIG. 9I*

| BUTTON | ACTION |
|---|---|
|  | PLAYS ALL SELECTED MESSAGES BACK TO BACK. IF PLAY THEN STOP THEN PLAY PRESSED, PLAYBACK BEGINS AT THE BEGINNING OF THE LAST INCOMPLETE MESSAGE PLAYED. GRAYED OUT UNTIL ONE OR MORE MESSAGES ARE SELECTED. |
|  | NOT USED FOR THIS SCREEN -- GRAYED OUT. |
|  | STOPS PLAYBACK. GRAYED OUT UNTIL ONE OR MORE MESSAGES ARE SELECTED. |
|  | PLAYS THE NEXT MESSAGE. GRAYED OUT UNTIL ONE OR MORE MESSAGES ARE SELECTED. |
|  | PLAYS THE PREVIOUS MESSAGE. GRAYED OUT UNTIL ONE OR MORE MESSAGES ARE SELECTED. |
| VOLUME | THE SPEAKER VOLUME SWITCH ON THE MAIL PANEL SHOULD STILL BE VISIBLE WHEN THIS GRAPHIC IS SUPERIMPOSED. |
| MOVE | MOVES ALL SELECTED MESSAGES TO A NEW MAILBOX. INVOKES THE MOVE DIALOG BOX. GRAYED OUT UNTIL ONE OR MORE MESSAGES ARE SELECTED. |
| DELETE | DELETES THE CURRENT/LAST RECORDED MEMO. |
| CHANGE LABEL | CHANGES THE DESCRIPTION FOR THE SELECTED MESSAGE(S). GRAYED OUT UNTIL ONE OR MORE MESSAGES ARE SELECTED. |
| CLOSE | RETURNS TO THE PREVIOUS SCREEN |
|  | DISPLAYS PROGRAM HELP (TBD) |

FIG. 9Q

FAX Details

| | |
|---|---|
| FAX: | 1.713.378.7466 |
| Type: | TIFF Group 3 Compressed |
| File: | C:\WINDOWS\FAX\INBOX\FOO.TIF |
| File Specs: | Hi Res (204x196 dpi), 20, 12 |
| Status: | Received |
| Pages: | 2 |
| Duration: | 00:34:12 |
| Description: | |

[Save] [Cancel]

*FIG. 14D*

Delete FAX

FAX: 7/27/94 12:01:23 Billy Taylor

○ Delete FAX and log entry
○ Delete FAX only

[OK] [Cancel]

*FIG. 14E*

| CONTROL | FUNCTION PERFORMED | |
|---|---|---|
| 📞 | SELECTING THIS BUTTON ENABLES CONTROL OF THE PHONE CENTER APPLICATION SOFTWARE. THE APPROPRATE FUNCTION BUTTONS WILL BE ACTIVATED FOR USE TO PLAY MESSAGES, STOP PLAYBACK AND TO PLAY THE NEXT/PREVIOUS MESSAGES FROM THE USER'S GENERAL MAILBOX ONLY. WHEN FLASHING, INDICATES THAT THERE ARE UN-READ MESSAGES IN THE GENERAL MAILBOX. WILL CONTINUE TO DO SO UNTIL ALL MESSAGES HAVE BEEN RETRIEVED. | |
| 💿 | SELECTING THIS BUTTON ENABLES CONTROL OF THE CD PORTION OF THE CD SOUND SYSTEM SOFTWARE. THE APPROPRIATE FUNCTION BUTTONS WILL BE ACTIVATED TO ALLOW ALL THE STANDARD FUNCTIONS NEEDED TO PLAY CDs FROM THE REMOTE CONTROL. THE USER MAY ALSO USE THE KEYPAD TO SELECT A SPECIFIC TRACK TO PLAY. | |
| 📺 | SELECTING THIS BUTTON ALLOWS EXTENSIVE MANIPULATION OF THE TV TUNER APPLICATION. THE USER MAY USE THE ACTIVATED FUNCTION BUTTONS TO STEP THROUGH A LIST OF TV STATION PRESETS. THE KEYPAD CAN BE USED TO MANUALLY SELECT A CHANNEL, OR THE USE OF THE UP/DN ARROWS WILL COUNT THE CHANNEL UP OR DOWN. | |
| ADJUST | STARTS THE TV REMOTE CONTROL | |
| PLAY ▶ | CD COMPONENT<br>PHONE COMPONENT<br>TV COMPONENT | • STARTS PLAYING THE CURRENTLY LOADED CD<br>• STARTS PLAYING MESSAGES FROM THE GENERAL MAILBOX<br>• DISABLED |
| PAUSE ‖ | CD COMPONENT<br>PHONE COMPONENT<br>TV COMPONENT | • PAUSES PLAY OF THE CURRENTLY LOADED CD<br>• PAUSES PLAYBACK OF MESSAGES FROM THE GENERAL MAILBOX<br>• DISABLED |
| STOP ■ | CD COMPONENT<br>PHONE COMPONENT<br>TV COMPONENT | • STOPS PLAYING THE CURRENTLY LOADED CD<br>• STOPS PLAYING MESSAGES FROM THE GENERAL MAILBOX<br>• DISABLED |
| EJECT ▲ | CD COMPONENT<br>PHONE COMPONENT<br>TV COMPONENT | • OPENS THE CD TRAY<br>• DISABLED<br>• DISABLED |
| FFWD ▶▶ | CD COMPONENT<br>PHONE COMPONENT<br>TV COMPONENT | • FAST FORWARD IN THE CURRENT TRACK<br>• FAST FORWARD IN THE CURRENT MESSAGE<br>• DISABLED |
| REV ◀◀ | CD COMPONENT<br>PHONE COMPONENT<br>TV COMPONENT | • REVERSE IN THE CURRENT TRACK<br>• REVERSE IN THE CURRENT MESSAGE<br>• DISABLED |
| NEXT ▶‖ | CD COMPONENT<br>PHONE COMPONENT<br>TV COMPONENT | • SKIP TO NEXT TRACK<br>• SKIP TO NEXT MESSAGE<br>• SELECT NEXT PRESET TV CHANNEL |
| PREV ‖◀ | CD COMPONENT<br>PHONE COMPONENT<br>TV COMPONENT | • SKIP TO PREVIOUS TRACK<br>• SKIP TO PREVIOUS MESSAGE<br>• SELECT PREVIOUS PRESET TV CHANNEL |

*FIG. 15A(a)*

| CONTROL | FUNCTION PERFORMED |
|---|---|
|  | TOGGLE. MUTE/UNMUTE MASTER OUTPUT AUDIO. |
|  | TOGGLE. LOCKS/UNLOCKS AUDIO CHANNEL SLIDERS FOR SIMULTANEOUS OR INDEPENDENT ADJUSTMENT. |
| 0-9 | THE KEYPAD IS USED TO ENTER TV CHANNELS OR CD TRACK NUMBERS MANUALLY. |
| VOLUME SLIDERS | CONTROLS THE MASTER AUDIO OUTPUT LEVELS OF THE LEFT AND RIGHT CHANNELS. |
| CHANNEL ▲ | USED TO INCREMENTALLY SELECT TV CHANNELS IN THE POSITIVE DIRECTION. |
| CHANNEL ▼ | USED TO INCREMENTALLY SELECT TV CHANNELS IN THE NEGATIVE DIRECTION. |
|  | INVOKES THE MICROSOFT WINDOWS™ HELP ENGINE WITH THE MINIPILOT SOFTWARE REMOTE CONTROL HELP FILE. |
|  | STARTS THE ADDRESS BOOK APPLICATION. |
|  | STARTS THE FAX CENTER APPLICATION. WHEN FLASHING. INDICATES THAT A FAX HAS BEEN RECEIVED BY THE FAX CENTER APPLICATION. CLICKING THE BUTTON WILL STOP THE FLASHING. |

*FIG. 15A(b)*

| CONTROL | FUNCTION PERFORMED |
|---|---|
|  | ADJUSTS THE BRIGHTNESS OF VIDEO OUTPUT |
|  | ADJUSTS THE CONTRAST OF THE VIDEO OUTPUT |
|  | ADJUSTS THE HUE/TINT OF THE VIDEO OUTPUT |
|  | ADJUSTS THE SATURATION COLOR OF THE VIDEO OUTPUT |
|  | FINE TUNES THE PICTURE QUALITY OF THE VIDEO OUTPUT |
|  | TOGGLE. ENABLES OR DISABLES ON-SCREEN CHANNEL INFORMATION. THIS IS OVERLAID ON THE OUTPUT VIDEO. |
|  | VIDEO SOURCE SELECTION. TV TUNER OR ANY NTSC VIDEO COMPONENT. I.E. VIDEOCAM, VCR, VIDEODISC ETC. |
|  | SELECTS VIDEO WINDOW FRAME STYLES. |

*FIG. 15B*

GRAPHICAL INTERFACE FOR A COMPUTER HARDWARE RESOURCE HAVING A SURREALISTIC IMAGE OF A REAL OFFICE MACHINE

This is a continuation of copending application Ser. No. 08/303,627, filed Sep. 9, 1994.

BACKGROUND OF THE INVENTION

1. Field of the Invention

This invention relates to a computer/user interface for computer hardware resources associated with familiar devices.

2. Description of the Related Art

The proliferation of the personal computer has made it possible to move many familiar office devices off of the desktop and into the computer system. Fax modems, for example, allow the user to not only to transmit and receive data from bulletin board services and computer networks, but also to send and receive facsimile transmissions, as well as place and accept calls over telephone lines. CD-ROM is not only an inexpensive storage medium for large computer programs or vast amounts of electronic data, but also a medium through which the computer may play music or display pictures or graphics. In addition, other office devices, e.g., AM/FM receivers and television tuners, are available as computer system components.

For experienced computer users, existing computer/user interface packages, such as Microsoft Windows, are more than sufficient to enable the user to manipulate these familiar office devices. The experienced user usually has no trouble selecting an office device for use, invoking the appropriate application to operate the device, and configuring the computer system for proper operation of the application and the device.

Novice users, on the other hand, usually have little, if any, understanding of the computer and are often unable or unwilling to perform the tasks necessary to use these otherwise familiar devices. At best, the novice user is confused when trying to operate office devices through the computer.

Experienced users and novice users alike encounter difficulties when a device is used for conflicting purposes. A fax modem, for example, may be used to initiate and answer voice calls as well as to transmit and receive facsimiles. If the modem receives an incoming call, the user must decipher whether it is a voice or facsimile call and then invoke the appropriate application, all before the caller gets tired of waiting and hangs up. In addition, the user may attempt to place a telephone call while unaware that facsimile data is being received by the modem.

SUMMARY OF THE INVENTION

In general, in one aspect, the invention features controlling flow, through a computer hardware resource, of information to and from computer applications. When a flow of information is initiated from one of the applications, a determination is made whether the resource is being accessed by another one of the applications and, if so, the flow of information from the first application is delayed. If not, the flow of information is enabled. When a flow of information is initiated toward the applications, a routine makes an arbitration as to which one of the applications the information is flowing, and the flow is directed to that one application.

Implementations of the invention may include the following features. A determination may be made whether the application to which information is flowing is able to accept the flow of information and, if not, the flow may be halted. If an application to which information is flowing is not running, the application may be launched. The step of determining to which one of the applications the information is flowing may include alerting a user to the flow of information, and allowing the user to select an appropriate one of the applications to receive the flow of information. A user may be told to which one of the applications the flow of information has been directed, and the user may be allowed to interrupt the flow of information to that one of the applications and direct it to another one of the applications. If one of the applications, in order to function properly, requires the presence of a specific hardware component, the method may include halting the flow of information to that one of the applications when the specific hardware component is not present.

A source of the information flowing toward the applications may be identified. The user may be allowed to halt the flow of information toward the applications at any time after the flow of information has been directed to one of the applications. If one of the applications requires disk storage space to accept the flow of information, the remaining capacity of the disk storage space may be monitored and the user may be alerted when the remaining capacity of disk storage space falls below a predetermined threshold value. The user may be told when the flow of information has been directed to the application requiring disk storage space.

A user may prespecify to which of the applications the flow of information can be directed. The user may be told when the flow of information from the first application is delayed. The method may be arranged to insure that all required information is included in the flow of information initiated by one of the applications. The flow of information initiated by one of the applications may include information obtained from another one of the applications. The resource may include a modem and the flow of information may include a telephone line signal. The applications may include: a telephone application, an answering machine application, or a facsimile application.

In general, in another aspect, the invention features an Operator process which manages a modem in a computer, the modem being configured to receive and transmit signals for a telephone/answering machine application and a facsimile application. An administrator process or routine accepts from one of the applications a request for transmission of a telephone or facsimile signal by the modem, and arbitrates to determine if the modem is busy transmitting or receiving another signal and, if so, delays transmission of the telephone or facsimile signals, and when the modem is not busy, forwards the telephone or facsimile signal to the modem for transmission. A discriminator process receives an incoming signal from a telephone line and determines whether the signal is a telephone or facsimile signal. When the signal is a telephone signal, it informs the user that a telephone signal has been received, allows the user to determine which, if either, of the following modules in the telephone/answering machine application receives the signal: a telephone module or an answering machine module, directs the signal to the selected module, and when the signal is a facsimile signal, directs the signal to the facsimile application.

In general, in another aspect, the invention features a graphical interface which associates, in the mind of a user, a computer hardware resource with a corresponding real office device, the computer resource enabling the computer to function like the consumer device. The graphical interface includes a surrealistic image having physical features which represent functional components of the resource, the physical features of the image resembling corresponding features of the office device; and an animation routine which causes the image to change when the user selects one of the features of the image, thereby invoking the corresponding functional component of the resource, the change occurring in a manner which resembles changes to the office device when the corresponding feature of the office device is invoked.

In general, in another aspect, the invention features a graphical computer interface for enabling a user to control a computer hardware resource. The interface includes a displayed surrealistic image representing a real consumer device and having visual features which correspond to functional features of the computer hardware resource; and a process which causes the displayed surrealistic image to change when the user selects one of the visual features of the image, and causes a corresponding functional feature of the resource to operate in a manner that resembles the operation of the real consumer device.

Implementations may include the following features. The change in the displayed surrealistic image may be effected through animated motion resembling motion made by the real consumer device. The appearance of the displayed surrealistic image may so resemble the appearance of the real consumer device that each of the visual features of the image are immediately recognizable as related to the corresponding functional feature of the computer hardware resource. The computer hardware resource may be a modem and the displayed surrealistic image may be an image of one of the following: a telephone, an answering machine, a telephone/answering machine, a speakerphone, or a facsimile machine. The displayed surrealistic image may be an image of a telephone and one of the visual features may be an image of a handset in a cradle, and dialing a telephone number may cause the image of the handset to move away from the cradle.

In general, in another aspect, the invention features a method used by a computer application running on a computer, for learning commands which, when executed, automatically launch a computer program stored on a storage medium. An automatic installation or setup process for the computer program is monitored as the process passes the commands from the storage medium to the computer. The commands are identified and copied as they are passed from the storage medium to the computer. The commands are stored for future use in automatic execution of the computer program.

Some of the advantages and features of the invention are the following. The invention provides a graphical computer interface which provides surrealistic images that resemble real office devices and that are associated with computer hardware resources which function in a manner similar to the real office devices. The graphical computer interface is both readily understandable by novice users and appealing to experienced users. The invention also provides a way to manage the flow of information from computer applications to the hardware resources as well as from the hardware resources to the applications. A process for "snooping" execution commands associated with an executable program stored on a medium is also provided.

Other advantages and features of the invention will become apparent from the following description and from the claims.

BRIEF DESCRIPTION OF THE DRAWINGS

FIGS. 6G–6I are screen shots of the Operator's window.

FIGS. 15A(a), 15A(b), 15B describe the operation of each of the controls on the MiniPilot and the TV remote controls, respectively.

DESCRIPTION OF THE PREFERRED EMBODIMENT

Figure 1:
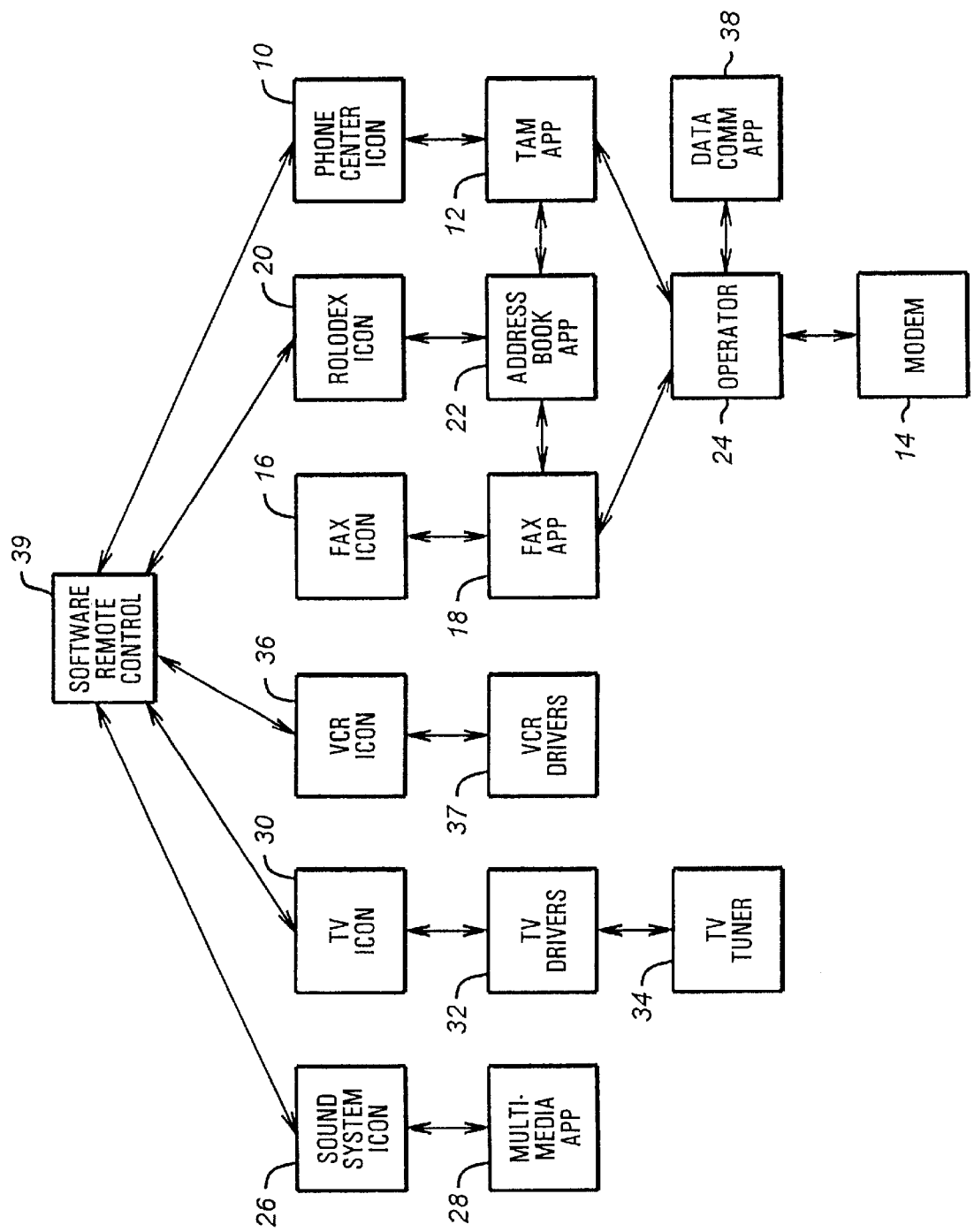
FIG. 1 is a functional block diagram of an electronic component interface.
Figure 2:
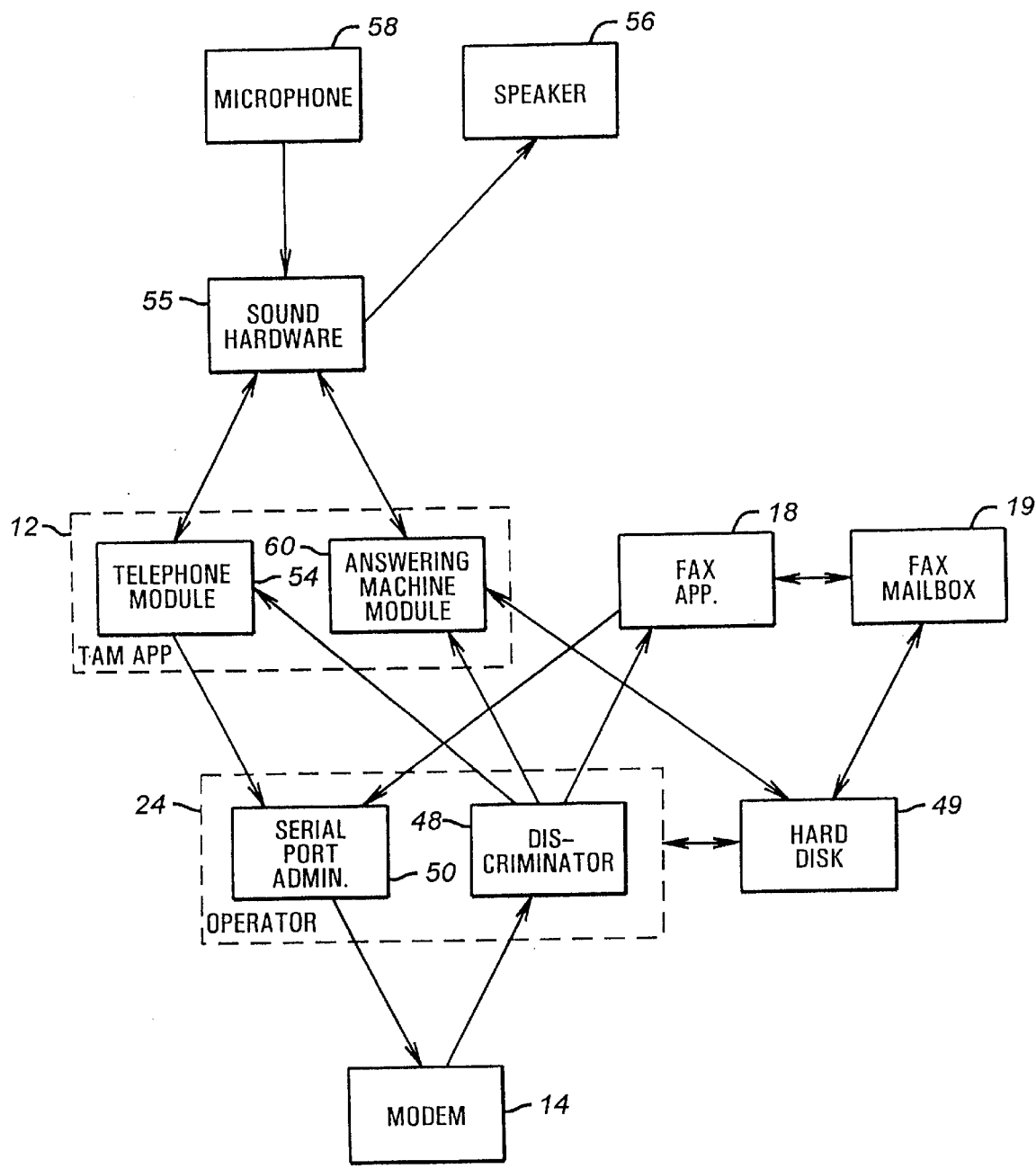
FIG. 2 is a functional block diagram of an Operator and modem-related applications of the electronic component interface.

Referring to FIG. 1, a personal computer, or PC (not shown), uses graphical images, or icons, to represent applications that allow hardware resources on the PC to simulate familiar, real office devices. For example, a phone center icon 10 is associated with a telephone/answering machine (TAM) application 12 which uses a modem 14 and other physical computer hardware resources to simulate a speakerphone and an answering machine. A facsimile (fax) machine icon 16 is associated with a fax application 18, which also uses the modem 14 to simulate a familiar device. A Rolodex icon 20 represents an address book application 22, which stores address and phone number information for use with the TAM 12 and fax 18 applications. The modem's use for TAM and fax services is governed by a system Operator 24, which is described in detail below.

A sound system icon 26 is associated with a multi-media application 28 which allows the computer to simulate, e.g., a CD player or an AM/FM stereo receiver. A television (TV) icon 30 is associated with TV drivers 32 which allow the computer to display video signals form a TV tuner 34. The computer may also use other icons to represent familiar office devices, such as a VCR icon 36 or a data communications service icon 38 (e.g., America Online or Prodigy). Many of the applications associated with an icon may be manipulated by the user with a software remote control icon 39, even when the application is not running in the foreground.

Referring also to FIG. 7, for each of the real office devices represented, the appearance of the graphical image very closely resembles the appearance of the real device. On the other hand, each of the graphical images contains an artistic element which gives the image a surrealistic appearance. As a result, each graphical image sufficiently resembles the corresponding real device that even a novice user would readily recognize the function of the computer hardware resources associated with the image; at the same time, the image is sufficiently appealing that the most experienced users, who generally prefer the look and feel of traditional computer/user interfaces, would find the images interesting and amusing and would readily accept the images as a legitimate interface.

Figure 7A:
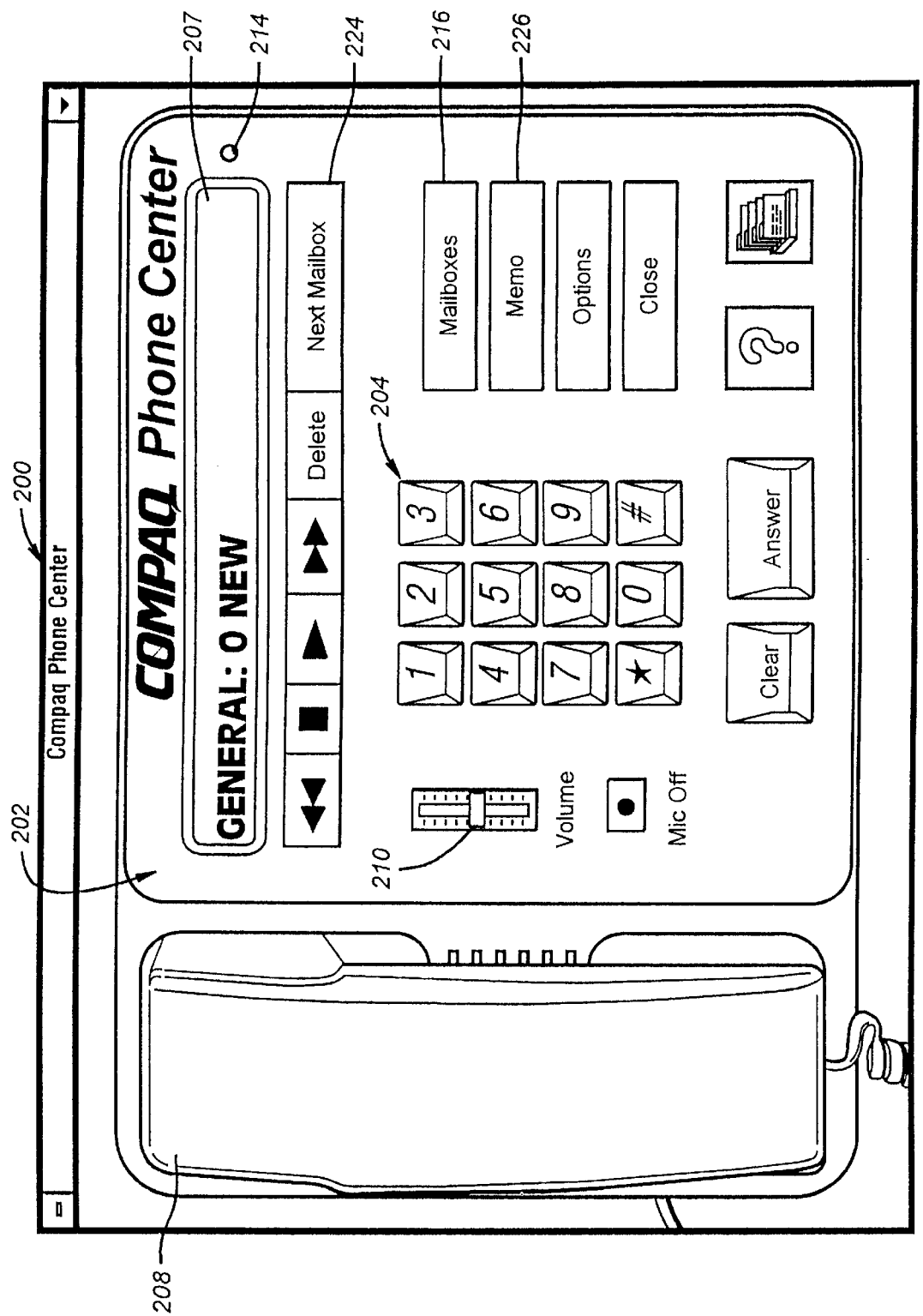
FIGS. 7A and 7B are screen shots of a graphic for a telephone application.

The image of FIG. 7A, for example, unmistakably resembles a speakerphone/answering machine. With this image, even the most inexperienced user could immediately use the corresponding computer hardware resources (e.g., modem, speaker, microphone) to place a telephone call. The appealing appearance of the phone would also likely capture the interests of an experienced modem user.

Referring to FIGS. 2 and 3A–3E, the TAM application 12 and the fax application 18 share the modem 14, whose operation is governed by a system Operator 24. In general, the user may be working in a Windows application when a phone call is received 100 (FIG. 3A) by the modem 14 over the phone line. The modem 14 notifies the Operator 24 of the incoming call by simulating rings, which are counted by the Operator 24. The Operator will be running in an Operator window 40 (FIG. 3B), usually in the background and possibly iconized, when it receives the first ring. If so, the Operator immediately notifies the user of the call by moving the Operator window into the foreground. The user may also configure the Operator 24 to produce audible rings. If the Operator window is iconized, it is brought to the foreground in the iconized state and is restored by the user. Once restored, the Operator window 40 tells the user that someone is calling. If Caller ID is available, the Operator 24 identifies the calling party.

Figure 3A:
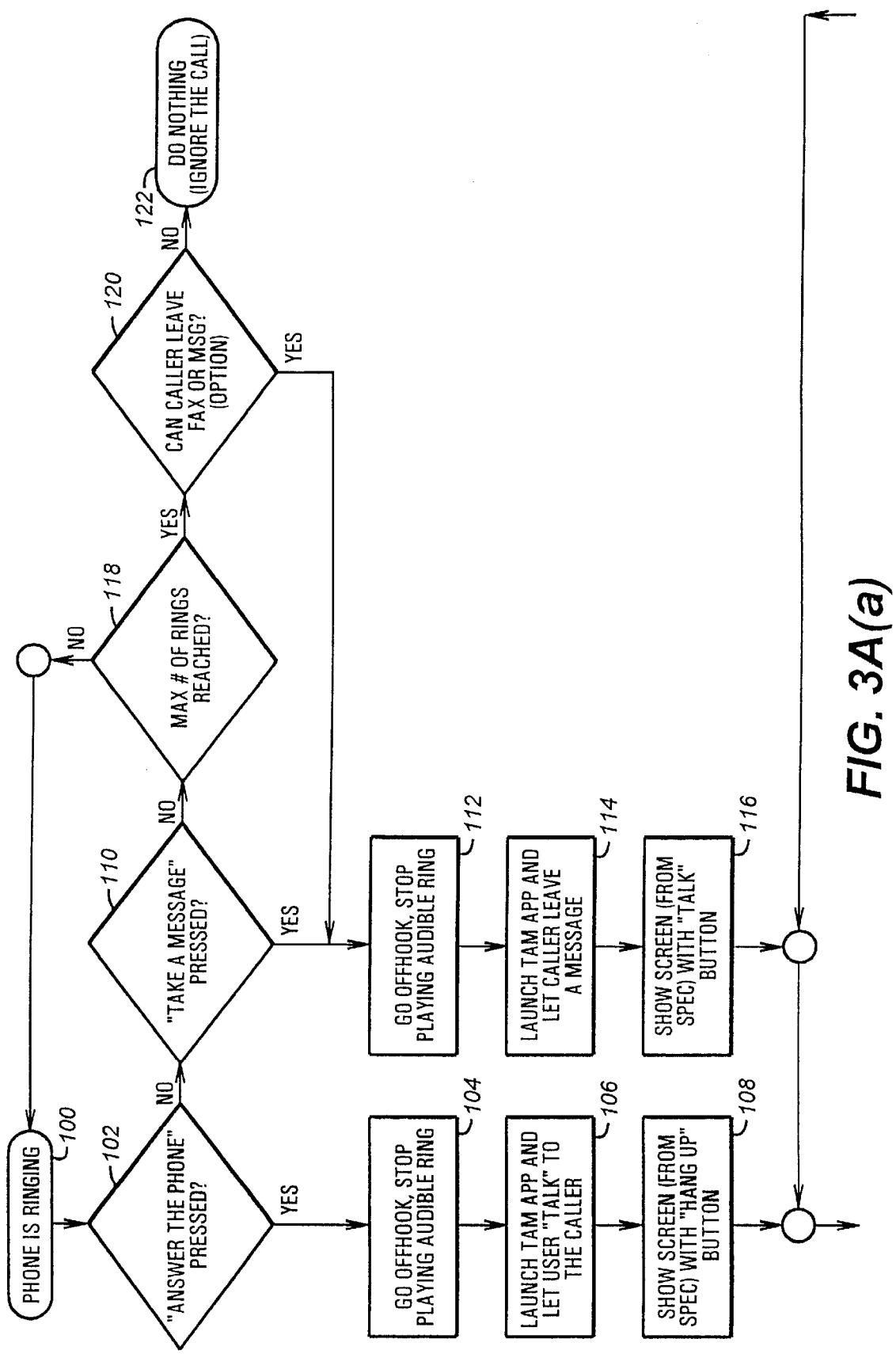
FIGS. 3A(a), 3A(b), 3B–3F are a diagram for and screen shots of the Operator when a phone call is received.
Figure 3A:
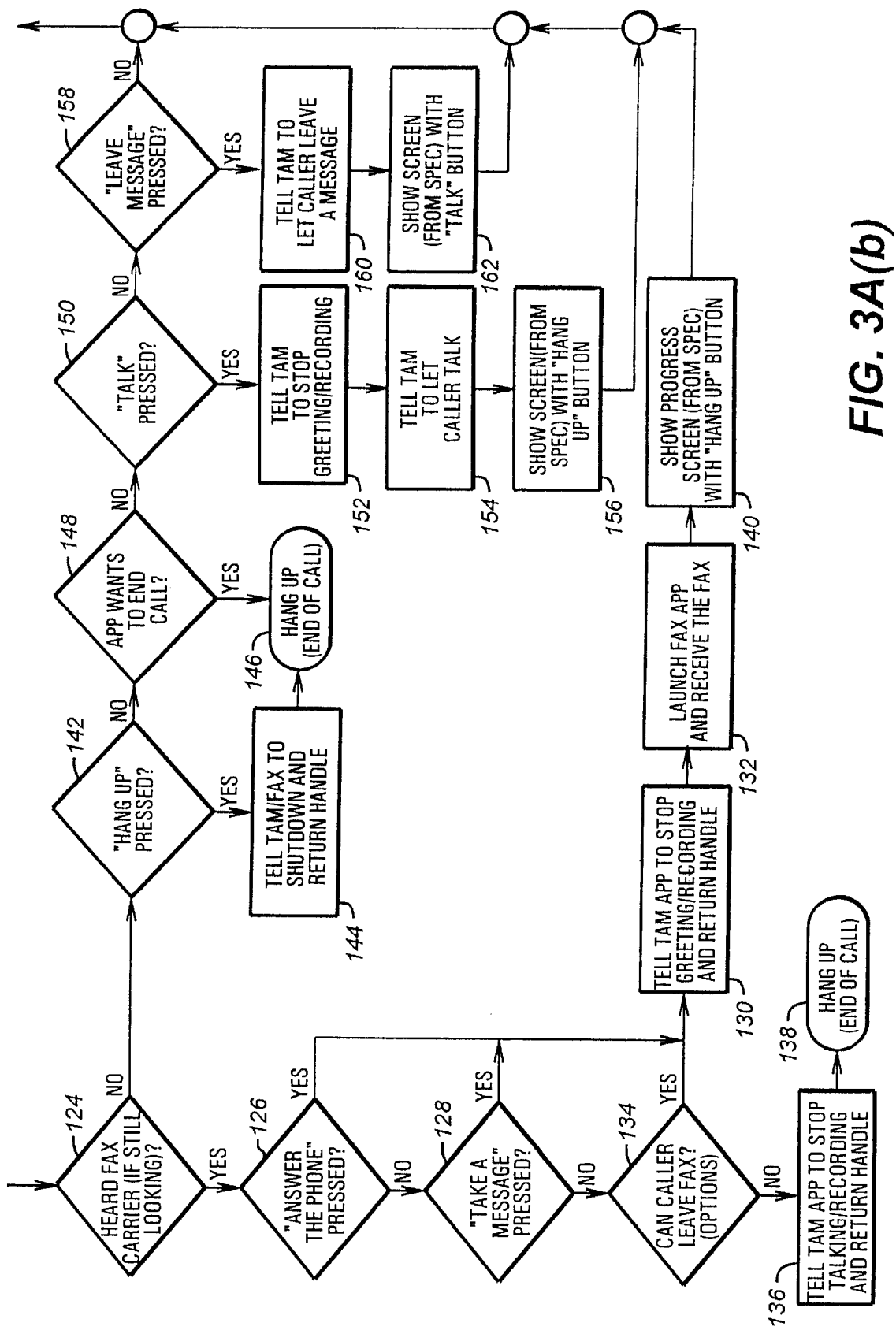
Figure 3B:
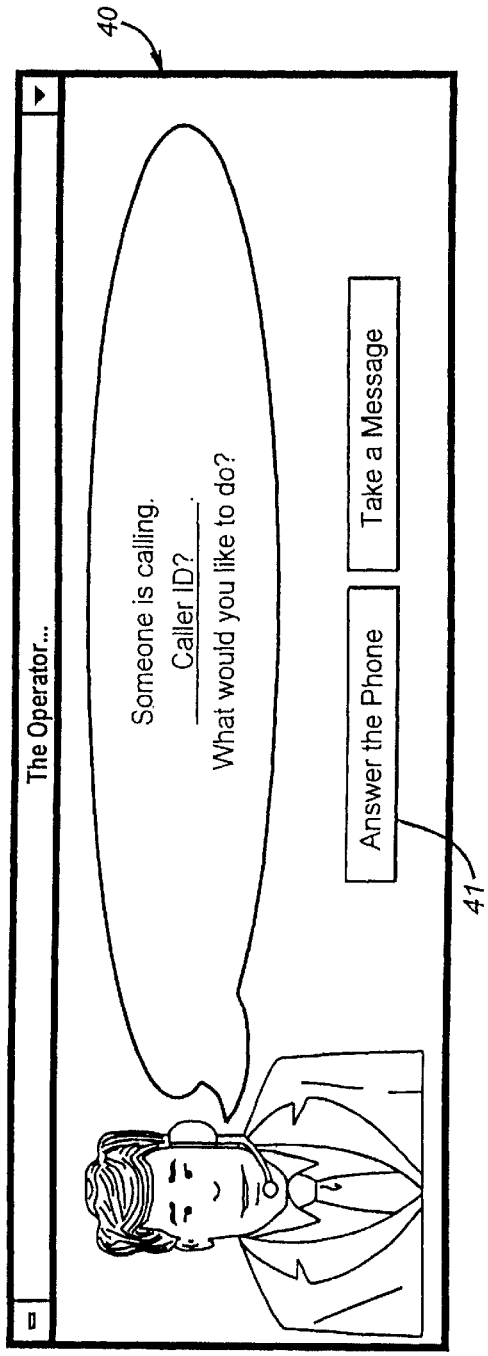
Figure 3C:
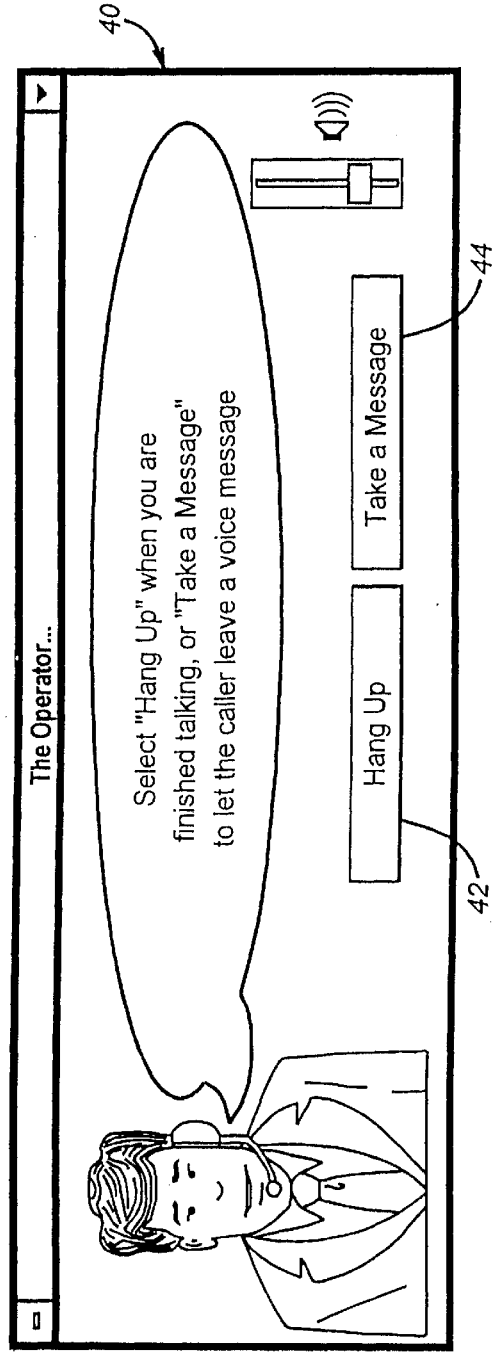
Figure 3D:
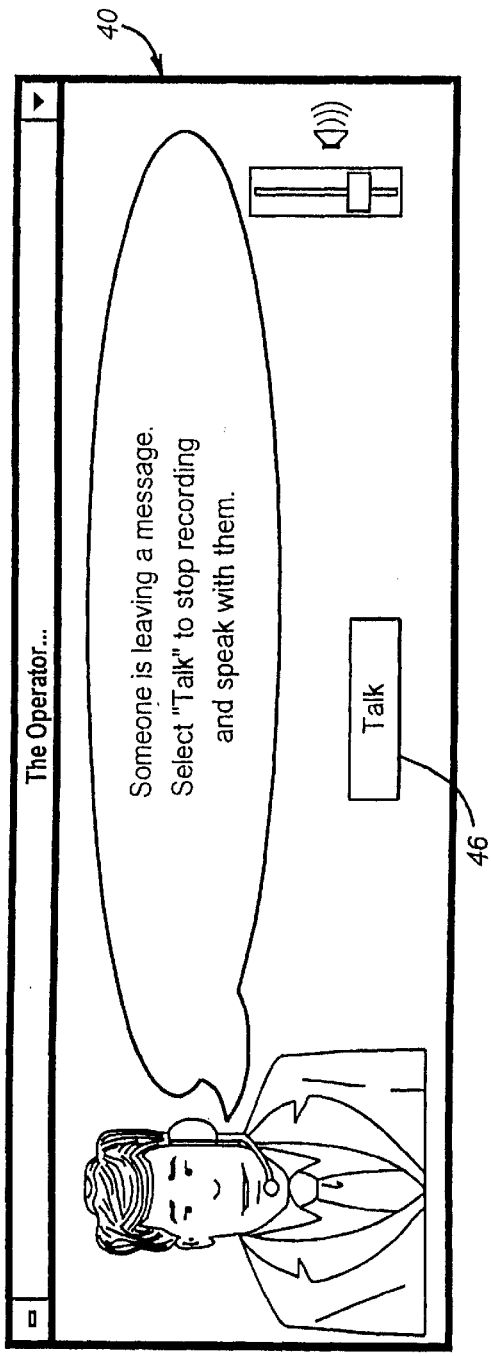
Figure 3E:
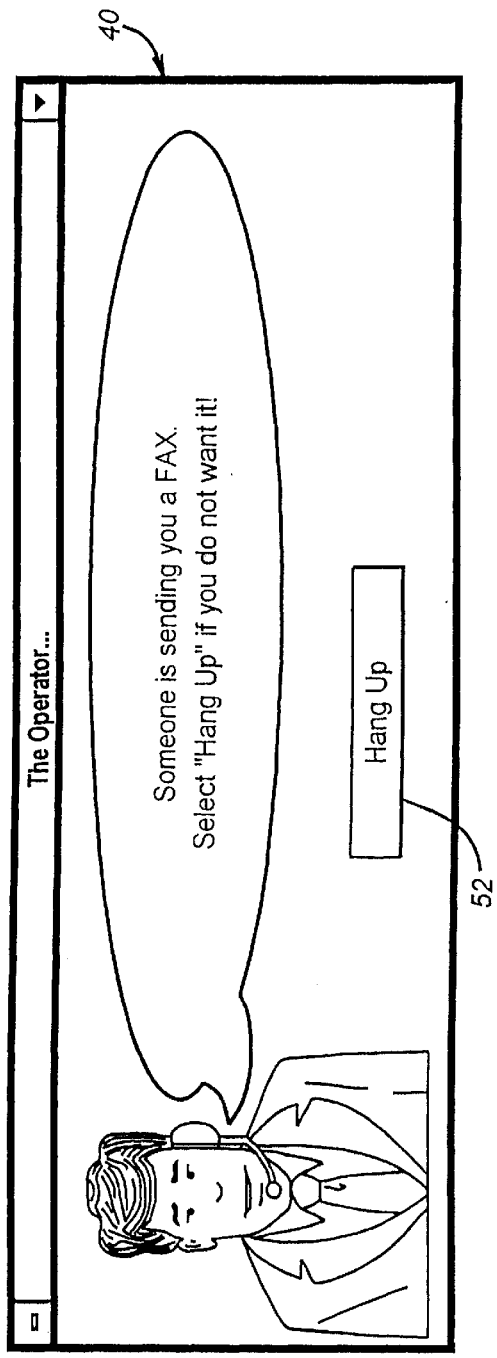

Referring to FIG. 3B, the Operator 24, like the applications, is associated with a surrealistic graphical image. The Operator 24 is represented graphically in the form of a man wearing a coat and a headset (such as those used by a real telephone "Operator"). While the man clearly resembles a real human, he also has an artistic (though not cartoon-like) appearance. Information and instructions from the Operator 24 to the user appear within a "bubble," as though the information is being spoken by the telephone "Operator." The user reacts to this information by pressing buttons which are clearly marked according their function. Allowing the Operator to communicate with the user in this manner provides a much easier, and more readily understandable, computer/user interface than is available with traditional graphical user interfaces.

Referring again to FIGS. 2 and 3A–3E, when a call is received, the user has three options: answer the call directly, instruct the Operator to take a message, or do nothing at all. If the user decides to answer 102 the call directly, the Operator takes 104 the phone offhook and launches 106 the TAM application 12. The Operator window 40 allows 108 the user to press either a "Hang Up" button 42 (FIG. 3C) when the call is complete or a "Take a Message" button 44 to allow the caller to leave a message. The "Take a Message" button 44 is useful, e.g., when the call is for someone other than the user.

If the user does not answer 102 the call but instructs 110 the Operator 24 take a message, the modem 14 in taken 112 offhook and the TAM application 12 is launched 114. The Operator window 40 then informs 116 the user that the caller is leaving a message and provides a "Talk" button 46 (FIG. 3D) which, if pressed, allows the user to interrupt the message and speak to the caller.

If the user does not answer 102 the call or instruct 104 the Operator 24 to take a message, the Operator 24 lets the phone ring until the caller hangs up or until a predetermined number of rings has been reached. When the maximum number of rings is reached, the Operator determines whether or not the caller can leave 120 a message or a fax. If not, the Operator ignores 122 the call. Otherwise, the Operator takes 112 the modem 14 offhook and launches 114 the TAM application 12, as if the user had instructed it to take a message.

Once the TAM application has been launched (whether the user answers the call or instructs the Operator to take a message is irrelevant), the Operator 24 starts a timer (preferably about 6 to 8 seconds in length), and a signal discriminator 48 in the Operator looks 124 for a fax carrier signal in the incoming call. If the discriminator 48 detects a fax carrier signal before the timer times out, and if the user has answered 126 the call or has instructed 128 the Operator to take a message, the TAM application 12 is stopped 130 and the fax application 18 is launched 132. If a fax signal is detected and the user has ignored the incoming call, the Operator determines 134 whether or not a fax can be accepted. If not, the TAM application 12 is stopped 136 and the call is terminated 138. Otherwise, the TAM application 12 is stopped 130 and the fax application 18 is launched 132.

After the fax application 18 is launched 132, the Operator 24 receives the incoming fax and places it into a fax mailbox 19. At the same time, the Operator window 40 informs 140 the user that a fax is being received. If the user wishes to terminate the fax, a "Hang Up" button 52 (FIG. 3E) can be pressed 142, in which case the Operator 24 will shut down 144 the fax application 18 and terminate 146 the call. If the button 52 is not pressed, the call is terminated 146 when the fax application 18 decides 148 to end the call, e.g., when the fax transmission is complete or when the hard disk 49 becomes full.

If no fax signal is detected 124 by the discriminator 48 and the user has answered the call, a telephone module 54 in the TAM application 12 routes the call to the user through the appropriate sound hardware 55, such as a sound card. Voice signals from the caller are transmitted to the user through a speaker 56 or headphones (not shown), and voice signals from the user are detected by a microphone 58.

The TAM application 12 carries an incoming call until the user presses 142 the "Hang Up" button 42, thereby shutting down 144 the TAM application 12 and terminating 146 the call, or until the user presses 158 the "Take a Message" button 44, thereby instructing 160 the TAM application to take a message. If the user chooses to take a message, the Operator window 40 provides 162 a "Talk" button 46 (FIG. 3D) which, if pressed, interrupts the message and allows the user to again talk to the caller. The application may also decide 148 on its own to terminate 146 the call, e.g., when the caller hangs up but the user does not press the "Hang Up" button 42.

If no fax signal is detected by the discriminator 48 and the user has instructed the Operator 24 to take a message, the call is routed to an answering machine module 60 in the TAM application 12. Upon receiving the call, the answering machine module 60 plays a greeting and then records the caller's message on the computer's hard disk 49. If the user presses 150 the "Talk" button 46 during the caller's message, the TAM application stops 152 the recorder 62 and allows 154 the user to talk to the caller. When this happens, the Operator window 40 displays 156 the "Hang Up" button 42 and the "Take a Message" button 44. The TAM application 12 may also decide 148 to stop the recorder and terminate 146 the call when, e.g., the caller hangs up or the hard disk 49 becomes full.

Figure 4A:
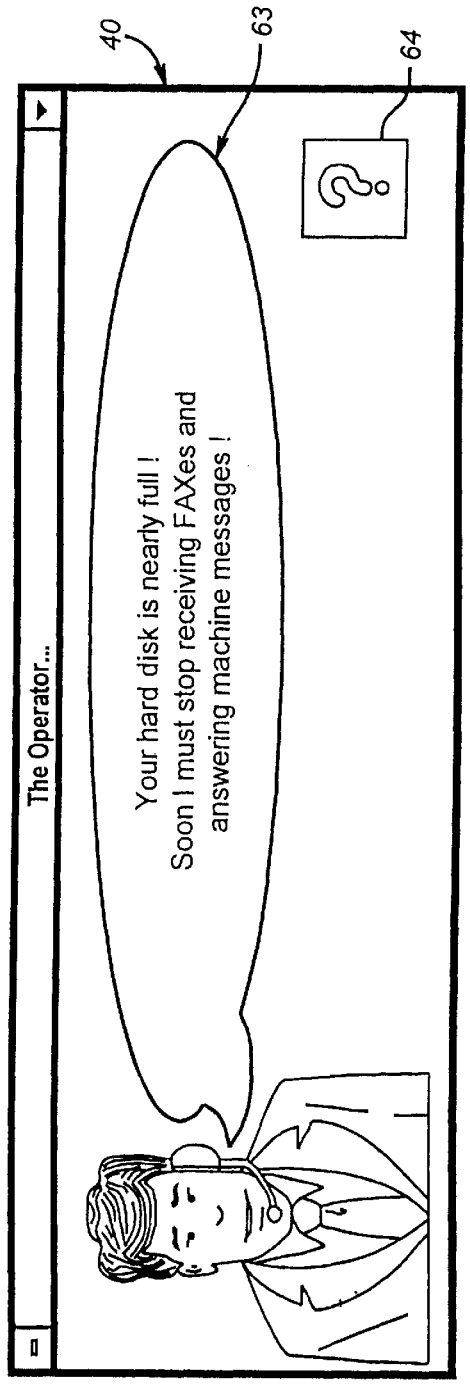
FIGS. 4A and 4B are screen shots of the Operator warning of a full hard disk.
Figure 4B:
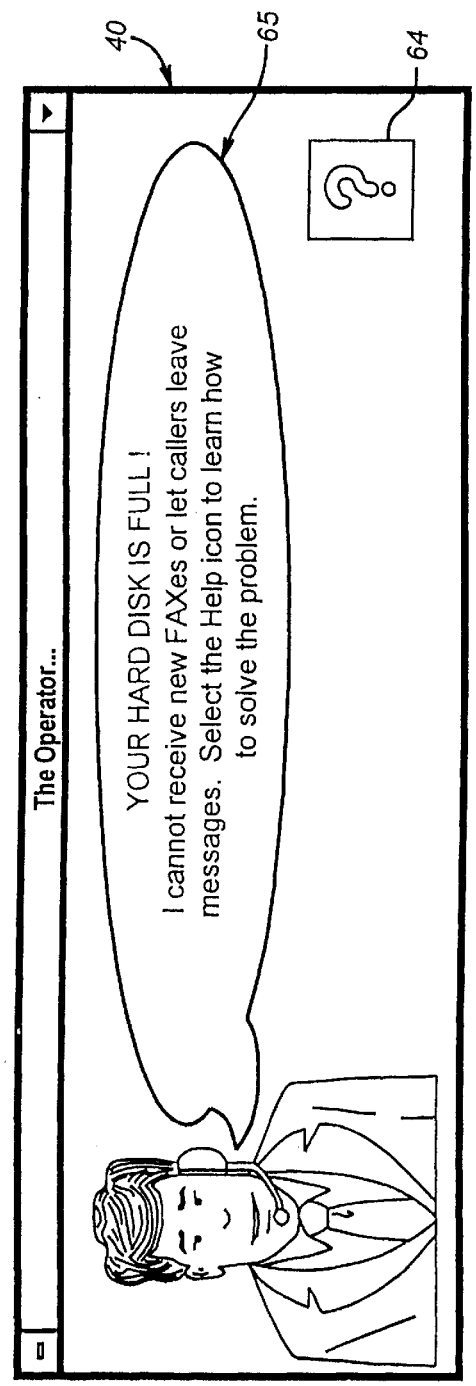

Referring also to FIGS. 4A and 4B, when the hard disk 49 is full, the TAM and fax applications are unable to receive incoming messages and faxes. To protect against this, the Operator 24 monitors at all times the storage space remaining on the hard disk 49. When the remaining space falls below a threshold level (determined by the user), the Operator window 40 provides a warning 63. The warning is flashed periodically as long as storage space remains below the threshold level or until the hard disk 49 is full. The window 40 also provides a help button 64 to help the user solve the storage problem. When the hard disk 49 is full or, in the alternative, falls below a second threshold value, the Operator window warns 65 (FIG. 4B) the user that messages and faxes can no longer be accepted.

Figure 5:
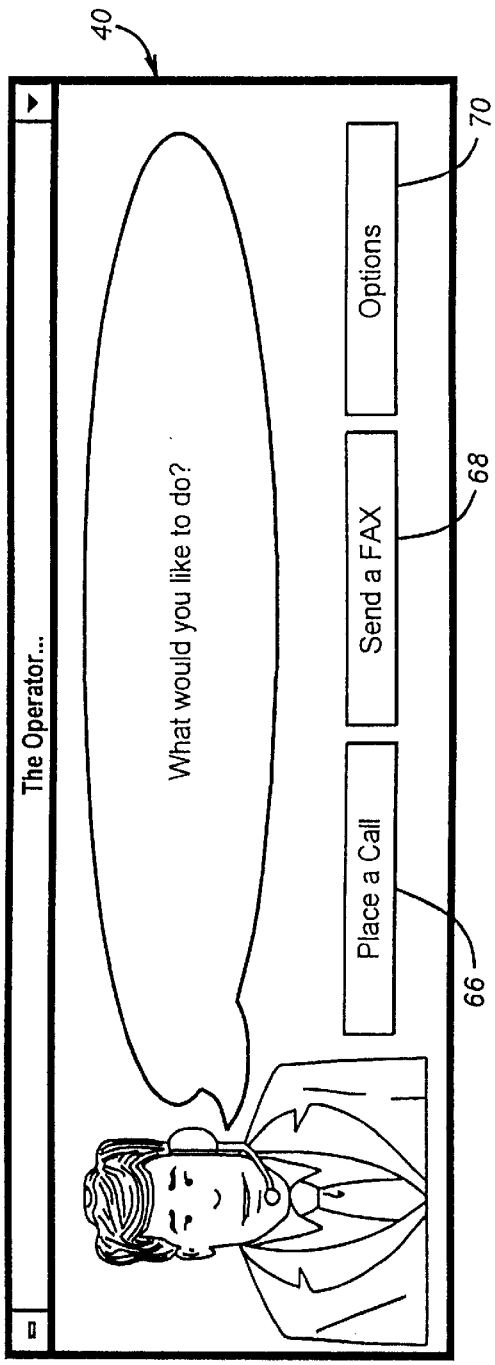
FIG. 5 is a screen shot of a default mode for the Operator.

Referring also to FIG. 5, in a default mode the Operator 24 waits for the user to press a "Place a Call" button 66 or a "Send a Fax" button 68 in the Operator window 40. (The user may also press an "Options" button 70 to configure the Operator and the TAM and fax applications, as described in detail below.) When the user decides to place a call, the Operator 24 invokes the TAM application or, if the application is already running, brings it to the foreground in its current state (e.g., iconized or restored). If the user chooses to send a fax, the fax application is likewise invoked and brought to the foreground. The Operator also places the fax application in a "create fax" mode (described above).

After the appropriate application is invoked, a serial port administrator 50 in the Operator 24 relinquishes control of the modem's serial port to the application. When the application is exited, control of the serial port is returned to the administrator 50. The administrator 50 may also temporarily relinquish control of the modem to applications unknown to the Operator. If the user attempts to invoke one of the modem-related applications while the modem is in use, the serial port administrator 50 informs the user that the modem is in use and tells which application is using it. As a result, the user is always informed when and why a selected application cannot be run.

The operation of the TAM application is dependent upon the hardware installed on the system. If the system has no microphone 58, the speaker phone is not supported, and only the answering machine will run. In this situation, the "Place a Call" button 66 in FIG. 5 becomes a "Get Messages" button, and the "Answer the Phone" button 41 and "Talk" button 46 in FIGS. 3B and 3D, respectively, are eliminated. Likewise, if the system has no speaker 56, neither the speakerphone nor the answering machine are supported, and the TAM application will not run at all.

Referring to FIGS. 5 and 6A–6E, selecting the "Options" button 70 in the default Operator window 40 opens an option menu 72 which allows the user to configure the Operator for operation of the telephone device, the answering machine device or the fax machine device. If the user selects the "Telephone" button 74, a "Telephone Options" window 76 is created. In this window, the user determines whether or not the phone should ring audibly, and if so, how loudly and in what manner: a simple beep which matches the cadence of the ring produced by the modem, or a sound from a .WAV file produced with each ring.

If the user selects the "Answering Machine" button 78, an "Answering Machine Options" window 80 appears. In this window, the user selects whether or not the answering machine should take massages when the user is away (or is ignoring the ringing phone). If so, the user sets the number of rings at which the answering machine is invoked. Two values may be set: one for when unplayed messages are stored in the recorder and another for when no messages are stored. The user may also set a maximum message length and determine whether or not a caller's message should be played over the speaker while it is recorded. The user also determines when (i.e., at what storage capacity remaining) the Operator warns the user that the disk is almost full, as well as when the Operator should stop accepting messages (i.e., the user can stop messages before the disk is completely full).

When the "Fax Machine" button 82 is selected, a "Fax Options" window 84 is opened, and the user configures the Operator for the transmission of faxes. In this window, the user selects a name for the fax machine, determines how long and how often the device should try to send a fax, and determines which editor should be used to create faxes. The user may also select an "Advanced Options" button 86, which opens an "Advanced Fax Options" window 88. This window allows the user to configure, e.g., fax banner settings and communication settings, such as minimum and maximum transmission "baud" rates. Additional detail in relation to the Operator is provided in the following functional specification and description.

Figure 7B:
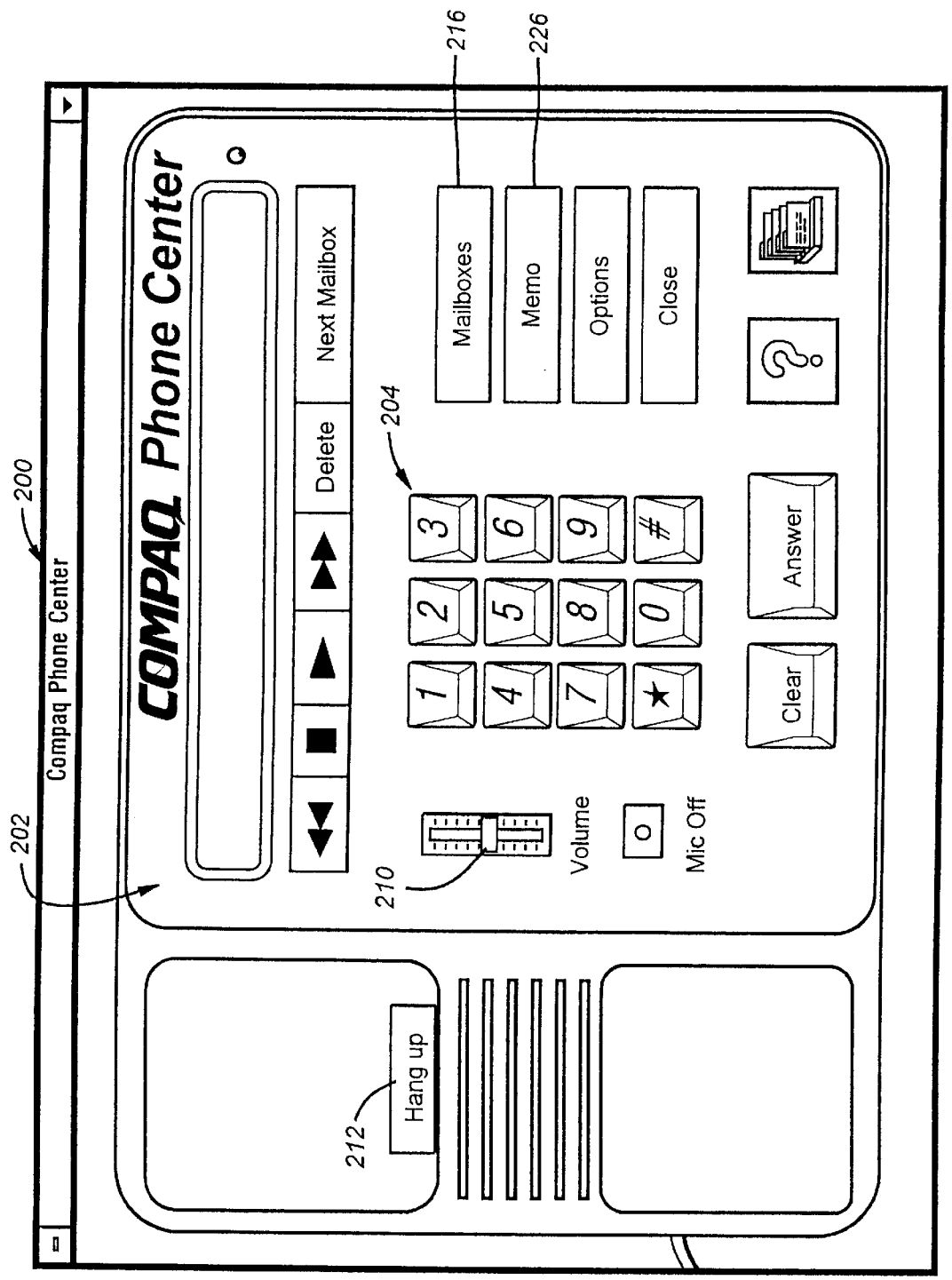

Referring to FIGS. 7A and 7B, invoking the TAM application opens a telephone center window 200. This window provides a true-to-life telephone/answering machine image 202 which invokes the telephone and answering machine modules. To place a call, the user dials the desired number on the keypad 204 and presses the dial button 206. As the number is dialed, the number appears in a liquid crystal display bar (LCD bar) 207. The application may also cross-reference the number against the address book and display the name of the dialed party, if found, in the LCD bar 207.

When the dial button 206 is pressed, the TAM application enters an animation routine that shows the handset 208 lifting out of its cradle and out of view, as though the user has picked up the handset (FIG. 7B). At any time during a conversation, the user can increase or decrease the volume of the speaker by adjusting the slide switch 210. When the conversation is over, the user presses the "Hang Up" button 212 in the handset cradle, and the animation routine returns the handset to the cradle.

When the Operator notifies the user of an incoming call and the user chooses to answer it, the phone center window 200 is displayed in the foreground with the handset off the cradle. If Caller ID is available, the number of the calling party is displayed in the LCD bar. The application ma also cross-reference the number of the calling party to the address book and, if found, display the calling party's name in the LCD bar.

Figure 8A:
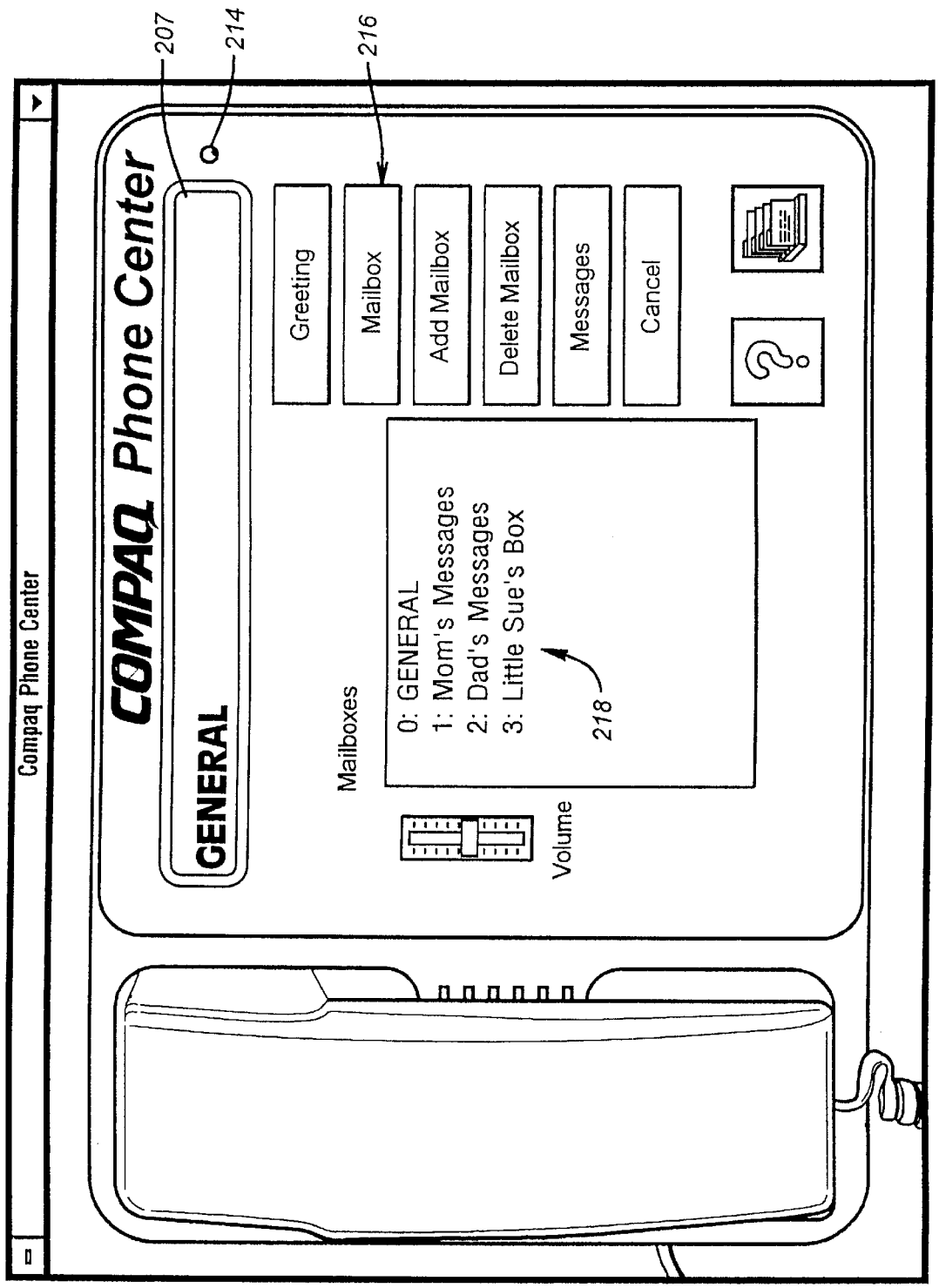
FIGS. 8A–8C are screen shots for an answering machine application.
Figure 8B:
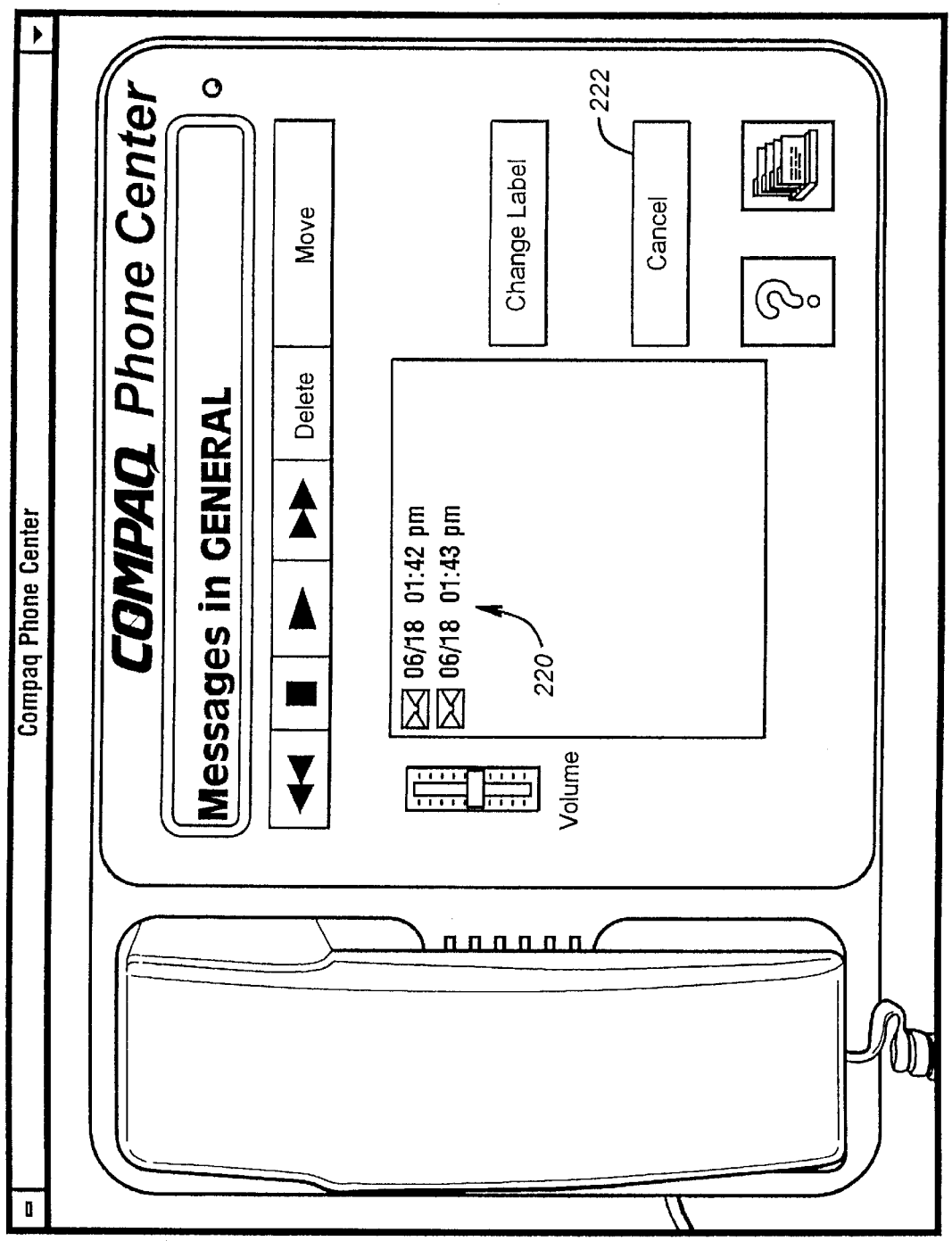
Figure 8C:
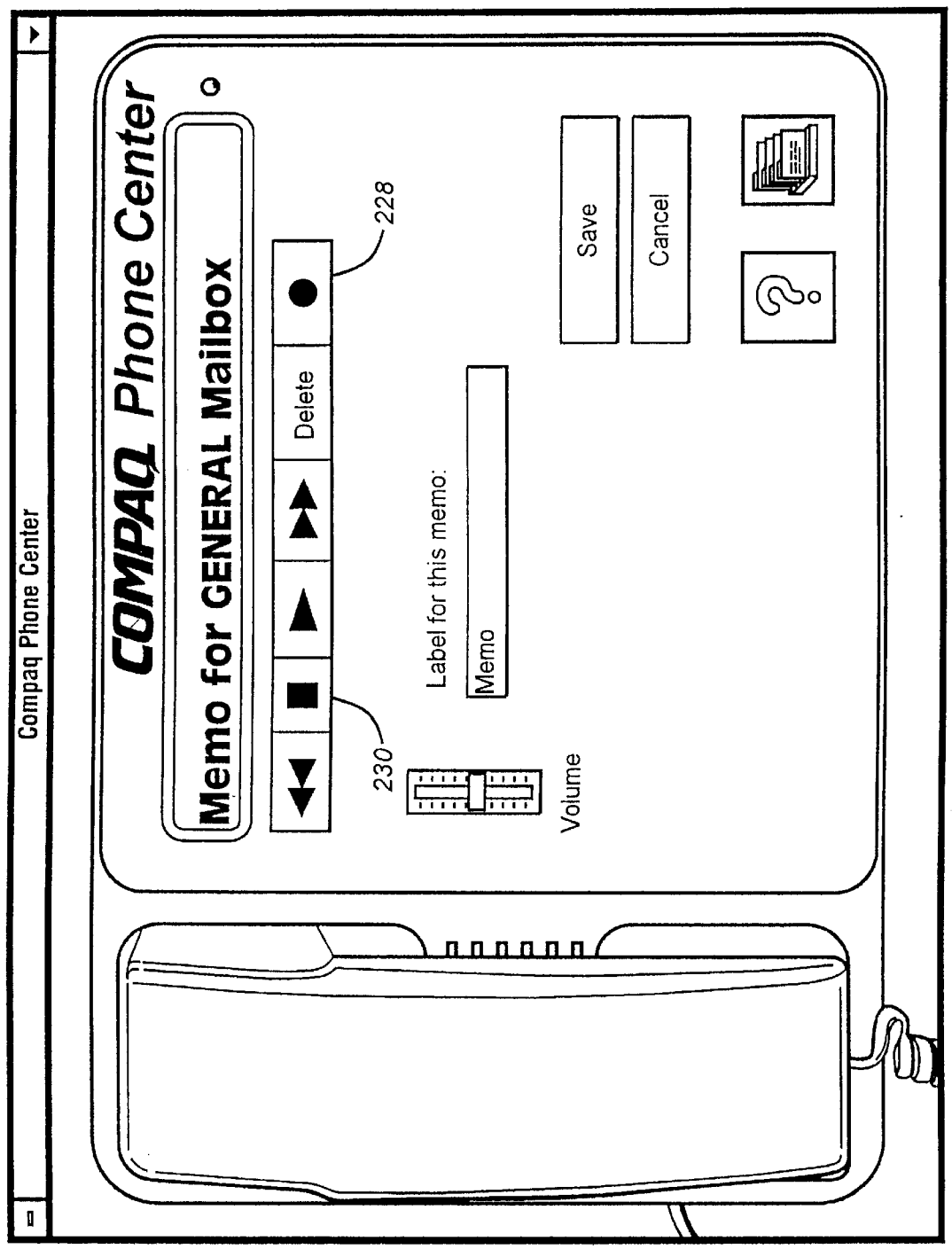

Referring also in FIGS. 8A and 8C, when the answering machine contains new messages, a light 214 blinks to notify the user. The name of the default mailbox ("General") is displayed in the LCD bar 207 along with the number of new messages in that mailbox. To retrieve any new messages, the user presses the "Mailboxes" button 216, which causes the keypad to be replaced with a list of mailboxes 218 (FIG. 8A). The user may take several actions on each mailbox by pressing the buttons next to the mailbox list 218.

When the user selects a mailbox to view, a password may need to be entered. If the correct password is entered, a list of messages 220 (FIG. 8B) in the mailbox is provided, including the date and time each message was recorded. A message can be played by selecting it from the list, and the message can be discarded by pressing the "Cancel" button 222.

In addition to recording phone messages, the answering machine can also record memos created by the user. To record a memo, the user selects the appropriate mailbox by pressing the "Next Mailbox" button 224 (FIG. 7A) and the "Memo" button 226. The "Next Mailbox" button 224 is then replaced by a record button 228 (FIG. 8C), which the user presses to begin recording the memo. Then the memo is complete, the user presses a stop button 230. The memo is then treated as any other message by the application.

Referring to FIGS. 9A–9D, the fax application opens a fax window 240 containing a graphical image 242 resembling an ordinary fax machine. The fax image 242 displays an "In Box" 244 containing information about incoming faxes, and an "Out Box" 246 containing information about outgoing faxes. The fax image 242 also contains buttons 248 which allow the user to manipulate (e.g., view, forward, delete) existing faxes or create new ones.

When the user decides to create a new fax, the fax application displays a fax creation checklist 250 (FIG. 9B) in the fax window 240. The checklist 250 allows the user to easily see which tasks are required and which tasks are optional when sending faxes. To perform a task, the user selects it from the checklist, and the fax application moves to the appropriate location (e.g., text editor, graphics editor, menu) to perform the task. Required tasks include entering text and choosing recipients. Optional tasks include choosing a cover sheet, adding graphics, and scheduling delivery of the fax.

Figure 9A:
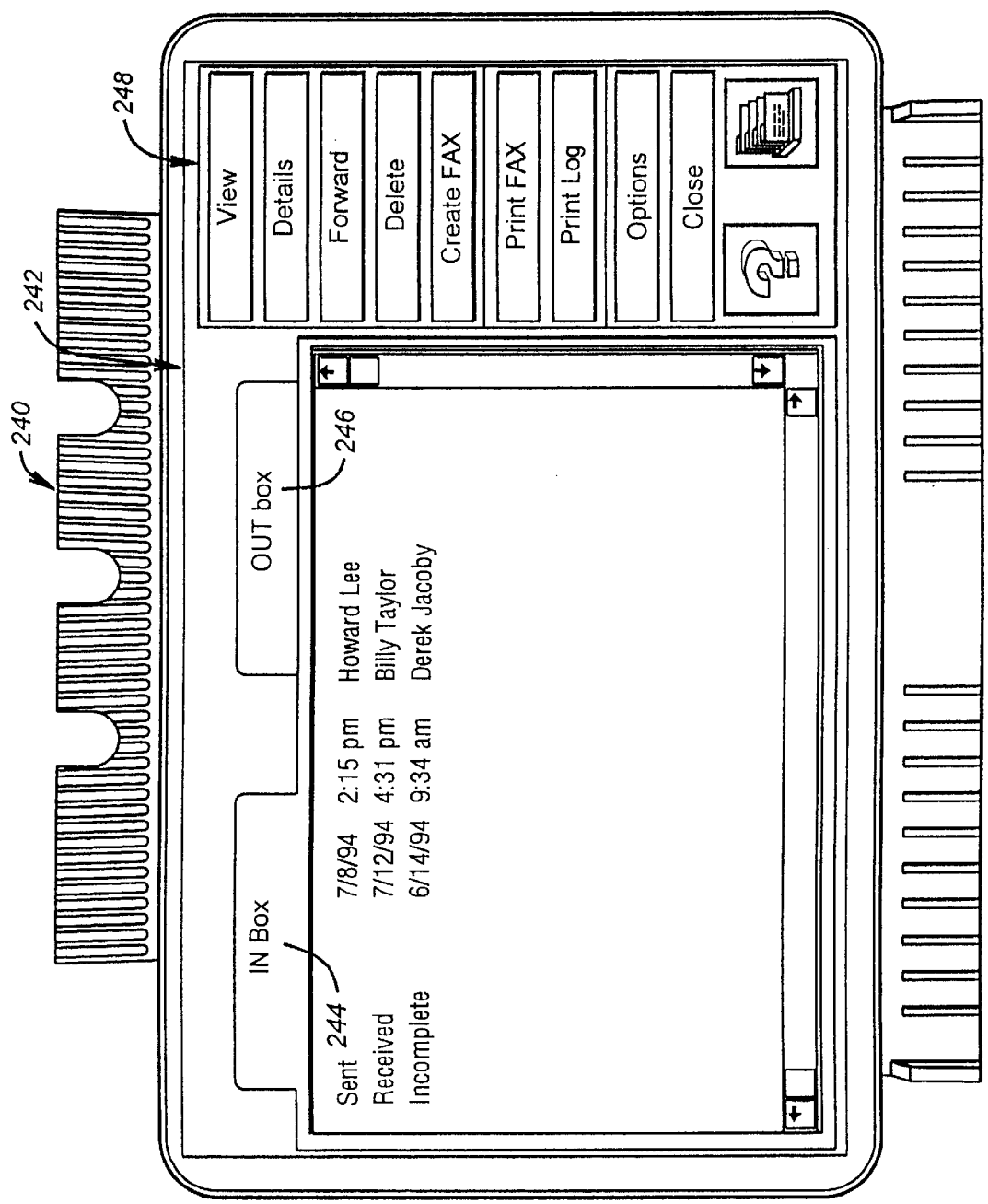
FIGS. 9A–9D are screen shots for a facsimile machine application.
Figure 9B:
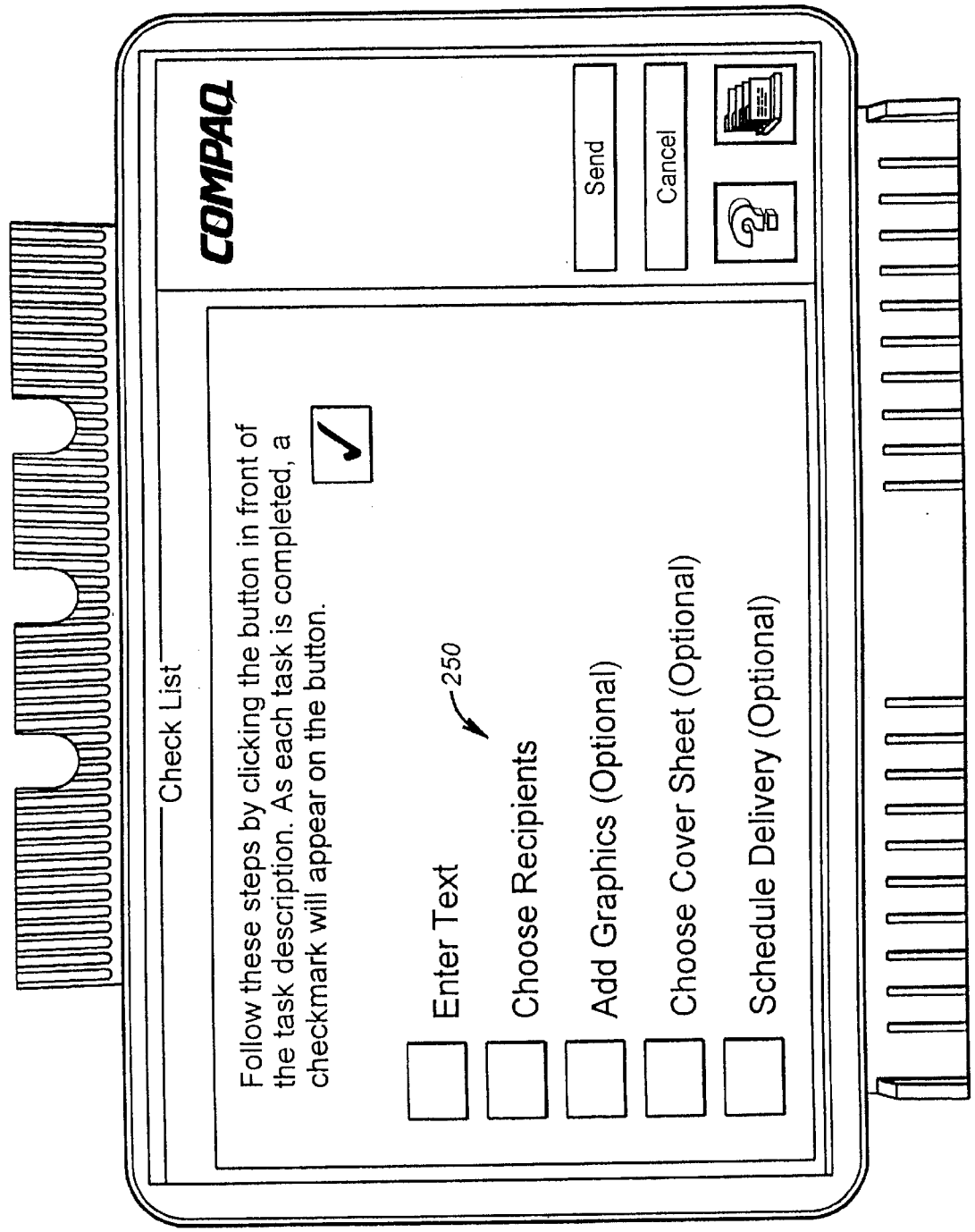
Figure 9C:
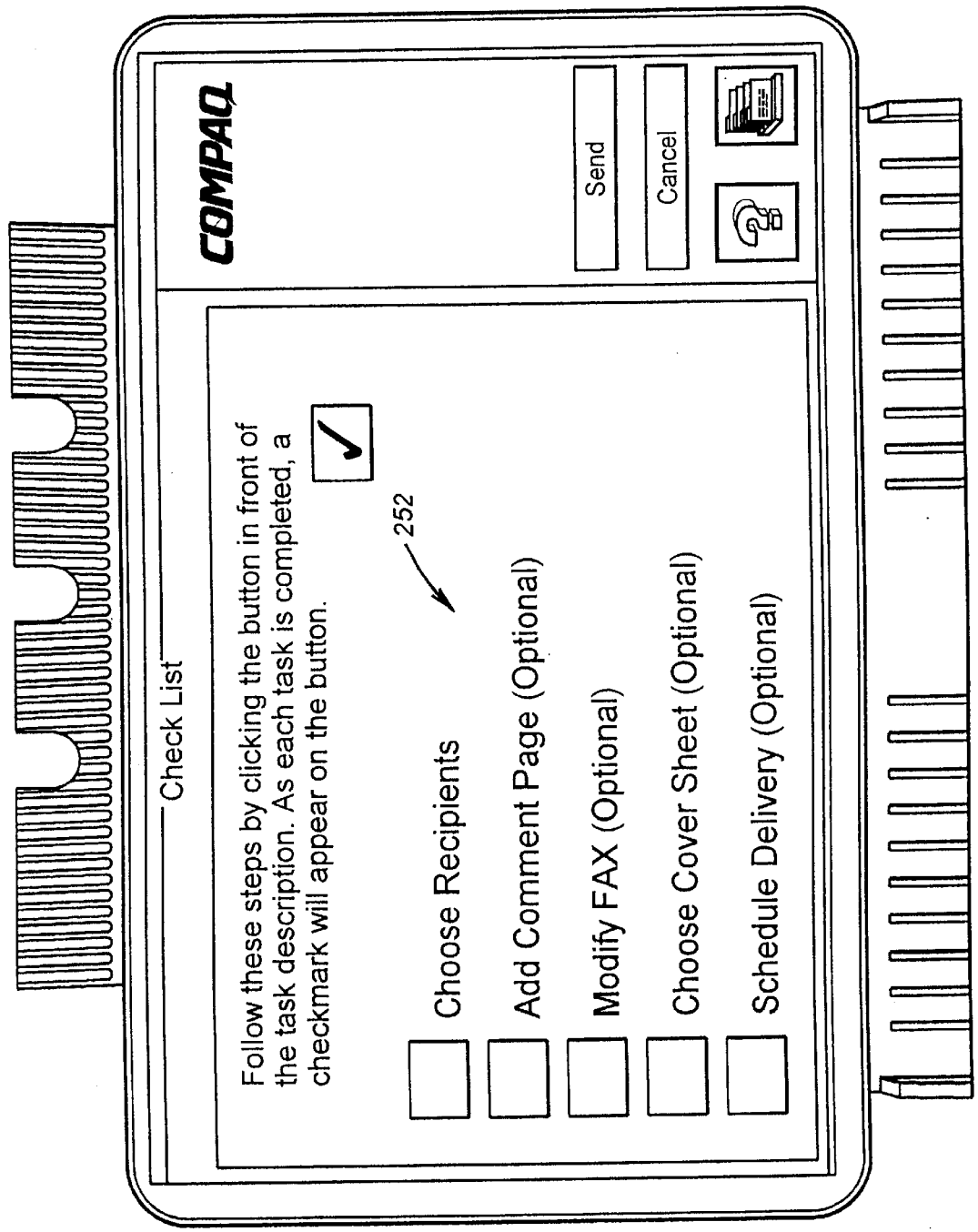
Figure 9D:
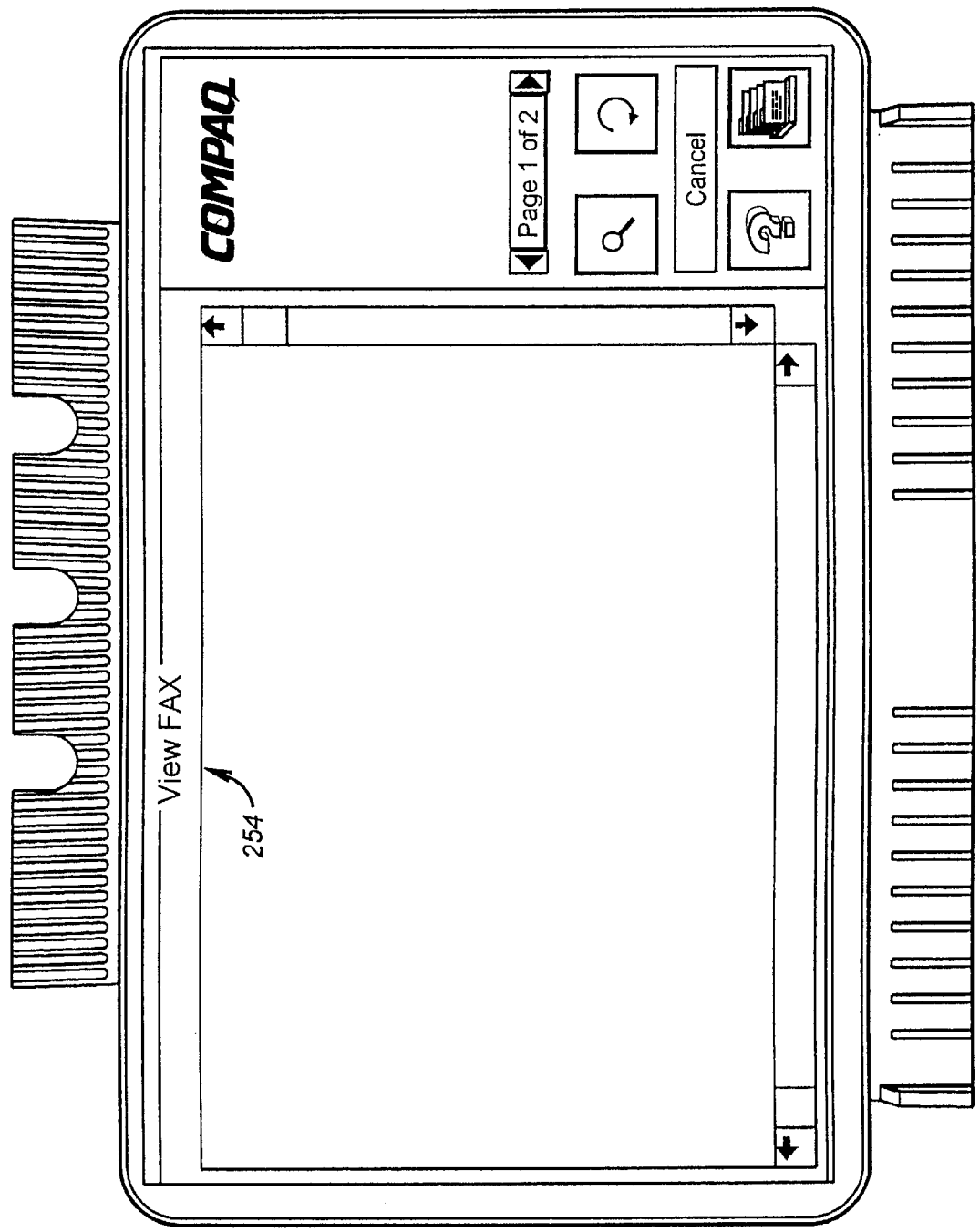

When the user decides to forward a received fax, a similar checklist 252 is displayed (FIG. 9C). This checklist also includes required tasks (e.g., selection of recipients) and optional tasks (e.g., adding comments, modifying the fax, choosing a cover sheet, and scheduling delivery). When the user decides to view a received fax, the fax is displayed in a fax view window 254 (FIG. 9D). Additional detail in relation to the TAM and fax applications is provided in the following functional specifications and descriptions.

Figure 10A:
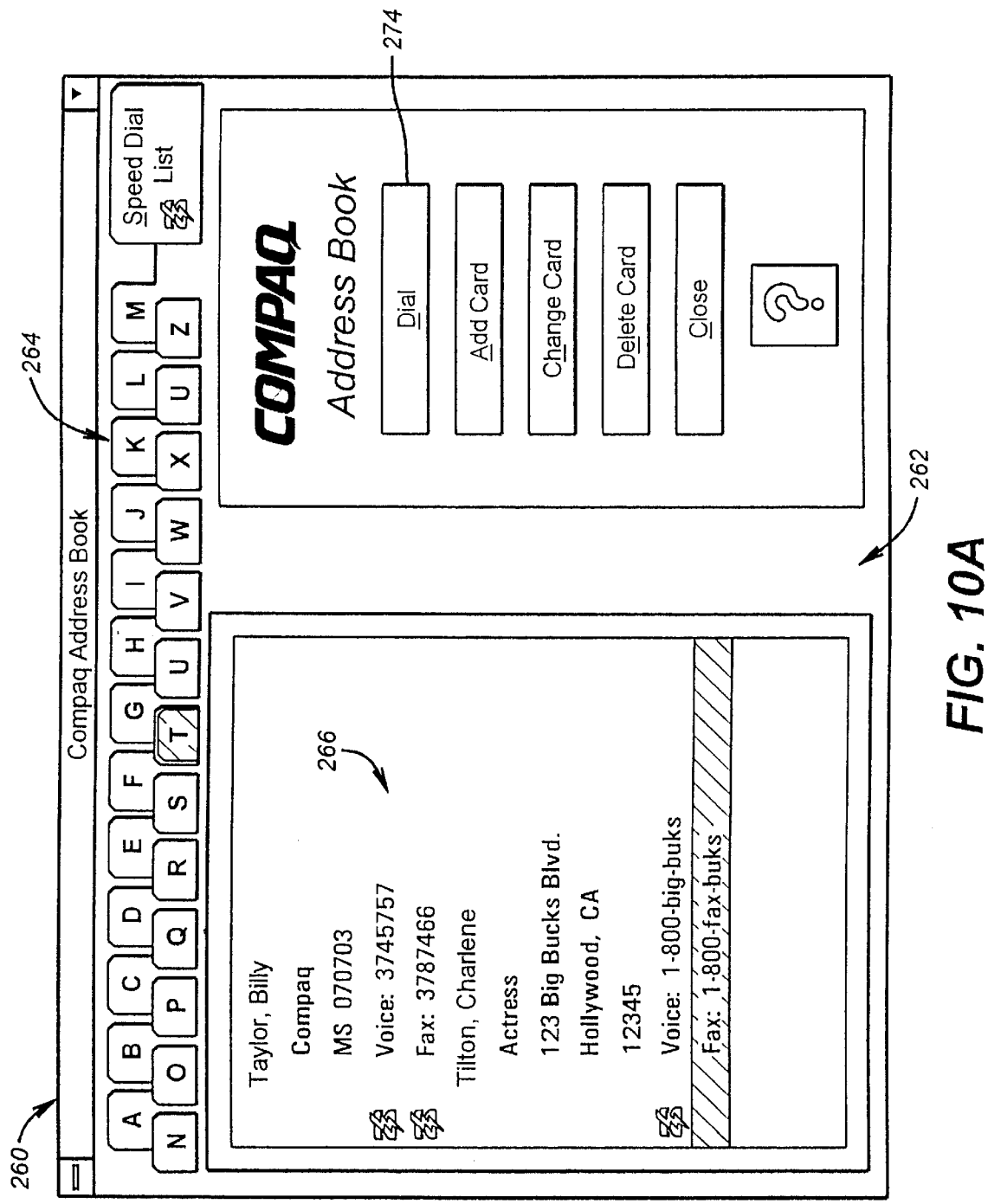
FIG. 10A and 10B are screen shots for an address book application.
Figure 10B:
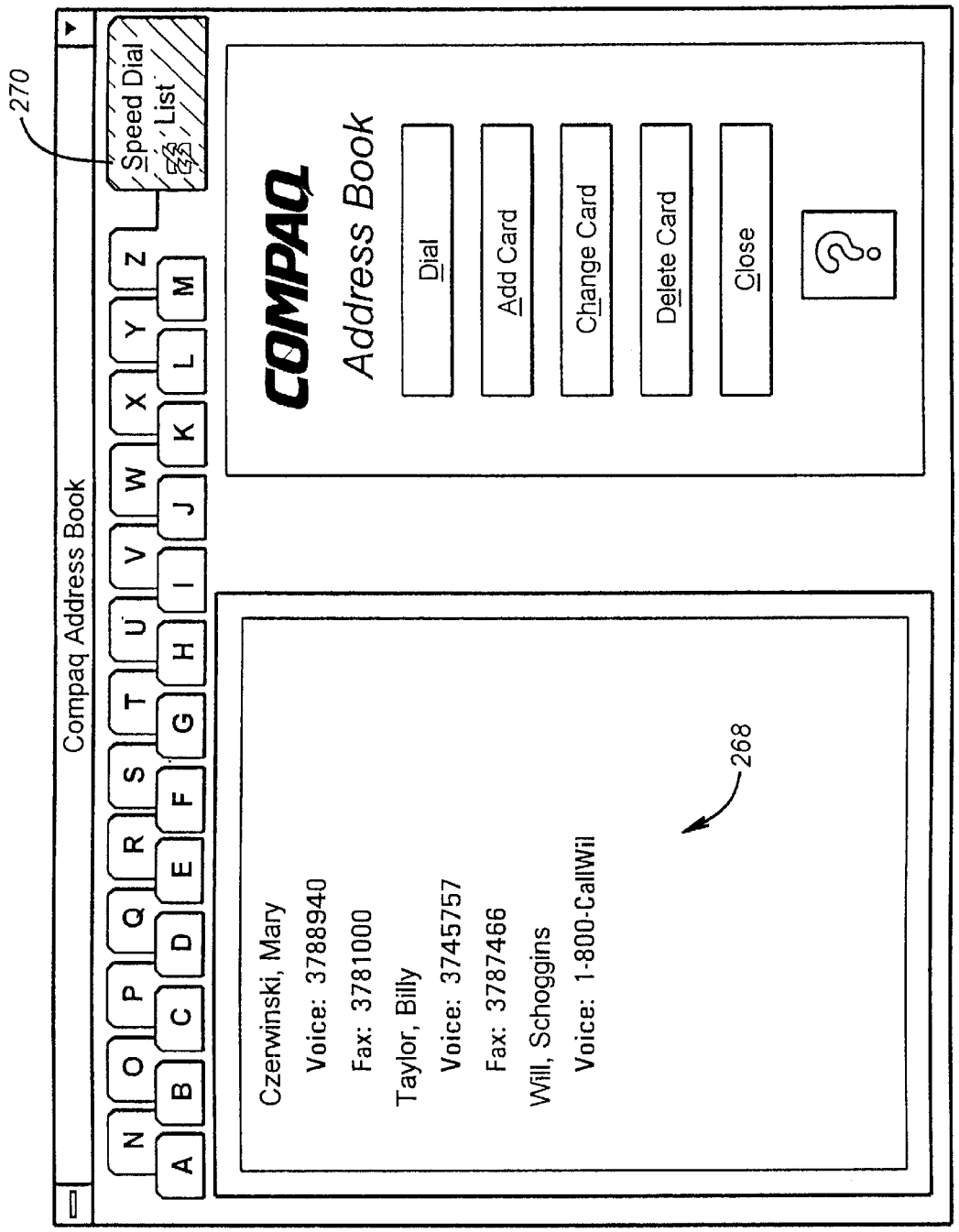
Figure 11A:
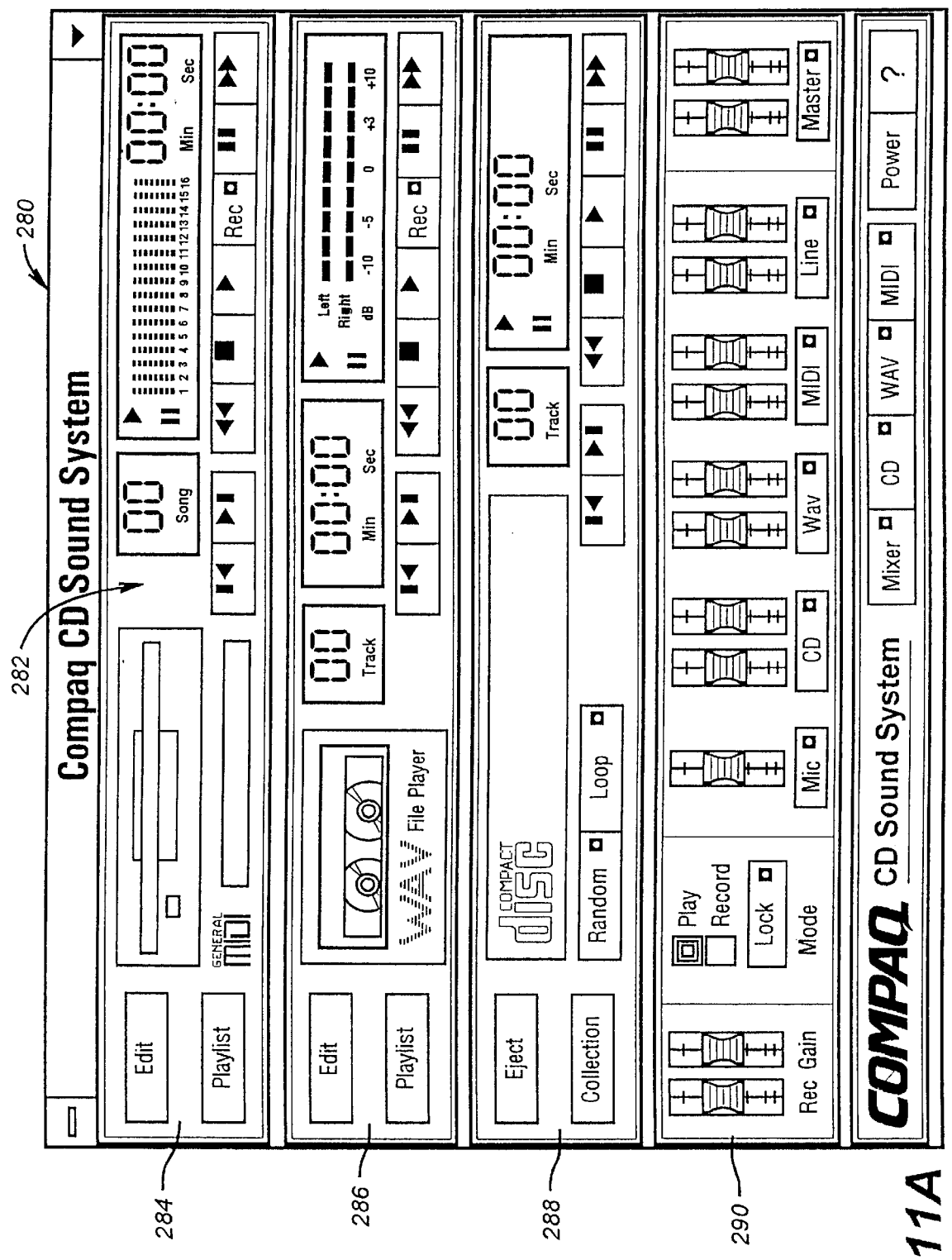
FIG. 11A–11D are screen shots for a sound system application.
Figure 11B:
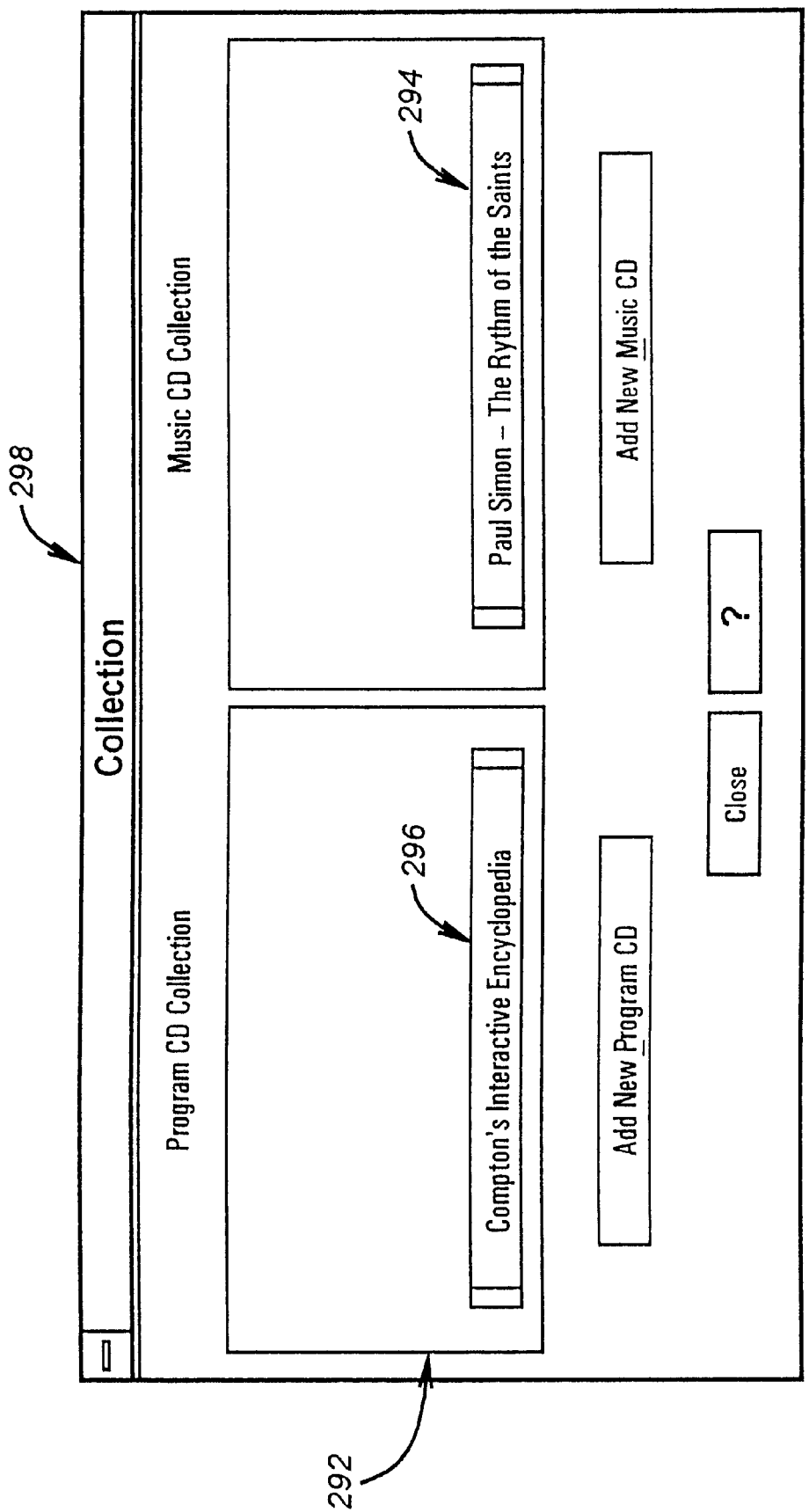
Figure 11C:
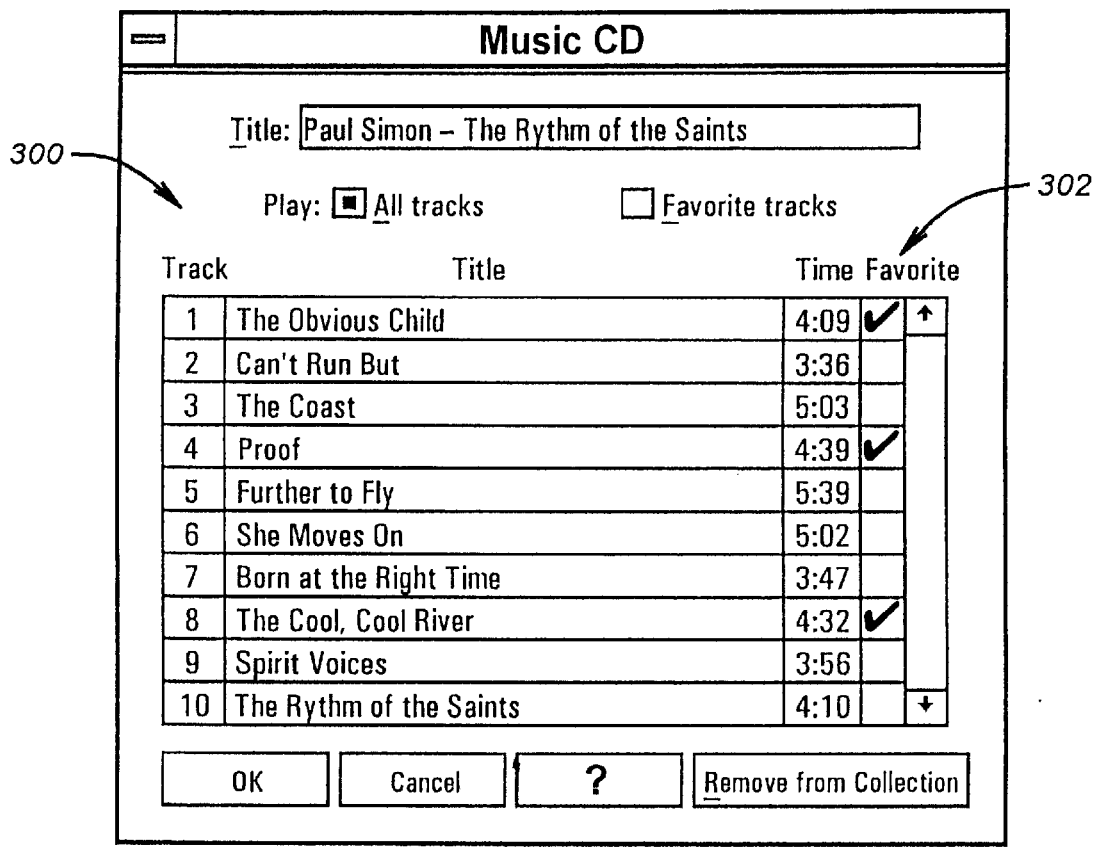
Figure 11D:
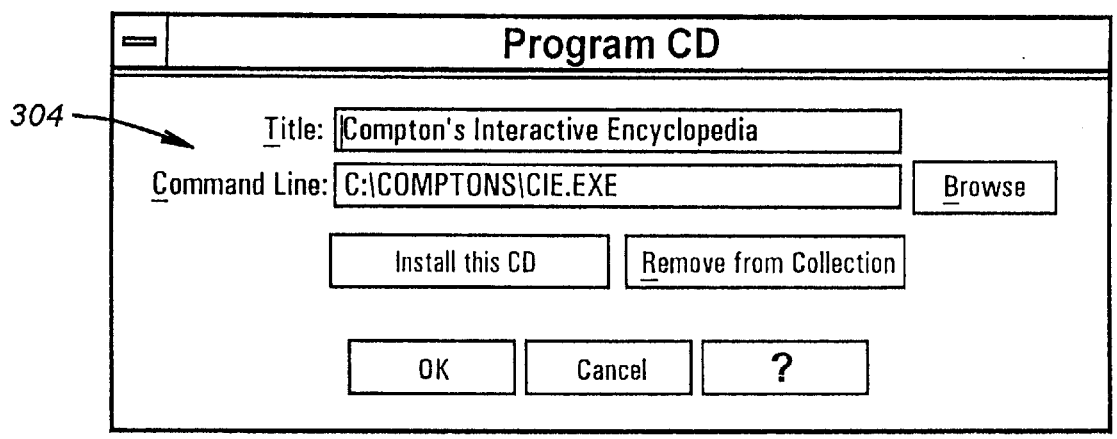

Referring to FIGS. 10A–10B, selection of the Rolodex icon 20 (FIG. 1) invokes an address book application 22. When this application is running, an address book window 260 is opened. The address book window 260 displays a graphic image 262 representing a card file which contains address and phone number cards, indexed alphabetically. To view a card, the user selects from a row of letter tabs 264 the letter corresponding to the name of the addressee. A list of names 266 beginning with the selected letter is then displayed, and the user can select an addressee from the list 266. If the user presses the "Dial" button 274, the TAM application is launched or brought to the foreground, and the phone number associated with the addressee is automatically dialed.

The address book also maintains a speed dial list 268, which is used to store the names and numbers of addresses frequently contacted by the user. To access the list, the user selects a "Speed Dial List" tab 270 in the window. Once the desired name is found, the user presses the "Dial" button 274 to automatically invoke the TAM application and dial the number. The address book may also be used to cross-reference caller ID information with the caller's name for incoming phone calls, as discussed above.

Referring to FIGS. 11A–11D, selection of the sound system icon 26 (FIG. 1) invokes a multi-media application 28, which opens a sound system window 280. The sound system window 280 displays a sound system graphic 282, which resembles a stereo rack. The sound system graphic 282 contains graphic images of a MIDI file player and recorder 284, a .WAV file player and recorder 286, a CD-ROM player 288 and a mixer 290, the functions of which are well known.

For the CD-ROM player 288, the sound system application maintains a collection 292 of frequently used CDs, including both music (and photo) Cds 294 and program Cds 296. The Cds in the collection are displayed in a graphic resembling an ordinary CD cabinet. The music Cds 294 and program Cds 296 are displayed in separate stacks for easy identification by the user.

The collection 292 contains user-provided information about each CD. When a CD is inserted into the CD player, the CD is identified, and if it belongs to the collection, the collection information is retrieved. For music Cds, the collection information 300indicates which tracks should be played when the CD is inserted: all tracks, or only certain tracks ("favorite" tracks) 302 selected by the user. For program Cds, the collection information 304 provides instructions for the automatic execution of programs on the CD.

Figure 12:
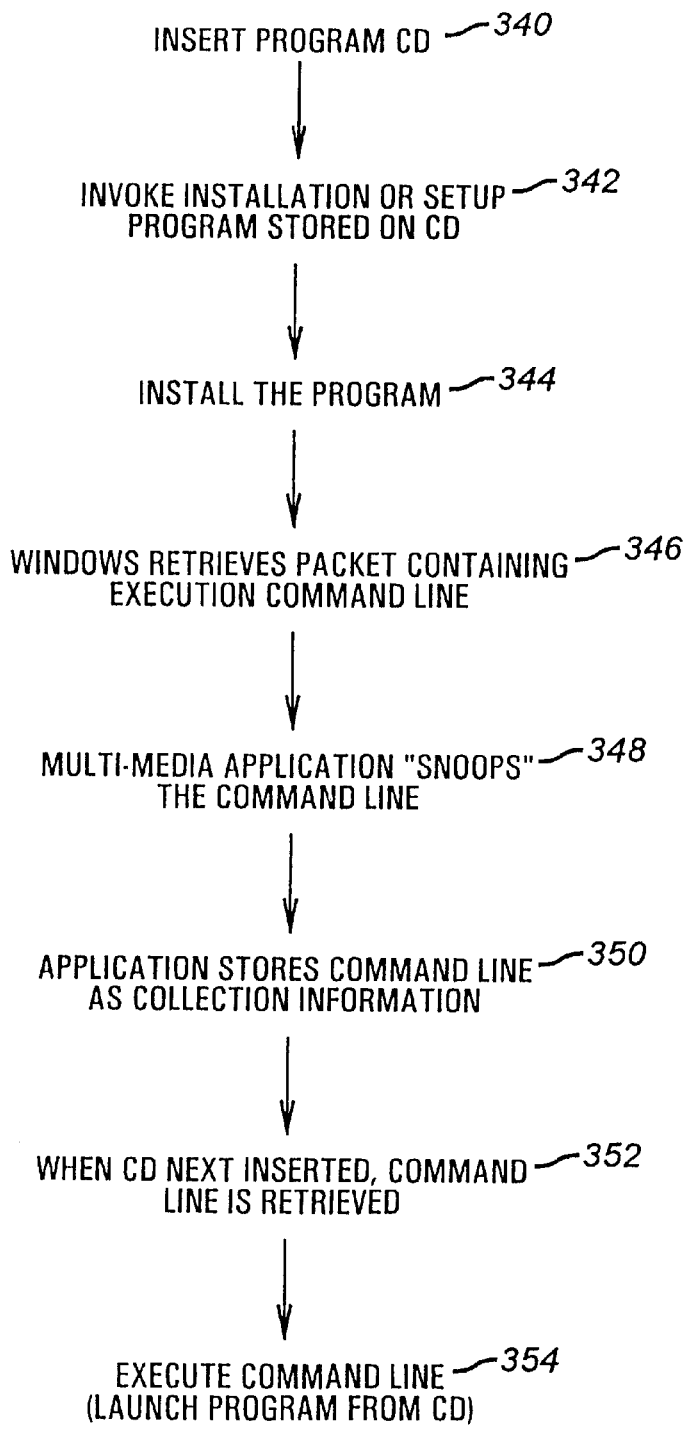
FIG. 12 is a flow chart for a "snooping" process.

Referring to FIG. 12, when a program CD is inserted 340 for the first time, it is installed by Windows. Once the program is installed, an executable command line must be provided to execute the program. Because novice users are usually unfamiliar with installation and command lines, the sound system application "snoops" the command line information from Windows during the installation process. Each program CD contains an installation or setup routine which is run 342 to enable Windows to locate and install 344 the executable program file. As Windows retrieves 346 the program execution command line from the CD, the sound system application seizes (or "snoops") 348 the command line and stores 350 it as collection information 304 for the program CD. Then each time the Cd is inserted, the command line is retrieved 352 from the collection information 304, and the program is automatically executed 354 without user intervention.

Figure 13A:
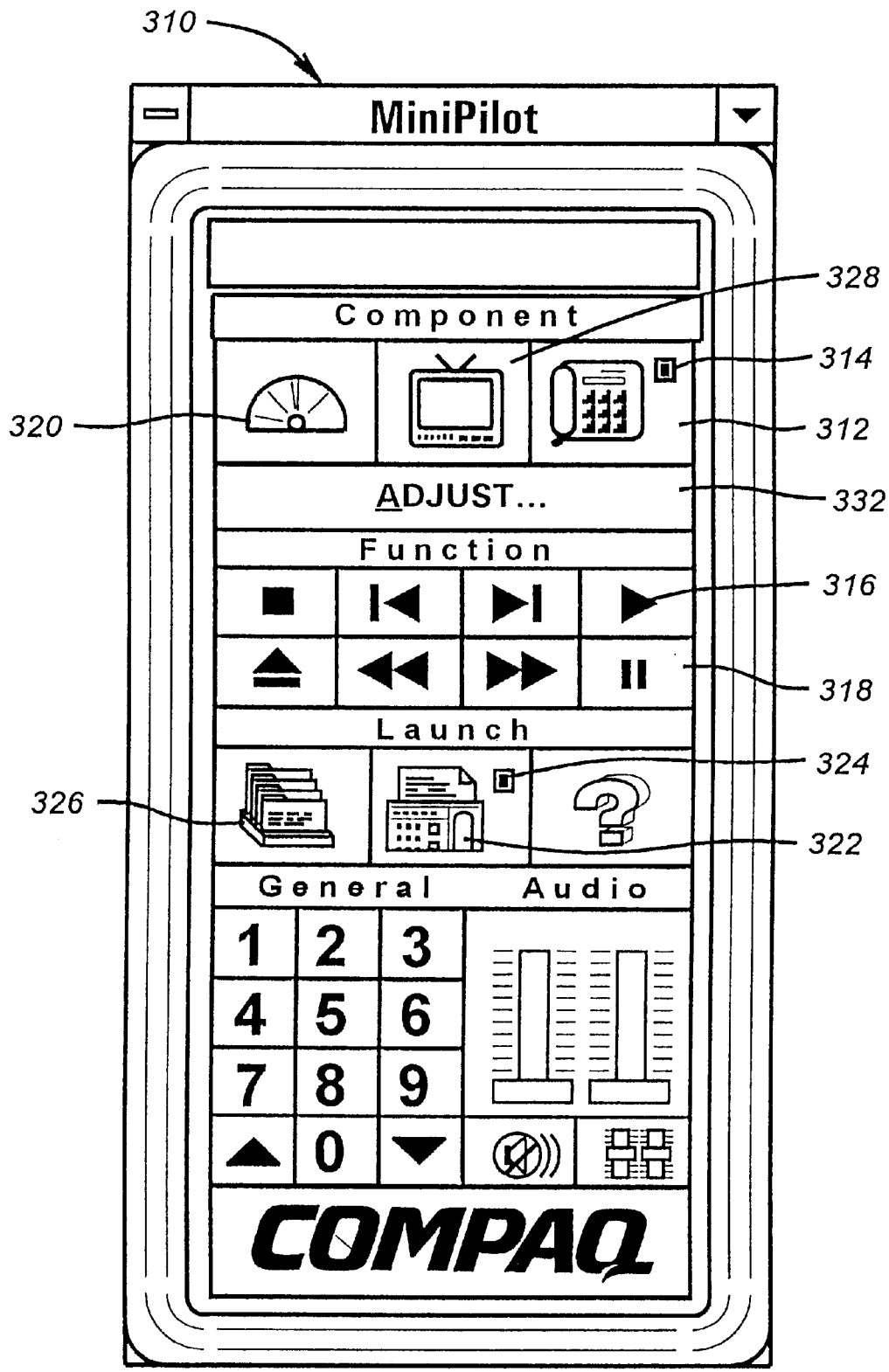
FIG. 13A and 13B are screen shots of a remote control for the electronic component interface.
Figure 13B:
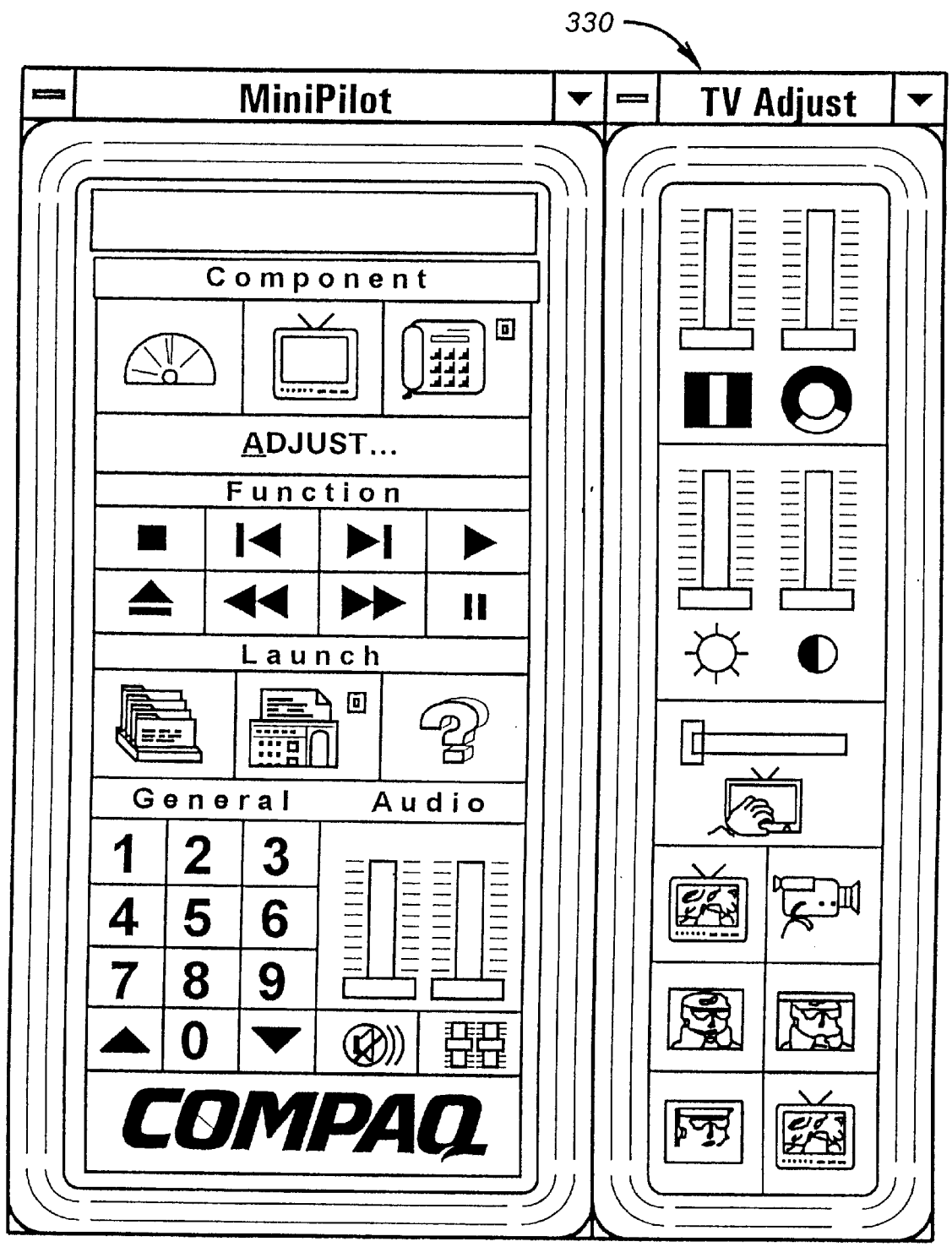

Referring to FIGS. 13A–13B, the electronic component interface provides a graphical remote control 310, which, when a program is running in the foreground, allows the user to manipulate the applications running in the background without bringing them to the foreground. The remote control 310 also launches and brings to the foreground applications which must be viewed to be manipulated by the user. The remote control, like the other graphical images, very closely resembles a real device, yet its appearance is artistically enhanced by the presence of miniature icons, each of which allows the user to control one of the applications.

On the remote control 310, a telephone/answering machine icon 312 includes a light 314 which blinks when the answering machine contains a new message. By selecting the icon, the user prepares the remote control 310 to control the TAM application. When the play icon 316 is pressed, the first message in the "General" mailbox is played. Other icons 318 allow the user to skip to the next message, skip to the previous message, fast forward or reverse within a message, or stop playing messages. All of this is done without the user entering the TAM window. A CD icon 320 allows the user to similarly control the stereo system.

A fax icon 322 contains a light 324 which blinks when a fax has been received by the fax application. Unlike the TAM icon 312 and CD icon 320, however, the fax icon 322 launches and restores the fax application, because the user must see the fax window in order to manipulate incoming faxes. Likewise, an address book icon 326 launches and restores the address book application.

A TV icon 328 allows the user to control a television tuner with the system remote control 310. When an "Adjust" icon 332 is selected, a TV remote 330 pops up next to the remote control 310. The TV remote 330 contains icons which adjust the features of the video window, such as color, brightness, or window frame style. The function of each icon on both the system remote 310 and the TV remote 330 is described below.

General features of the inventive architecture include:

Alerts the user when the phone rings—both visually and audibly.

Lets the user choose whether to take the call or take a message.

Displays CallerID data (where supported).

Lets the user set program options.

Lets the user "hear" the phone ring by matching the Telco cadence or optionally playing a .WAV file for each ring.

Provides a ring timer that automatically answers and routes a call after a number of rings (two values: one if the mailbox contains unread voicemail; another if it does not).

Lets the user choose whether to accept unsolicited FAXes or let callers leave voicemail.

In short, the Operator is a remote control for the TAM and FAX applications. It has two jobs: first, it alerts the user to an incoming call and lets them deal with it. Second, it launches the TAM and FAX application when the user wants to initiate a call. We will cover both scenarios separately.

Ideally, the Operator is launched from Windows startup and is always running. When restored, it runs in a standard dialog box frame as shown in Table 1. Only one instance is allowed; if the user tries to run a second copy, the copy simply restores and shows the initial instance and exits.

TABLE 1

| Control | Yes | No |
| --- | --- | --- |
| Restore | ✓ | ✓ |
| Move | ✓ | ✓ |
| Size | ✓ | ✓ |
| Minimize | ✓ | ✓ |
| Maximize | ✓ | ✓ |
| Close | ✓ | ✓ |
| Switch To . . . | ✓ | ✓ |

Of course, users can place a call or send a FAX via the TAM and FAX applications. They also can "jump" to those applications via the Operator screen. When there is NO incoming call, the Operator's window looks like FIG. 5.

The help bubble in FIG. 5 speaks to the user in simple, concise sentences; in this case, simply by asking "What would you like to do?" The user may:

Go elsewhere via standard Windows navigation minimize the Operator via standard Windows controls.

Press Place a Call which invokes/restores the TAM application, brings it to foreground, and displays the main screen.

Press Send a FAX which invokes the FAX application and pseudo-presses the Create FAX button to launch the user directly into FAX creation.

Press Options to invoke the Operator's options dialog box.

Note that the TAM application will NOT provide its speakerphone functionality unless the PC or monitor has integrated speakers and a microphone (see the TAM and Setup specifications for more information). With external speakers, only the Answering Machine functionality is available. If no speakers are installed, the application cannot run. The ECI Setup utility will report the customer's speaker/microphone configuration. Obviously the configuration determines how the Operator's screens and buttons are presented. The screen shown in FIG. 5 assumes fully integrated speakers and microphone. If speakers and microphones are not integrated, the Place a Call button is reworded to say Get Messages and launches TAM with only its Answering Machine enabled. If speakers are not installed, the Place a Call button is removed (since you must have speakers to hear anything!).

When the telephone rings, the application will move immediately to foreground in its current iconized or restored state. Note that when iconized, the user can simply double click the icon to restore the window.

Bombay will notify the application of each ring and show the cadence. In the Options dialog box, the user can choose to "hear" the phone ring (default), matching the Telco cadence, or play a .WAV file for each ring. The Operator will count rings in preparation for taking the call automatically.

Figure 6F:
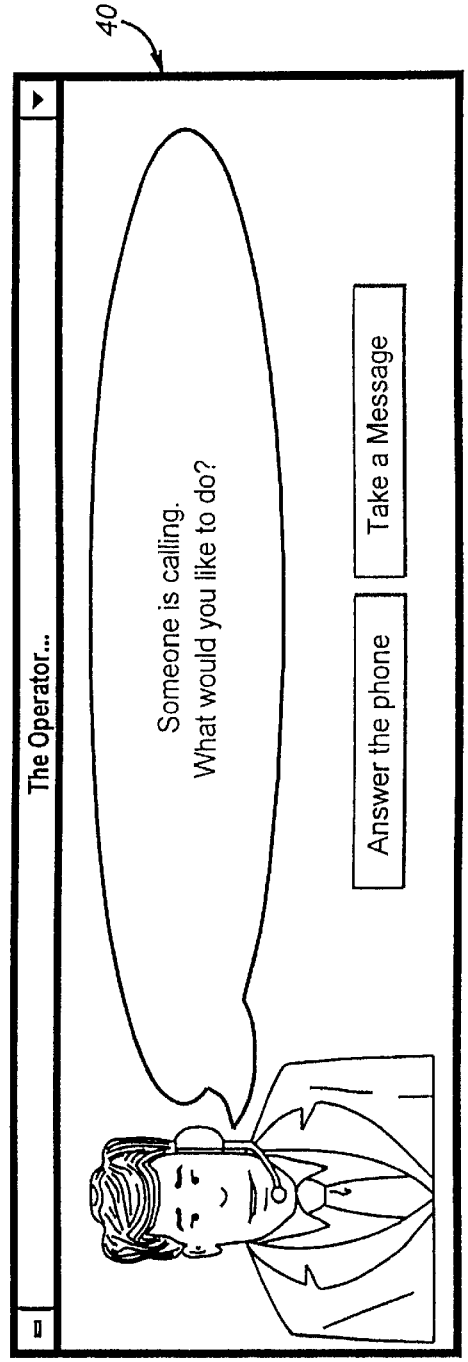
FIGS. 6A–6F are screen shots of an option-setting mode of the Operator.
Figure 6A:
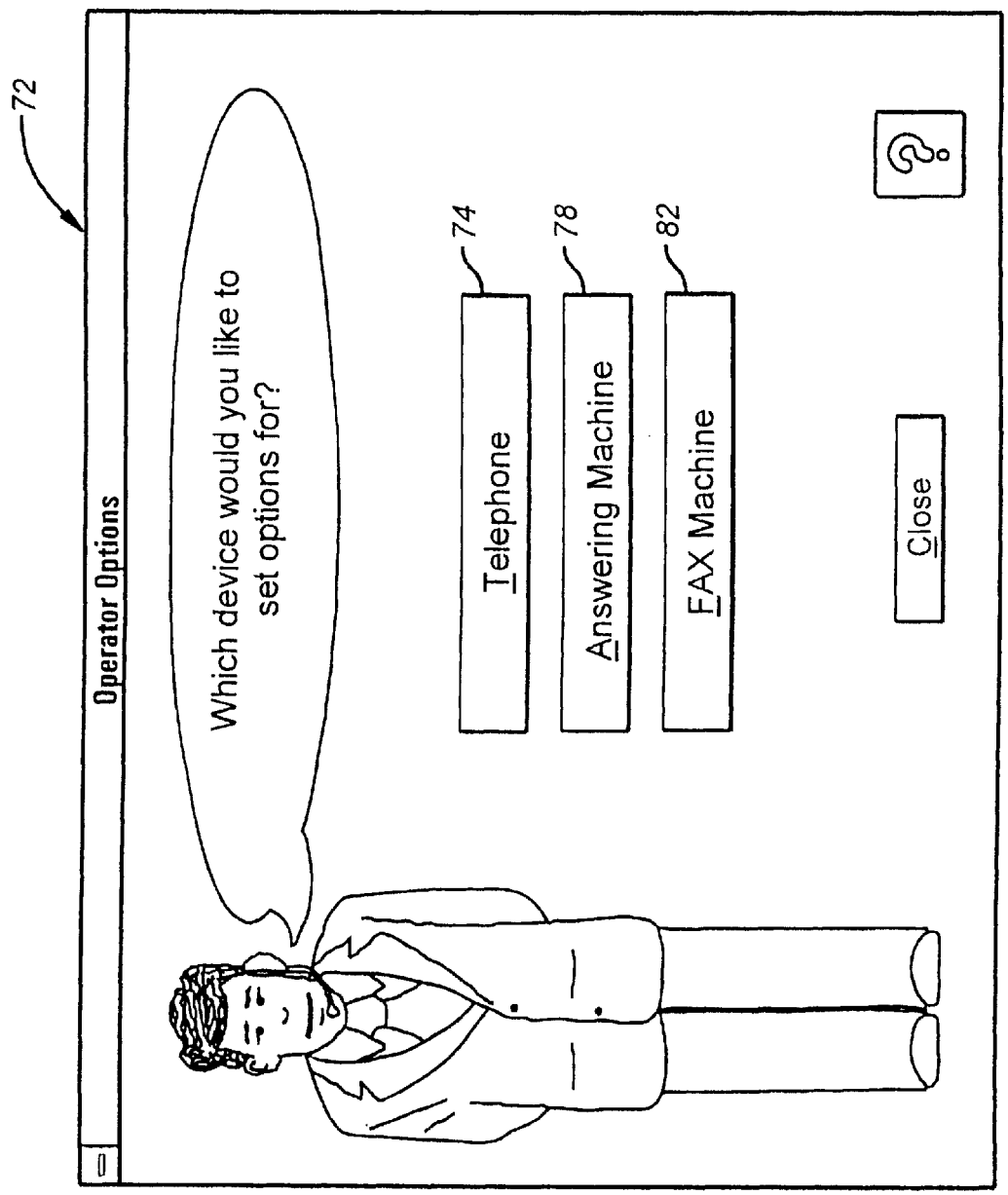
Figure 6B:
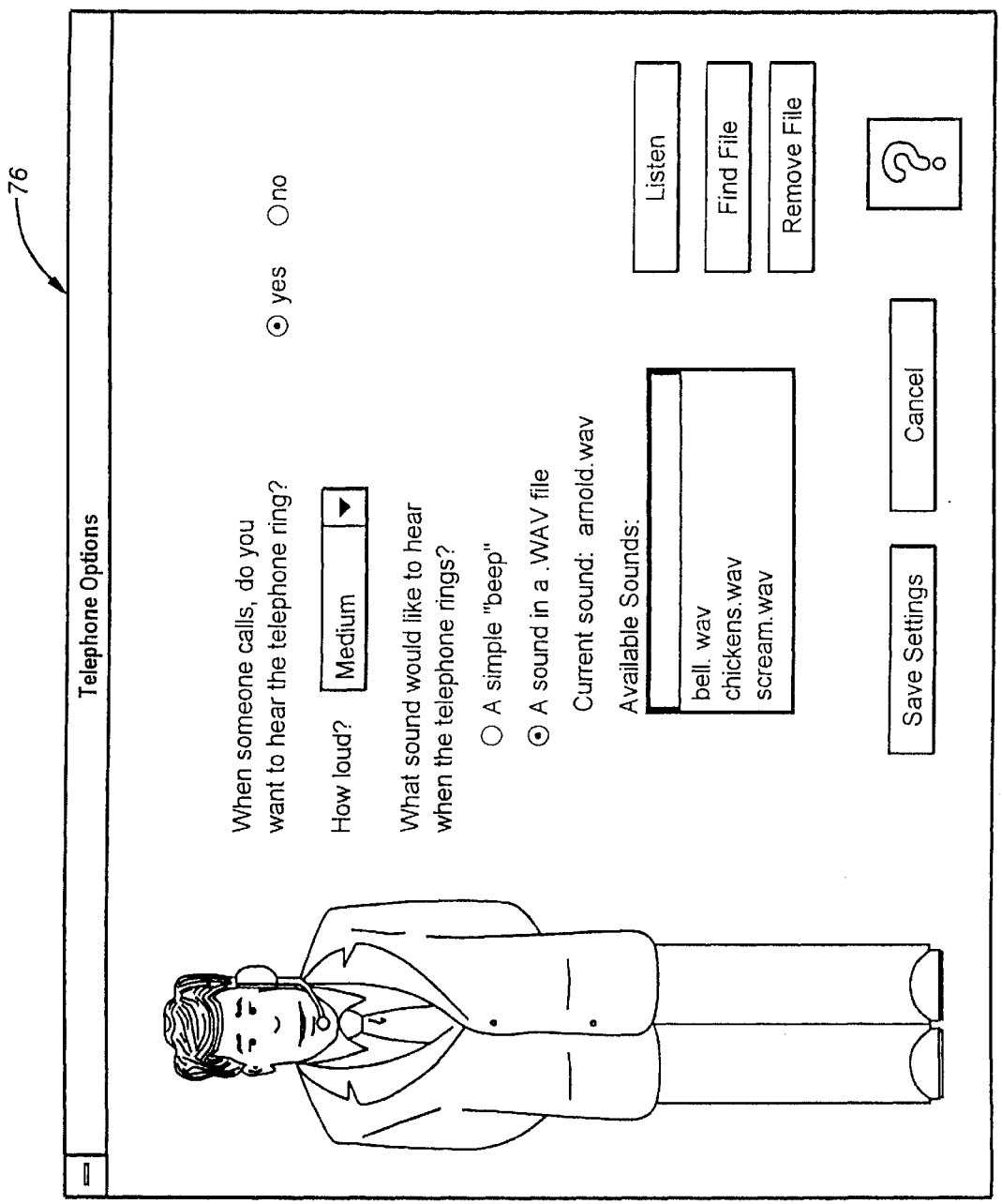
Figure 6C:
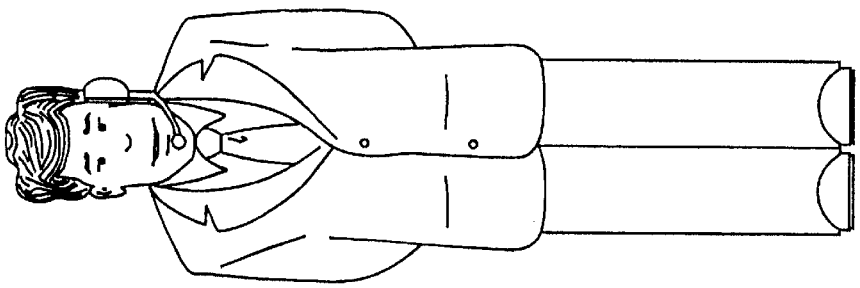
Figure 6D:
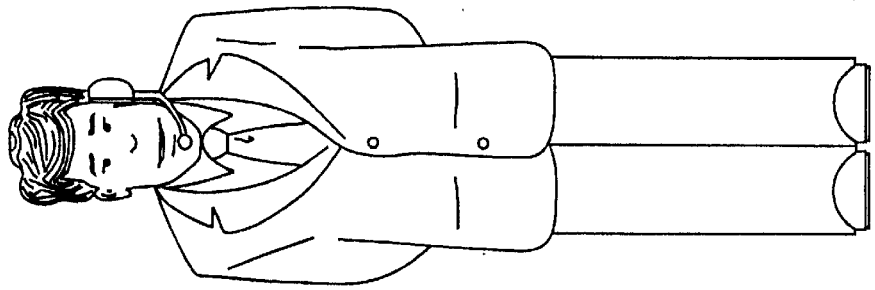
Figure 6E:
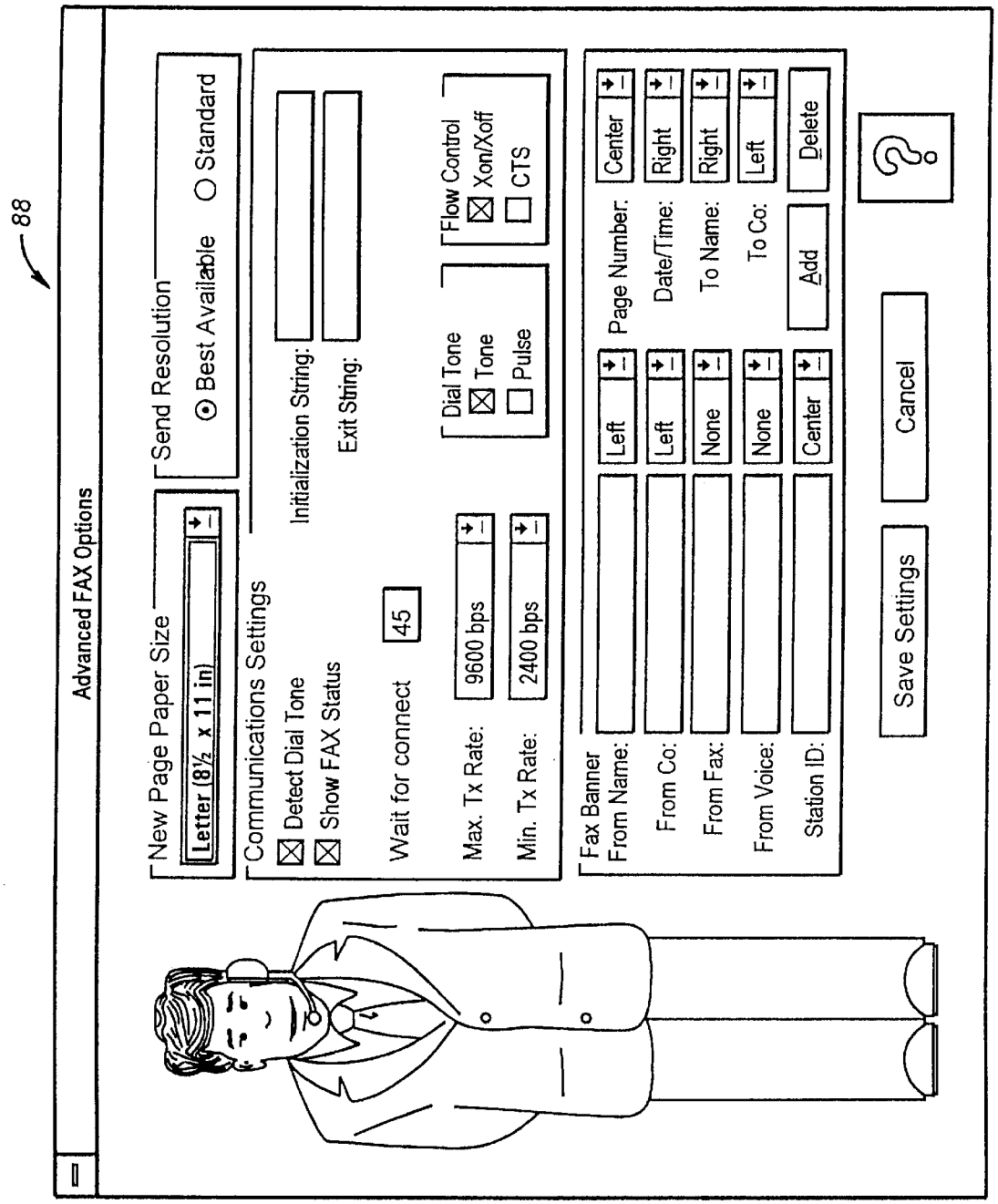

When the Operator is restored, its window looks like FIG. 3B. The bubble help tells the user who is calling if CallerID information is available. If not, the middle line is omitted and the two remaining lines are displayed in the center of the bubble, as shown in FIG. 6H.

There are several possibilities while the phone is ringing. The user can:

Select Answer the Phone. This tells the Operator you want to talk to the caller. By default, it invokes the TAM and commands it to route audio in/out via the PC's speakers and microphone.

Select Take a Message. This tells the Operator you want to let the caller leave a message.

do nothing (minimize, go elsewhere, or otherwise let the ring timer expire). This tells the Operator you want to let the caller leave a message.

The caller can simply hang up. In this case, the Operator returns to its initial state (restored or minimized) and shows the application that previously was in foreground.

Exactly how and when the Operator routes an incoming call is based on several factors:

Whether the owner will accept unsolicited FAXes (set in Options screen).

Whether the caller is allowed to leave a message (set in Options screen).

The number of rings to count before answering automatically (set in Options screen).

Whether the caller is a FAX machine or a real person.

Whether the user has installed a microphone.

As mentioned before, how the Operator handles a call depends on the customer's speaker/microphone arrangement. The screen shown in FIG. 9F is used when speakers/microphones are fully integrated. If speakers are not integrated, Answer the Phone is removed and the Operator will only answer the phone if Take a Message is pressed or if the ring count expires (routed to answering machine or FAX). If no speakers are installed, both buttons are removed and the Operator answers the phone only if the ring count expires (routes call only to FAX, if FAX).

One of the Operator's most useful traits is its ability to discern incoming FAX calls while also mimicking an answering machine. By default, all calls are routed to the TAM application. However, when the phone goes offhook, the Operator must start a short countdown timer: 8 to 10 seconds is probably sufficient; and then launch the TAM. If FAX carrier is heard before the timer expires, the TAM must be told to "shutdown" and the call is rerouted to the FAX application without user intervention. This must be done quickly to prevent the calling FAX machine from timing out.

The chart of FIG. 9G shows the sequence of events, beginning with the first ring. As the diagram shows, the Operator always answers the phone and routes the call to the TAM application (in either voice or answering machine mode). If, within some reasonable time (6–8 seconds), FAX carrier is detected, the Operator must tell the TAM to relinquish control of the line, launch the FAX application, and command it to receive the FAX. When control is revoked from the TAM application, any greeting playback or message recording already in progress is stopped. Any partially recorded message is discarded.

The following rules apply when launching the FAX and TAM applications:
When placing a call or sending a FAX:
If the application is already running, simply bring it to foreground and shoe Restored.
If the application is NOT already running, launch it, bring it to foreground, and show Restored.
When taking a call:
If the application is already running, simply bring it to foreground in its current state (Restored or Minimized).
If the application is NOT already running, invoke it as iconic and bring it to foreground.

This method lets the user decide "how much" of each application they want to see. Since the Operator is something of a Remote Control for the telephony applications, it can handle most routine calls. Placing calls and sending FAXes requires the respective applications—therefore they are shown Restored. Taking calls can be handled, minimally, from the Operator screen. If they want the "real" application, they can just double-click its icon.

What happens to the icons and focus after the call completes? Ideally, you would want the software to "get out of the way" and let the user keep working. However, one could also argue that the software should not second-guess the user—instead, let them minimize/hide the applications to suit themselves. Compaq's Human Factors group will be testing user preference in this area. But note that a final decision will probably NOT be made until the working software (early Beta) is tested.

When handling an incoming call, the Operator's screen changes depending on the type of call: voice, FAX, or voicemail. During a pure voice call (talking to the caller), the screen looks like FIG. 3C. Hang Up terminates the call immediately. Take a Message reroutes the call to the Answering Machine. It is useful, for example, when the caller wants to leave a message for someone who is away. The slider adjusts the audio volume. When receiving a FAX, the Operator screen looks like FIG. 3E. Again, Hang Up terminates the call immediately and discards any partial FAX received. Finally, the screen looks like FIG. 3D when someone is leaving a voicemail. In this mode, the call is routed to the Answering Machine but, presumably, someone is listening (screening the call). The slider switch can be used to control the volume. Pressing Talk stops greeting playback/message recording and treats the call as if the user had pressed Answer the Phone. Any partially recorded message is discarded.

The user may press the Options button to set program options whenever the Operator is not taking a call (see FIG. 5). The Options screen looks like FIG. 6A. The three buttons let the user set options for the telephone, answering machine, and FAX. As can be seen in FIGS. 6B, 6C, 6G, 6H and FIGS. 6D and 6I, the options affect not only their respective devices, but the Operator's behavior as well. The options are simply organized this way for coherence.

Unfortunately, not all FAX options can fit within the ECI metaphor. Some topics, such as modem settings and cover page information, are somewhat confusing. To solve this, we will (A) assume reasonable defaults (shown in FIG. 6E), (B) "hide" expert settings under the FAX option screen's Advanced Options button, and (C) rely on thorough online help to guide a wayward novice in and out of this area. The screen looks like FIG. 6E, where the Save Settings and Cancel buttons return to the previous screen.

Windows allows only one task at a time to use a serial port. If a port is in use and another program asks for it, Windows displays an offensive, somewhat cryptic message trying to report the collision. One of ECI's goals is to help insulate the user from this message.

This code could probably be part of the Operator since it must answer a ringing phone anyway. Rather than respect FutureSoft's existing driver, we will simply list the functional requirements we need:

1. Cooperating telephone applications will request use of the serial port via a messaging API. If access cannot be granted, a MessageBox() will appear telling which application has control of the port. If granted, the Operator passes the serial port handle to the requesting application. Similarly, the application must relinquish the handle when it is finished using it.

2. For non-ECI compliant applications, a separate "loader" applet can ask CAPI to relinquish a serial port, and provide the new owner's window handle. CAPI, in turn, can reassert ownership of the port when the comm application completes.

As you can imagine, the answering machine and FAX machine are useless if the PC's hard drive becomes full. To help prevent the problem, the Operator will occasionally check the PC's hard drive to make sure sufficient disk space exists. It will work off of two thresholds set in the Options screen. The first threshold decides the point at which the Operator starts to warn of the impending problem (e.g., when 10% or less free space remains). When the threshold is reached, the Operator displays a panel like FIG. 4A. This panel alternates with the "What do you want to do/place a call/send a FAX" panel—is visible for a predetermined amount of time and then the previous panel is restored. (The interval should be set in the INI file in the format. For example; WARN=aaa,bbb where aaa is the number of seconds the warning panel is visible and bbb is the number of seconds before the warning is shown again. Default should be something reasonable, such as WARN=10,20.) We also need to alert the user with a mild beep—nothing so obvious that it becomes too bothersome. The user can click on the Help button to receive a polite description of the painfully obvious—disk space is required in order to record answering machine messages and receive FAXes. If they ignore the warning and eventually reach the second threshold, the panel of FIG. 4B appears.

Again, this panel alternates with the "What do you want to do/place a call/send a FAX" panel—same time interval for alternating the screens, and the same warning tone. As before, the user can click the Help icon to get hints on how to free disk space by deleting unwanted files. At this point, the Operator should:

Refuse to accept incoming FAXes.

Refuse to dispatch calls to the answering machine.

Gray-out the Take a Message button in all panels.

As disk space is released, the Operator should revert to its "first threshold warning", as appropriate, and finally to its normal operation.

In order for programs to locate ECI applications (whether they are running), each application must have a static Windows Class name. In doing so, programs can simply use FindWindow( ) to locate a given ECI application. See Table 2. Note that these class names are NOT translated.

TABLE 2

| ECI Application | Class Name |
|---|---|
| Operator | Compaq Operator |
| TAM | Compaq TAM |
| FAX | Compaq FAX |
| Multimedia Sound System | Compaq MMediaSS |
| Card File | Compaq CardFile |

All hardware configuration information, serial port selection, etc. will be recorded in Plug and Play BIOS. Given the hardware dependency of this project, the software will refuse to run unless the conditions in Table 3 are met. These conditions are in addition to any file, DLL, driver, etc. dependencies the software may have. If any test fails, the software will produce an applicable error message in a standard MessageBox( ) and then exit.

TABLE 3

| Condition | Application |
|---|---|
| Running on a Compaq PC | All |
| Windows version 3.1 | All |
| Bombay modem / TAM audio driver present | FAX.TAM |
| ESS Audio Driver / hardware present | TAM.Media Rack |
| Speaker(s) present | TAM.Media Rack |

In order to coordinate access to the ESS audio hardware, all applications must use a similar method for controlling their audio settings. We have tentatively chosen Microsoft's MSMIXMGR.DLL from Windows Sound System 2.0.

The TAM application manages the voice portion of the Bombay modem and also implements voicemail (the answering machine appliance). This paper describes the software's functional characteristics. The actual technical information needed to implement the code may be found in several sources:

The Bombay Modem Functional Specification (Compaq).

The Bombay TAM Audio Driver Functional Specification (Compaq).

Windows Multimedia Programmer's Guide (Microsoft).

Windows Multimedia Programmer's Reference (Microsoft).

Despite its fairly straightforward appearance, this application may be difficult since it uses several system components at once: the call discriminator/serial port arbitrator, the sound card via Windows MCI, the Bombay audio DSP via Windows MCI, and the actual Bombay modem itself. The chart of FIG. 9E shows the relationship between the components. Essentially both the ESS audio chip and the Bombay TAM DSP will be driven via Windows' MCI WAV series. By opening the appropriate device via Windows MCI services, the application can direct output to, or receive input from either the ESS or Bombay. The ESS chip manages the PC's speakers (2-speakers, stereo) and built-in microphone. Bombay TAM DSP provides access only to the handset speaker and the microphone and to the local Telco wire service.

While TAM's restored window looks like FIG. 9F, the application runs in a traditional Windows dialog box and supports the controls shown in Table 4.

TABLE 4

| Control | Yes | No |
|---|---|---|
| Restore | ✓ | |
| Move | ✓ | |
| Size | | ✓ |
| Minimize | ✓ | |
| Maximize | | ✓ |
| Close | ✓ | |
| Switch To | ✓ | |

The graphic always appears center screen and can be moved or iconized (but not sized). It can be viewed from the Windows shell, from the ECI shell, or via the ECI Address Book application. Note that when the Address Book launches the TAM application, it always provides a telephone number to dial. Only one instance of the TAM application may be running at a time; however, additional instances may run long enough to tell the first instance to dial the number. From this screen, the user can take or place calls, consult the Address Book, listen to messages, record memos to other family members, or access other features via the Mailboxes button. We will cover each topic individually.

To place a call, the user simply provides a phone number and presses the Dial button. Users may choose dial digits by:

Clicking digits on the GUI's phone pad: Each digit appears in the LCD status bar. When the user presses Dial, the modem goes offhook and the number is dialed. The user presses Clear to erase the bar and start over.

Pressing numeric keys on the keyboard: Each digit appears in the LCD status bar. When the user presses Dial, the modem goes offhook and the number is dialed. The user presses Clear to erase the bar and start over.

Lifting the handset and dialing the complete number: Lifting the physical handset and pressing buttons will, of course, introduce dialtone and digits will be dialed as keys are pressed. When the receiver goes offhook, the application will erase any numbers already in the LCD status bar and begin echoing keys as they are pressed (by detecting their DTMF tones).

Note that we cannot support only numeric characters in the phone number string! Some users will, no doubt, want to hook into a switch or centrex where alpha characters must be used to select lines, features, etc. Additionally, the user can dial from the Address Book by clicking the button showing the Address Book icon. Special note, we must be able to send DTMF from the keyboard, keypad graphic, or handset after connect to support dialing-up online services. (User must be able to tap on the GUI keypad to send DTMF tones after a connect.) When the user finally presses Dial, the graphic changes to look like FIG. 7B. We will provide an animation sequence showing the handset lift offhook when placing a call. As long as the phone is offhook, the controls are in the state shown in Table 5. The LCD bar shows information about the number being called. At a minimum, it shows the number dialed. At best, it should show the name of the called party. The name is available immediately when the user dials from the Address Book. When dialing from the keypad or handset, however, the application will have to look up the information in the Address Book once the Dial button is pressed. The user can terminate the call via the Hang Up button in either this application or in the Operator, at which time the window reverts to the "General" mailbox screen.

TABLE 5

| Control | State |
|---|---|
| All recording controls and pushbuttons | Grayed out - - inactive |
| Clear, Dial/Answer and Address Book buttons | Grayed out - - inactive |
| Keypad | Visible but inactive |
| Help | Displays Help Screen (TBD) |
| Speaker Volume | Controls speaker volume |
| Hang up | Terminates the call |
| Mute | Mutes the microphone |
| Windows Close System Menu Command | Grayed out - - inactive |

When the Operator tells TAM to answer the phone and talk, the window moves to foreground in its current state (iconic or restored). The restored graphic is the same as the one shown in FIG. 7B. The Operator may, at some point, send two levels of CallerID information: (1) the basic information taken from the wire; and (2) reconciled information derived by looking up the number in the Address Book. In either case, the information is displayed in the LCD bar. Other than that difference, all the controls work the same as for placing a call. Hangup hangs up the phone, the volume controls adjust speaker and microphone volume, etc.

The graphic for the Take a Message function looks just like FIG. 7B. It shows the main screen with the phone offhook and any available CallerID information shown in the LCD window. The difference, however, is that the TAM lets the user leave a voicemail message. Both sides of the conversation (the recordings and the caller's audio) may or may not be heard based on an option set in the Operator.

TAM supports two modes at this point: Voicemail mode and Owner mode. In Owner mode, the caller (after providing the password) can change greetings, listen to voicemail, change mailboxes, etc. We will cover that topic. For now, we will discuss only Voicemail mode. TAM supports a level mailbox structure for recording voicemail. It works by always declaring a mailbox as "ACTIVE"—that is, the active one will receive any voicemail left by the caller. By default, mailbox 0 (General) is active while voicemail is active. Table 6 describes the TAM's behavior while receiving voicemail.

TABLE 6

| Step | Action | DTME Command |
|---|---|---|
| 1. | Make mailbox 0 active | |
| 2. | Begin playing active mailbox's greeting or WAV file 8 if none defined | |
| 3. | Honor DTMF command to stop greeting playback. If heard, stop playback and go to step 5 | # |
| 4. | Wait for playback to finish | |
| 5. | Play RECORD TONE to signal start of recording. Begin recording voicemail into active mailbox | |
| 6. | Honor DTMF command to change mailboxes. If heard, go to step 13 | 0–9 |
| 7. | Honor DTMF command to stop recording. If heard, go to step 17 | # |

TABLE 6-continued

| Step | Action | DTME Command |
|---|---|---|
| 8. | Honor DTMF command to enter Owner mode. Ignore sequences that timeout. If heard, go to step 20 | *0nnnn-*9nnnn |
| 9. | When recording complete, close file and add to active mailbox. | |
| 10. | Restore graphic, hang phone up, etc. | |
| 11. | ********** END OF CALL ********** | |
| 12. | | |
| 13. | Is specified mailbox valid? | |
| 14. | YES: delete recording in progress and go to step 1 | |
| 15. | NO: delete recording in progress and go to step 2 | |
| 16. | | |
| 17. | Stop greeting playback | |
| 18. | Go to step 5 | |
| 19. | | |
| 20. | Valid mailbox requested? | |
| 21. | NO: delete recording in progress and go to step 2 | |
| 22. | Valid password? | |
| 23. | NO: delete recording in progress and go to step 2 | |
| 24. | Delete recording in progress | |
| 25. | Enter Owner Mode (see Remote Access discussion later in this document) | |

The software supports ten voicemail boxes. Table 7 describes their attributes. Mailboxes are numbered 0 through 9. The numbers are significant ONLY when dealing with the DTMF commands; press 1 to leave a message for Suzy, 2 for Bob, and 3 for Leroy. Their three mailbox numbers are 1, 2, and 3, respectively. Mailbox 0 is always the default mailbox. Its default name is General and cannot be changed (no provision in the software). The user can create up to nine additional mailboxes. All mailboxes have an associated greeting file that plays when the mailbox is opened (when taking a phone call). Boxes 1–9 can be password protected to prevent other family members from listening to their messages. Mailbox 0 also has a password, but it is only used when listening to messages via DTMF remote access to prevent tampering.

TABLE 7

| Mailbox Number | Default Name | Has Greeting? | Password Protected Local | Password Protected Remote? | Can Leave Memo? |
|---|---|---|---|---|---|
| 0 | General | Yes | No | Yes | Yes |
| 1–9 | None (user defined) | Yes | No | Yes | Yes |

As you saw earlier, the main screen displays an LCD Status Bar, a small blinking dot, and a series of buttons. The dot is visible and blinking ONLY when there are unread (unlisted?) messages in one of the mailboxes. By default, the General mailbox status is displayed. As the graphic shows, it contains two new messages. This format is always used to report the mailbox status:

mailboxName: # NEW
For example, they might say:
  Will's Mailbox: 2 NEW
  Mom's Stuff: 0 NEW The Next Mailbox button cycles to the next defined mailbox. If no others are defined, this button is invisible. Note that new messages (those not yet listened to) stay new until you listen to them. Further, new messages stay new until you leave the mailbox. Once they lose their new status, you must go to the Mailboxes screen if you want to access them again. More about that later.

The buttons under the LCD display manipulate the messages in the named mailbox. If there are no new messages in a mailbox, the buttons are grayed out. Otherwise, Table 8 describes the relevant button actions.

TABLE 8

| Button | Action |
| --- | --- |
| ▶ | Plays all new messages back to back, with 3 seconds of silence in between |
| ≪ | Plays the previous new message from the beginning |
| ■ | Stops playback |
| ≫ | Begins playing the next new message from the beginning |
| Delete | Deletes the message currently playing. This button is grayed out if no message is playing. The button is visible during message playback and for 3 seconds of silence immediately after. |

All mailboxes may be password protected. When the user presses one of these buttons in a protected mailbox (except General), they are prompted to enter the password as shown in FIG. 9F(a). If they provide the wrong password, they are notified via the MessageBox( ) shown in FIG. 9F(b) and the button press is ignored. This sequence repeats each time they press one of the aforementioned buttons. Once they enter the correct password, they are not prompted again as long as they remain in the mailbox. Once they leave the mailbox, they must satisfy any password imposed on the new mailbox. Note that passwords are optional—some mailboxes may be protected, while others are not. The General mailbox has a password that is used for remote access only. We never prompt for a password to access the General mailbox from the PC keyboard.

Message playback is done via the PC speakers. Playing messages through the handset is not supported. To promote security, if the application is idle for 30 seconds, the screen returns to the General mailbox. (This feature needs to be implemented but inactive by default. Activate it via an INI file switch.) The actual timeout (seconds) should be configurable in an INI file but not in the GUI. The screen also has the buttons shown in FIG. 9G.

Memos are useful reminders to other family members. For example, Mom could remind Dad to stop for milk and bread on the way home from work. To leave one, just press a "Next Mailbox" (FIG. 9H(a)) button to move to the desired mailbox. Then press the "Memo" (FIG. 9H(b)) button (no password is required). A screen like FIG. 8C appears and is superimposed on the main screen with the handset visible. The mailbox name is displayed at the top of the screen. The object is to leave a voicemail just as if it had been taken from the phone line, except the words "Memo" will replace the data ordinarily left by CallerID. The waveform drawing at the top would be nice, but not required. Optionally, an LCD bar similar to the VU meter on home cassette recorders might be used. The object is to give the user some entertainment/feedback while the memo is recorded. The buttons like those shown in FIG. 9I are active. When the user presses the Record button (▶), the handset lifts off the cradle (as it does when taking a call) and exposes the Hang Up and Mute buttons and the Mic Volume control. The Mute button is grayed out and inactive—the others work as intended. The PC's built-in microphone is used for input and the PC's speakers are used for playback. We do not support playback or recording via the handset. Recording or playback halts if the handset is lifted. If recording, the partial message is deleted.

Figure 9J:
FIGS. 9E–9G are screen shots for a speakerphone/answering machine application.
Figure 9K:
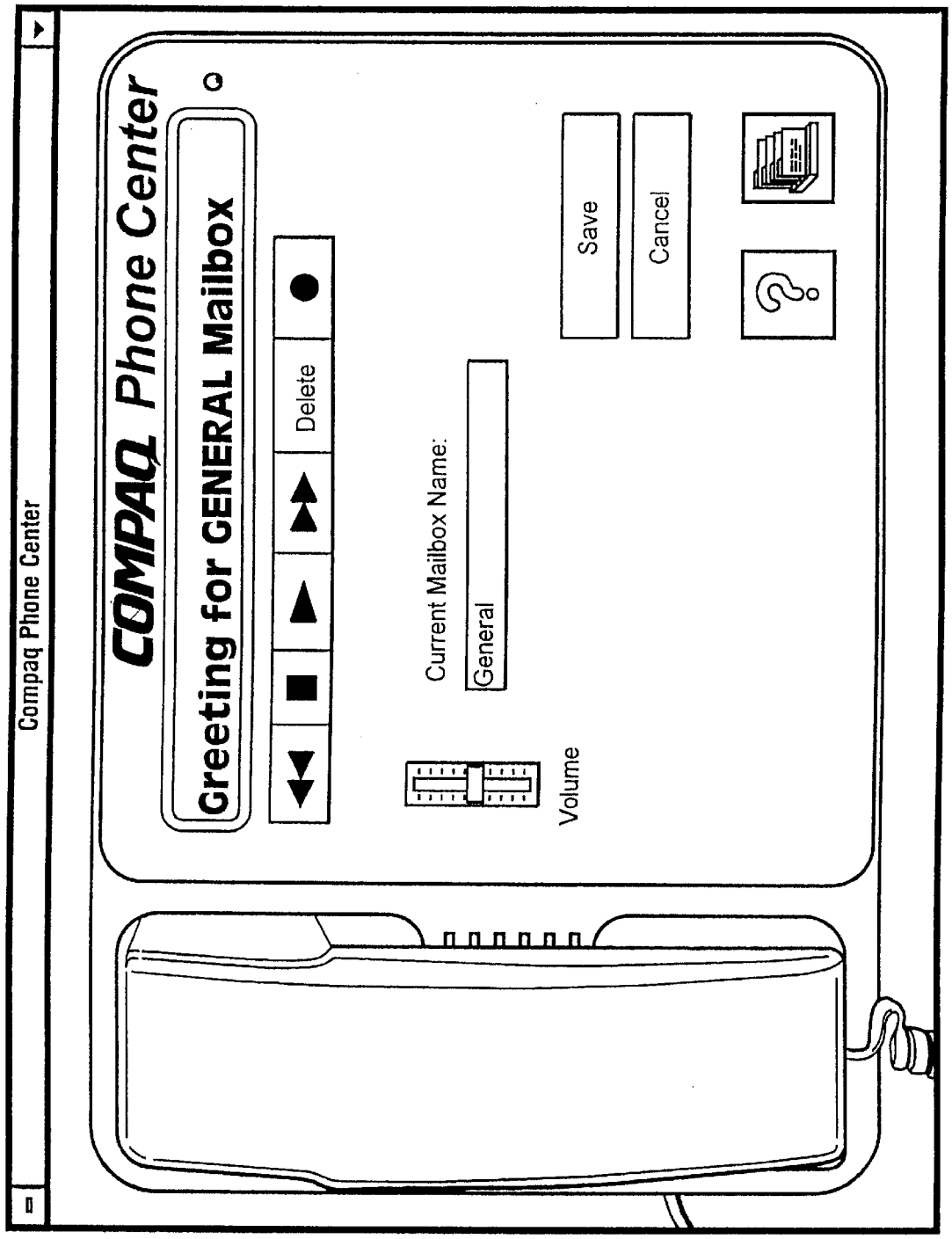
Figures 9L, 9M, 9N:

Pressing the Mailboxes button on the main screen brings you to the Mailbox Maintenance level. Here you can move among the mailboxes, read, move, and delete messages, create greetings, and assign passwords. The graphic looks like FIG. 8A. On entry, the LCD bar is empty and the listbox shows all the defined mailboxes. Note that both the mailbox name and number are shown. The controls like those shown in FIG. 9N are used. As you scroll the listbox, each highlighted mailbox name, in turn, is displayed in the LCD bar and the total number of messages in each box is displayed in the small box on the right. In FIG. 9J, YES in the "Prompts for Password" column means the software prompts for the mailbox password before allowing this function. The password is requested only once. If it fails, the last accessed mailbox remains active. If successful, the new mailbox becomes active and the user is not prompted again until they select another mailbox. As before, to promote security, if the application is idle for 30 seconds, the screen returns to the General mailbox.

Recording a greeting is almost exactly like leaving a memo. The greeting is applied to the selected mailbox. A screen like FIG. 9K is used. Again, the mailbox name is displayed at the top of the dialog box; the same buttons are used, and work exactly as they did for Memos. The Save button saves the current greeting; the Cancel button returns to the previous screen, leaving the existing greeting intact. The Find File button invokes a standard Windows Find File dialog box that they can use to locate a .WAV file to use as the greeting. The selected file is copied into the pseudo-greeting file for this mailbox—do not simply point to the .WAV file.

As before, the waveform drawing at the top would be nice, but is not required. Optionally, an LED bar similar to the VU meter on home cassette recorders might be used. The object is to give the user some entertainment/feedback while the memo is recorded.

Once in a mailbox, you may set or change its password. Clicking the Password invokes a dialog box like FIG. 9L. The user may now type a 4-byte numeric password for the mailbox. Two boxes are provided—type it once, then type the same digits again to verify the original. Standard OK and Cancel buttons are used to exit this dialog box; Cancel means return and do not change the password, and OK means save and apply the password. When they press OK, we must insure that the two editboxes contain the same value. If not, a MessageBox( ) like FIG. 9M is displayed. When they press OK, both editboxes are cleared and the user must type both values again. Note that we said passwords must be exactly four numeric characters. If a non-numeric character is typed or if a password is not exactly four bytes long, the dialog box like FIG. 9N is displayed. When they press OK, both editboxes are cleared and the user must type both values again.

Figure 9O:
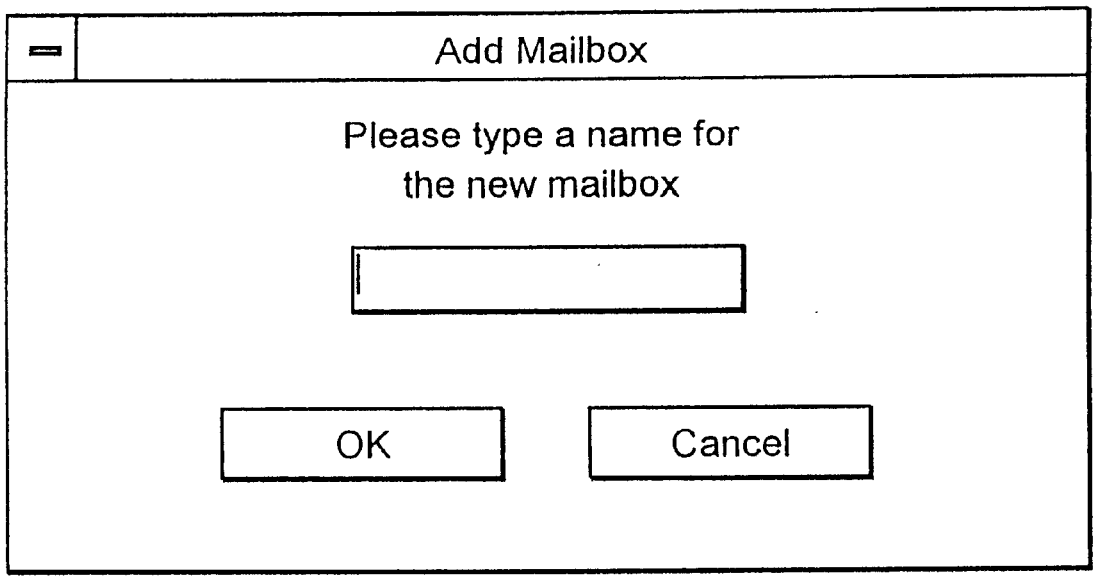

Users can add a new mailbox simply by clicking Add Mailbox. A dialog box like FIG. 9O appears. They simply type the new mailbox name and press OK. The new mailbox is assigned the next available sequential number. No greeting file or password is assigned—the user may perform those actions via the buttons on the Mailbox Maintenance screen. Note that the Add Mailbox button is invisible if all ten mailboxes are defined.

Figure 9P:
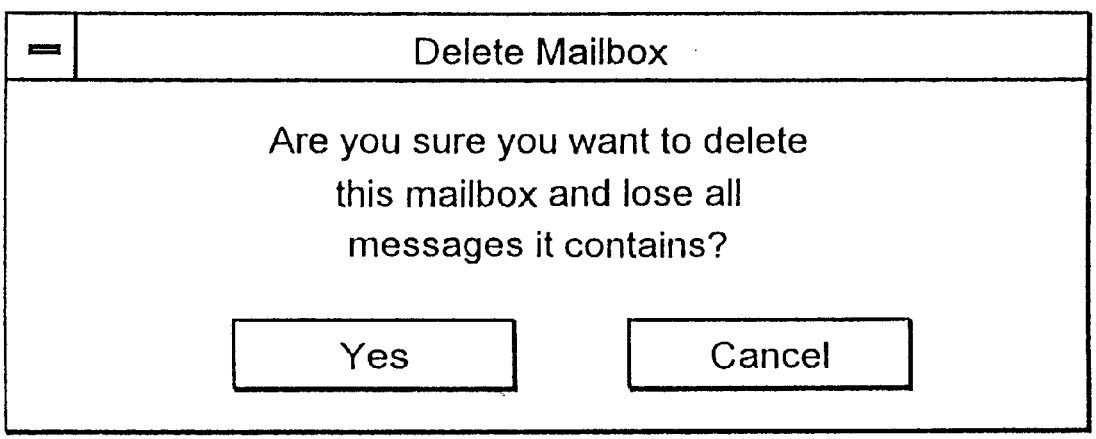

To delete the selected mailbox, simply click Delete Mailbox. A confirmation dialog box like FIG. 9P is displayed. The user may confirm by pressing OK or abort by selecting Cancel. Note: when you delete a mailbox, you also implicitly delete all the messages it contains. Note that this will leave "holes" in the mailbox numbering. If you have boxes 3, 4, and 5 and delete 4, boxes 3 and 5 remain. We must do this in order in insure that the remote DTMF commands still match the instructions in mailbox greetings.

Figure 9R:
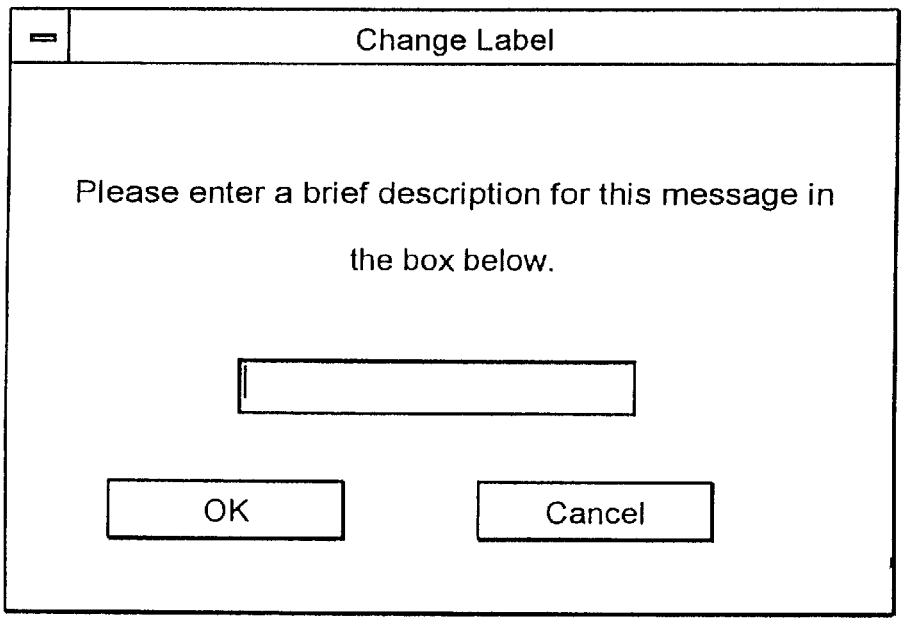

A user can access messages by highlighting a mailbox name (in the mailbox screen) and pressing the Messages button, as shown in FIG. 8B. Initially the LCD bar is blank. Messages are shown in the listbox; the small "letter" icon to the left of some means they are NEW (unlistened). From here, the user can select one or more messages and do what is shown in FIG. 9Q.

Where CallerID is not available, a message description will contain only the timestamp when it was recorded. Memos will simply say "Memo". This button lets the user enter a description for the selected message. A dialog box like FIG. 9R is used for each selected message. The current message description appears at the top of the box followed by instructions to enter a short description. The user may type a new description in the editbox—it is not scrollable. When the user presses OK, the message description is updated as follows:

2/22/94 11:01<USER INPUT>

Note that the timestamp cannot be edited. If the user selects Cancel, the message description is not changed.

Figure 9S:
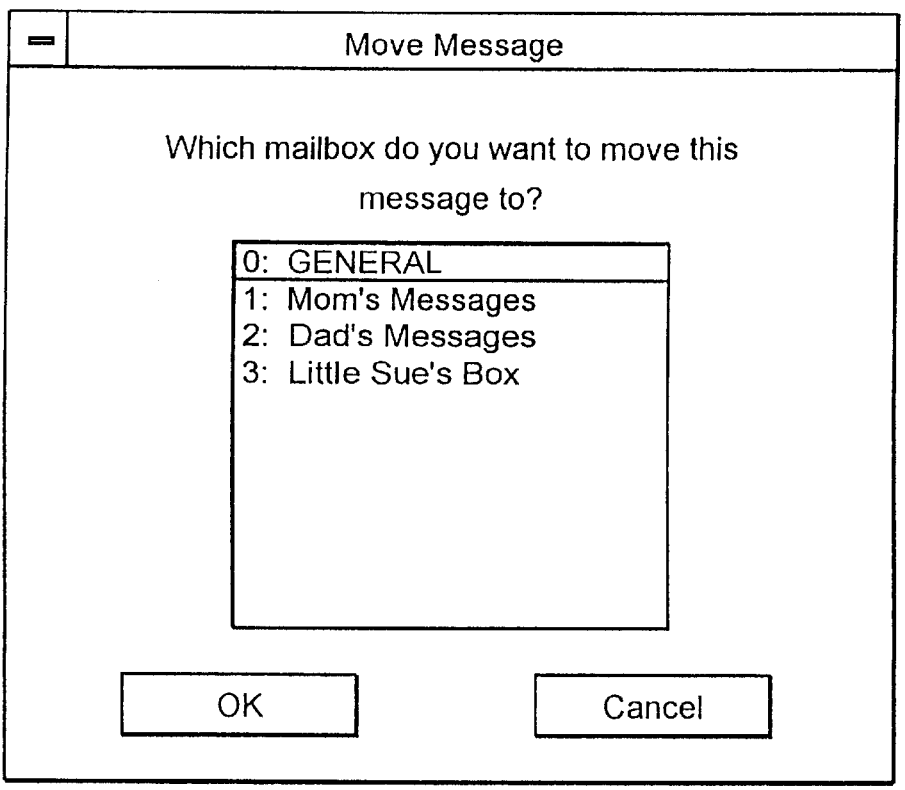

Users can move one or more messages to another mailbox by selecting them and pressing Move. A dialog box like FIG. 9S appears. Mailbox names appear in the scrollable listbox. The user can select a mailbox and press OK or double-click a mailbox to move them. When the operation is complete, they are returned to the Messages screen. Cancel cancels the operation and no files are moved.

Earlier we talked about someone calling in to leave voicemail. We also said that certain DTMF commands (*Onnnn-*9nnnn) let you enter Owner Mode. This mode lets you play back voicemail and do other maintenance chores. The graphic for this function looks just like the one used for voicemail. It shows the main screen with the phone offhook and any available CallerID information shown in the LCD window. Both sides of the conversation (the recordings and the caller's audio) may or may not be heard based on an option set in the Operator. Table 9 describes the TAM's behavior while in Owner Mode:

TABLE 9

| Step | Action | DTMF Command |
|---|---|---|
| 1. | Active mailbox was set by previous DTMF command (see step 20 in previous state table) Play WAV file 9 or 10 as appropriate | |
| 2. | Is disk space within preset thresholds (Operator Option)? YES: Play WAV file 3 or 4 as appropriate | |
| 3. | Honor DTMF command to stop playback. If heard, go to step 5 | # |
| 4. | Play WAV files 11, 12, 14, 15, 16 | |
| 5. | Honor DTMF command to change Owner mailbox. Ignore sequences that timeout. If heard, go to step 17 | *Onnnn - *9nnnn |
| 6. | Honor DTMF command to record a new greeting for active mailbox. If heard, go to step 24 | 2 |
| 7. | Honor DTMF command to pay current greeting for active mailbox. If heard, go to step 24 | 4 |
| 8. | Honor DTMF command to play new messages in active mailbox. If heard, go to step 28 | 6 |
| 9. | After ? seconds of silence, or if caller hangs up, hang up, reset graphics, etc. | |
| 10. | ********* END OF CALL ********* | |
| 11. | | |

TABLE 9-continued

| Step | Action | DTMF Command |
|---|---|---|
| 12. | Honor DTMF command to stop recording. If heard, go to step 14 | # |
| 13. | Play WAV file 5. Begin recording greeting for active mailbox | |
| 14. | When recording complete, close and save file; update pointers, etc. | |
| 15. | Go to step 2 | |
| 16. | | |
| 17. | Valid mailbox requested? | |
| 18. | NO: play WAV file 1 and go to step 3 | |
| 19. | Valid password? | |
| 20. | NO: play WAV file 2 and go to step 3 | |
| 21. | Specified mailbox becomes active | |
| 22. | Go to step 3 | |
| 23. | | |
| 24. | Honor DTMF command to stop playback. If heard, stop playback and go to step 3 | # |
| 25. | Begin playing greeting for active mailbox | |
| 26. | When complete, go to step 3 | |
| 27. | | |
| 28. | Honor DTMF command to stop playback. If heard, go to step 30 | # |
| 29. | Play first new (unlisted) message | |
| 30. | Play WAV files 11, 12, 13, 14, 15, 16, 17 | |
| 31. | Honor DTMF command to delete last message played. If heard, go to step 42 | 3 |
| 32. | Honor DTMF command to play next new message in active mailbox. If heard, go to step 39. Honor DTMF command to play message again. If heard, go to step 45 | 6<br>7 |
| 33. | Honor DTMF command to change Owner mailbox. Ignore sequences that timeout. If heard, go to step 17 | *Onnnn-*9nnnn |
| 34. | Honor DTMF command to record a new greeting for active mailbox. If heard, go to step 12 | 2 |
| 35. | Honor DTMF command to play current greeting for active mailbox. If heard, go to step 24 | 4 |
| 36. | After ? seconds of silence, or if caller hangs up, hang up, reset graphics, etc. | |
| 37. | ********* END OF CALL ********* | |
| 38. | | |
| 39. | Remove NEW status for last message played | |
| 40. | More messages? YES: Go to step 28 NO: Play WAV file 9 and go to step 2 | |
| 41. | | |
| 42. | Delete last message played | |
| 43. | Play WAV file 7 | |
| 44. | Go to step 3 | |
| 45. | Play last message again | |

When in Owner Mode, WAV files are played across the line to help the user navigate and to report system status. The messages shown in Table 10 have been identified In some cases (specifically steps 4 and 30), several WAV files must be played back to back in order to present the entire range of choices.

TABLE 10

| WAV File | Meaning | Sentence |
|---|---|---|
| 1 | User tried to enter an invalid mailbox | "That mailbox number is invalid" |
| 2 | Incorrect password given for mailbox access | "Password incorrect - - access denied" |
| 3 | First disk space threshold has been reached (see Operator Options dialog box description) | "Your hard disk in nearly full" |

TABLE 10-continued

| WAV File | Meaning | Sentence |
|---|---|---|
| 4 | Second disk space threshold has been reached (see Operator Options dialog box description) | "Your hard disk is full. The answering machine cannot take any new messages." |
| 5 | Tells how to begin and stop recording a greeting | "Begin recording your greeting when you hear the tone." |
| 6 | Greeting not found for this mailbox | "This mailbox has no greeting." |
| 7 | Last message has been deleted | "Message deleted." |
| 8 | Simply tells user to leave a message at the tone. Used when there is no microphone attached. | "Please leave a message when you hear the tone." |
| 9 | Tells the owner that there are no messages in the current mailbox. | "There are no new messages." |
| 10 | Tells the owner that there are messages in the current mailbox | "You have new messages." |
| 11 | Prefix to "Press #### to ########" sentences. | "Press" |
| 12 | Press # to record a new greeting | "two to record a new greeting." |
| 13 | Press # to delete the last message | "three to delete this message." |
| 14 | Press # to play greeting | "four to play the greeting." |
| 15 | Press # to play next message | "Six to play the next message." |
| 16 | Press # to change Owner mailbox | "To change mailboxes, press star, then the mailbox number, then the password." |
| 17 | Press # to play the last message again | "seven to play the last message again." |
| 18 | Tells caller they can't leave a message because the disk is full. | "Sorry, the answering machine's tape is full." |

In order for programs to locate ECI applications (tell whether they are running), each application must have a static Windows Class name. In doing so, programs can simply FindWindow( ) to locate a given ECI application. See Table 11. Note that these class names are not translated.

TABLE 11

| ECI Application | Class Name |
|---|---|
| Operator | Compaq Operator |
| TAM | Compaq TAM |
| FAX | Compaq FAX |
| Multimedia Sound System | Compaq Mmediass |
| Card File | Compaq CardFile |

All hardware configuration information, serial port selection, etc., will be recorded in Plug and Play BIOS. Given the hardware dependency of this project, the software will refuse to run unless the conditions of Table 12 are met. These conditions are in addition to any file, DLL, driver, etc. dependencies the software may have. If any test fails, the software will produce an applicable error message in a standard MessageBox( ) and then exit.

TABLE 12

| Condition | Application |
|---|---|
| Running on a Compaq PC | All |
| Windows version 3.1 | All |
| Bombay modem/TAM audio driver present | All |
| ESS Audio Driver/ hardware present | FAX, TAM, Media Rack |
| Speaker(s) present | TAM, Media Rack |

Note that this application is somewhat different in that it contains two tightly-knit applications—a speakerphone and an answering machine. Its functionality must change somewhat, depending on the customer's speaker and microphone arrangement as indicated in Table 13. The ECI Setup utility must prompt the user for their speaker/microphone configuration and set flags to tell the TAM software how to act. When acting as an Answering Machine only, the keypad, Clear, Dial, and Address Book buttons are nonfunctioning. Additionally, when no microphone is installed, the memo and greeting Rec(ord) buttons are nonfunctioning.

TABLE 13

| Speaker/Microphone Configuration | Functionality |
|---|---|
| Speakers and microphone fully integrated in PC (Sun Valley) | Full functionality |
| Speakers and microphone integrated in Compaq monitor (future) | Full functionality |
| External microphone and speakers | Answering Machine only. NO SPEAKERPHONE. Can record greetings and memos via external microphone. |
| External speakers, no microphone | Answering Machine only. NO SPEAKERPHONE. Cannot record greetings (must used canned ones) or record memos. |
| No speakers | Application refuses to run |

In order to coordinate access to the ESS audio hardware, all applications must use a similar method for controlling their audio settings. We have tentatively chose Microsoft's MSMIXMGR.DLL from Windows Sound System 2.0.

In order to conserve disk space, the TAM should have the capability of compressing messages (those left by callers) before they are made accessible to the user. The most likely choice of compression algorithm will be Microsoft TrueSpeech, from the Microsoft Windows Sound System 2.0 SDK. In preparation for this feature, we offer the following architectural suggestion:

1. Save messages, uncompressed, into a temporary holding area—essentially a directory beneath the TAM directory.
2. Create a process that periodically checks the directory for files. When an uncompressed file is found, it compresses it, copies it to the "real" mailbox directory, and then deletes the original. The user can access the file only when it appears in the mailbox directory.
3. When a caller leaves a message, send a (Windows) message to the process to alert it to the file's presence. This will let it work on demand, while the timed polling is used for cleaning up files left over from reboot.

Compression can be turned on and off via the Operator's Answering Machine Options screen. Note that the setting affects recording only—playback must work on either compressed or uncompressed files regardless of the switch setting.

The ECI FAX machine is adapted from Eclipse FAX SE. Based on talks with Phoenix, Future Soft, and Compaq Product Marketing, we found that SE contains nearly all of the functionality we want in a FAX application. The goal of this project is to port much of SE to a GUI that meets our ECI requirements, yet maintains much of the existing product's functionality.

The software supports most of the basic features that SE provides:

FAXes organized into two "folders" or tabs.

Integrated text editor.

Optional user-defined editor.

Ability to annotate and forward a FAX.

Add clipart, letterhead, signatures, logos, etc. via drag and drop.

Schedule for immediate or deferred delivery.

Send to individual or group.

Create and maintain groups of frequently used FAX numbers.

Maintain a log of all sent and received FAXes.

When invoked, the screen looks like FIG. 9A. The application is displayed in a traditional Windows dialog box and supports the controls listed in Table 14.

TABLE 14

| Control | Yes | No |
|---|---|---|
| Restore | ✓ | |
| Move | ✓ | |
| Size | | ✓ |
| Minimize | ✓ | |
| Maximize | | ✓ |
| Close | ✓ | |
| Switch to | | ✓ |

The main screen shows two tabs, IN Box and OUT Box, which alternate between sent FAXes, respectively. Member FAXes are shown in the listbox; their description includes their current status, the time and date they were last handled, and the originator/recipient's name (if known). FAX status is reported using the words shown in Table 15. The controls shown in Table 16 are used.

TABLE 15

| Status | Meaning | Goes In |
|---|---|---|
| Received | FAX was received completely - - no errors | IN Box |
| Incomplete | FAX was partially received - - last page incomplete or pages missing | IN Box |
| Sent | FAX was successfully sent | OUT Box |
| Pending | FAX is waiting to be sent | OUT Box |
| Aborted | FAX could not be sent - - no answer, hardware failure, etc. | OUT Box |

TABLE 16

| Control | Type | Action |
|---|---|---|
| IN Box | TAB (button) | Causes incoming FAXes to be shown in the listbox |
| OUT Box | TAB (button) | Causes outgoing FAXes to be shown in the listbox |

TABLE 16-continued

| Control | Type | Action |
|---|---|---|
| Listbox | Listbox | (1) Lists received and incomplete FAXes when the IN Box tab is selected<br>(2) Lists sent, pending, and aborted FAXes when the OUT Box tab is selected |
| Address Book | Icon | Inactive (may be removed) |
| Close | Button | Closes the FAX application |
| Create FAX | Button | Lets you create a new FAX. Always available |
| Delete | Button | Deletes the selected FAX. Grayed out until a FAX is selected. |
| Details | Button | Displays information about the selected FAX. Grayed out until a FAX is selected. |
| Forward | Button | Lets you annotate and forward the selected FAX. Grayed out until a FAX is selected. |
| Help | Icon | Displays program help (TBD) |
| Options | Button | Invokes the Operator Options dialog box |
| Print FAX | Button | Prints the selected FAXes. Grayed out until a FAX is selected. |
| Print Log | Button | Prints log entries for all faxes in the active tab (inbox / outbox) |
| View | Button | Lets you view the selected FAX and change its description. Grayed out until a FAX is selected. |

The Print Log command prints the log entry for the selected FAX(s). The output may contain one or more of the following fields:

Status—Received. Incomplete. Sent. Pending. Aborted.

FAX Number—Lists the recipient or sender's FAX number.

Pages—Number of pages.

Duration—Time required to send/receive this FAX.

Description—User-supplied text. Set via Change Label button.

Filename—The TIF file's complete path and name.

The Print Log dialog box lets the user choose which fields they want to see. Initially, all boxes are checked—you get everything. Just uncheck the things you don't want and press OK to start printing. Settings are saved from one invocation to the next and, on subsequent invocations, are reset according to preference.

Figure 14A:
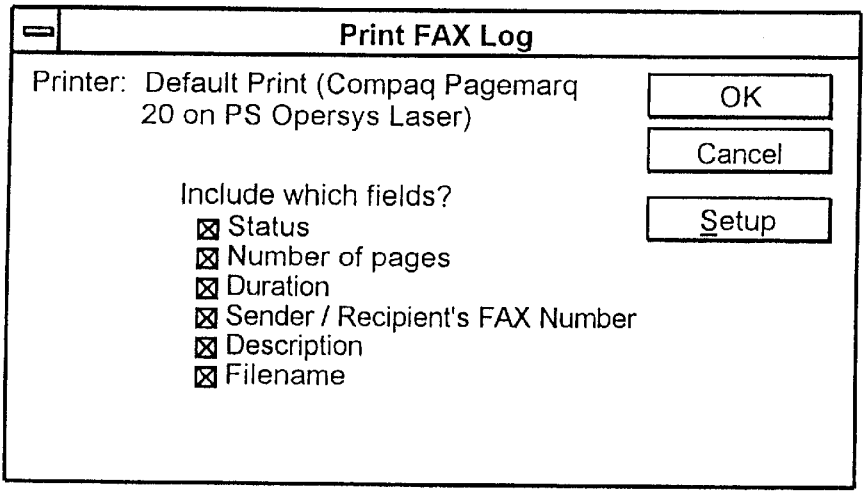
FIGS. 14A–14O are screen shots of a fax machine/fax mailbox application.
Figure 14B:
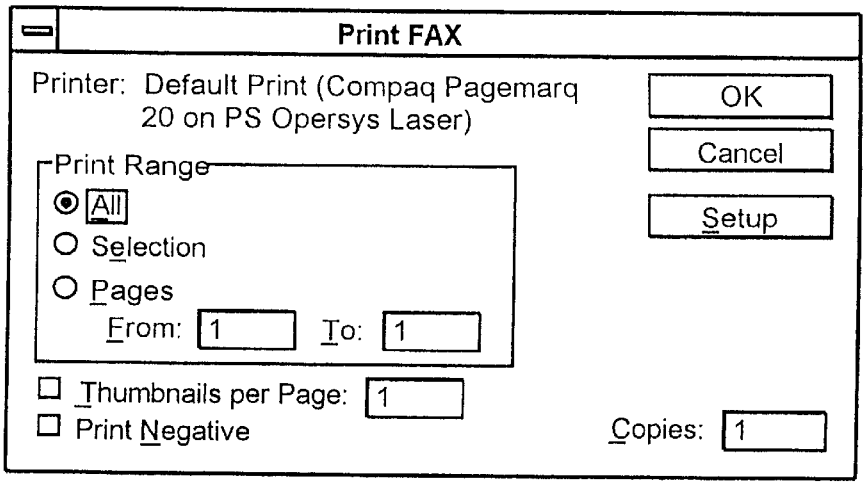

The Print FAX command (see FIG. 14A) prints the selected FAX(s) on the current printer. It lets you choose the whole document or selected pages, and also provides full-page or thumbnail output (FIG. 14B).

Figure 14C:
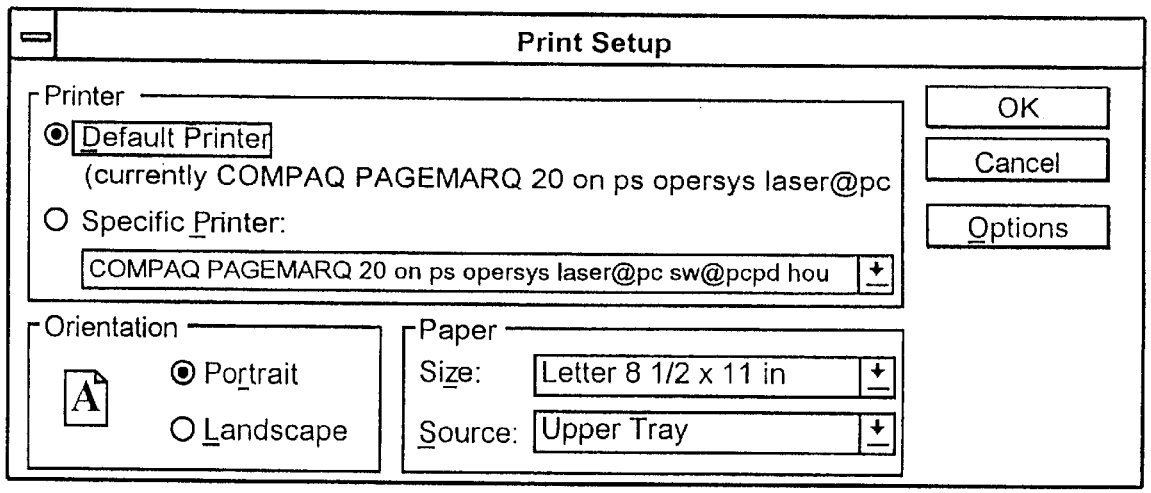

Printer Setup is accessible from both the Print Log and Print FAX dialog boxes. It launches a dialog box like FIG. 14C that lets the user choose a printer for subsequent printing. It contains the usual printer setup and options screens (as in Control Panel).

The Details command invokes a dialog box like FIG. 14D containing information about the selected FAX, whose controls/fields are shown in Table 17.

TABLE 17

| Control | Type | Purpose |
|---|---|---|
| FAX | Text - not editable | Causes incoming FAXes to be shown in the listbox |
| Type | Text - not editable | Displays the compression model used to store the file |

TABLE 17-continued

| Control | Type | Purpose |
|---|---|---|
| File: | Text - not editable | Displays the TIFF file's complete path and name |
| File Specs: | Text - not editable | Displays the file's properties (resolution) |
| Status: | Text - not editable | Received. Incomplete. Sent. Pending. Aborted |
| Pages: | Text - not editable | Number of pages |
| Duration: | Text - not editable | Time required to send/receive this FAX |
| Description: | Editbox | By default, contains CallerID (received FAXes) or recipient's name (sent FAXes). User can change the description. |
| Save | Button | Button is active if the user changes the FAX description. When selected, saves the new description and returns to the previous screen. |
| Cancel | Button | Discards any changes made to the description and returns to the previous screen. |
| Help | Iconic Button | Displays online help |

The Delete command lets you delete the selected FAX. The FAX name (label) is shown at the top of the dialog box (FIG. 14E). Two mutually exclusive radio buttons lets them delete both the FAX and the log entry or the FAX (TIFF file) only. By default, both will be deleted.

Figure 14F:
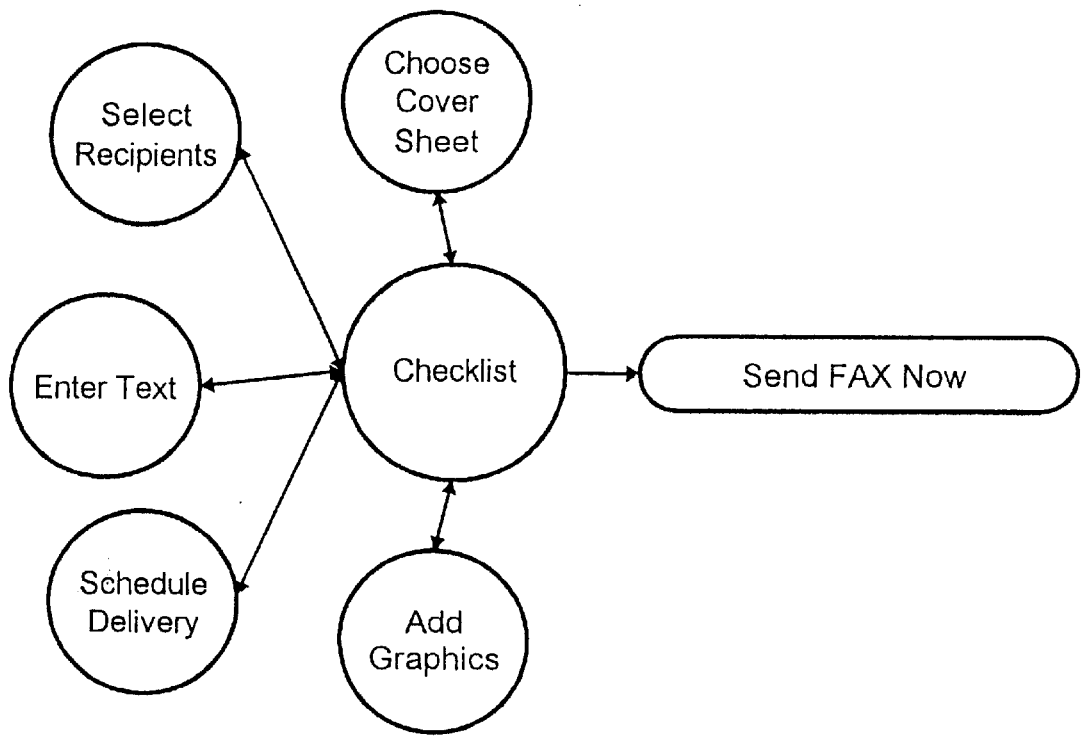

The whole process of creating a FAX is somewhat unnerving to novice users. Traditional FAX software gives you no clue as to what steps are required, the order, or exactly when you are in the process. ECI addresses this problem by presenting a Checklist when you start to Create a FAX. The checklist details the required steps and, as its name suggests, uses a checkmark for each completed step. The screen looks like FIG. 9B. Buttons are used to invoke each step. Send is grayed out until all required steps have been completed. Note that some steps say "Optional". In fact, the only required steps are Enter Text and Choose Recipients. To "work on" a step, the user simply clicks the associated button. Upon return, a checkmark appears in the box to let the user know they have completed that step. Users may perform each step an arbitrary number of times while preparing a FAX. In other words, they may choose recipients, go edit the text, choose more recipients, add more text, etc. until ready to send. Data is maintained between steps, but not between FAXes. Note that the Address Book icon is visible but inactive on this screen (FIG. 9B). This checklist screen becomes a hub that ties all the FAX-creation steps together as shown in FIG. 14F. Although the steps are presented in a sensible, preferred order, the user should be able to do any step, in any order, as many times as they like. Subsequent steps must adjust to account for the data (or lack of) provided by previous steps. For example, if they go first into Page Layout, only a blank page will show. If they choose a coversheet and then Page Layout, the rasterized coversheet will show. The following paragraphs document the behavior of each step.

Figure 14K:
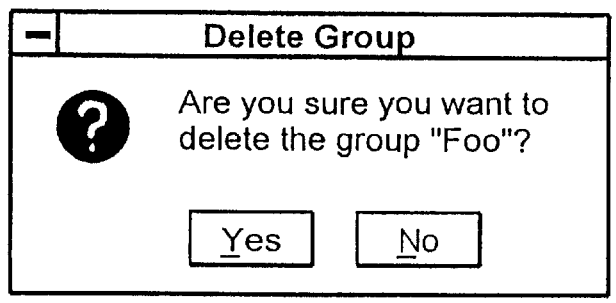
Figure 14G:
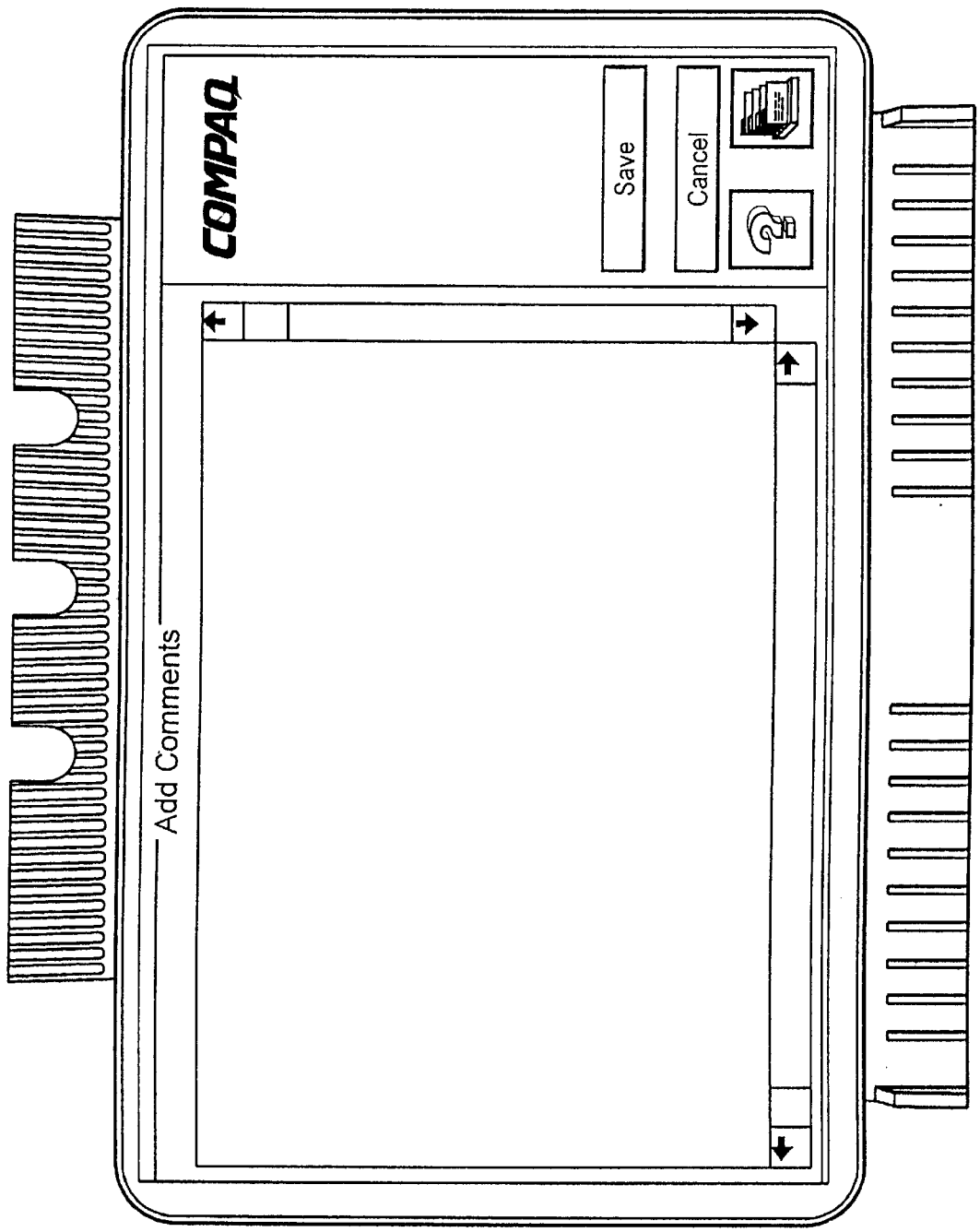

One of the prompts in the Operator application's FAX Options screen lets you choose between the "built-in" editor and one of your own. When this button is clicked, the user's editor-of-choice is launched. By default, the built-in one, shown in FIG. 14G, is used. It is a simple editbox control that supports text only. By its nature, it supports Clipboard cut and paste via traditional Windows keychords. On the first invocation, the editbox is blank. Subsequent invocations show the last text block the user saved. Press Save to save changes and return to the checklist screen, or Cancel to disregard changes and return. Note that when the user clicks Save, the editbox content is transparently printed on the proverbial Fax Printer Driver. If the user's own editor was launched, they have the burden of manually selecting the FAX driver and printing the document—just like in the "olden days". When an external editor is used, the application remains on the Checklist screen. Again, the Address Book icon is inactive on this screen.

Figure 14H:
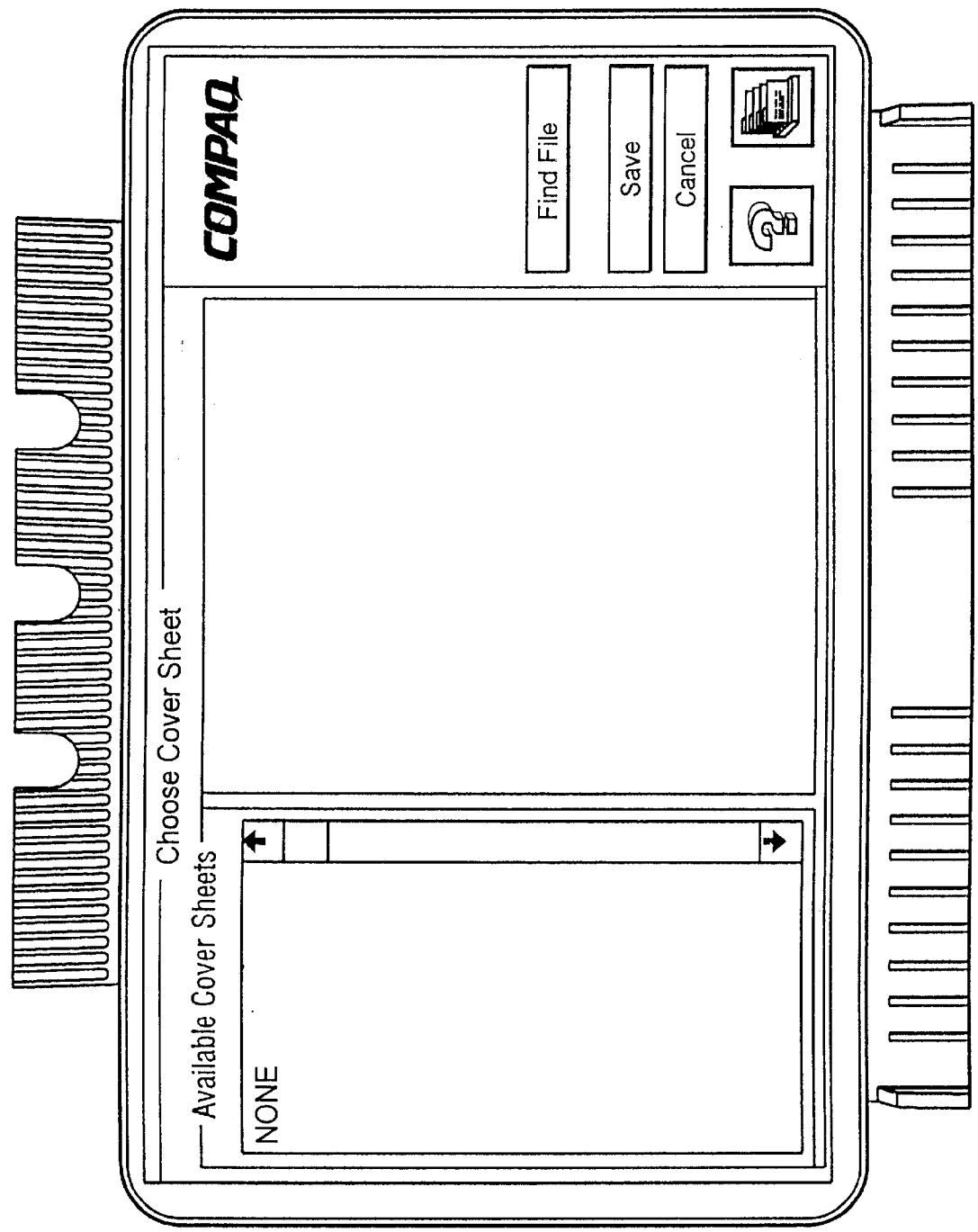

The Choose Cover Sheet button lets you choose a FAX coversheet from your "collection". As we can do elsewhere in ECI, we need to create and maintain a directory (collection) of coversheets from which the user can choose. Our goal is to provide at least two or three samples per language. Coversheets may be standard Windows, BMP files or TIF files. The screen looks like FIG. 14H and has a listbox that contains all the coversheets in the collection. As you scroll about the list, each coversheet is opened and displayed in the large box on the right. This lets the user see what each one looks like before choosing one. On first invocation, "NONE" is selected. On subsequent invocations, the user's current choice is selected and the file (if any) is displayed. Again, press Save to return to the Checklist screen or Cancel to retain the previous cover sheet. Not that a Find File button is also available. It invokes a standard Windows Find File common dialog box that lets you hunt for a file. Once found, the file is added to the collection and is, thereby, available in subsequent sessions.

Figure 14I:
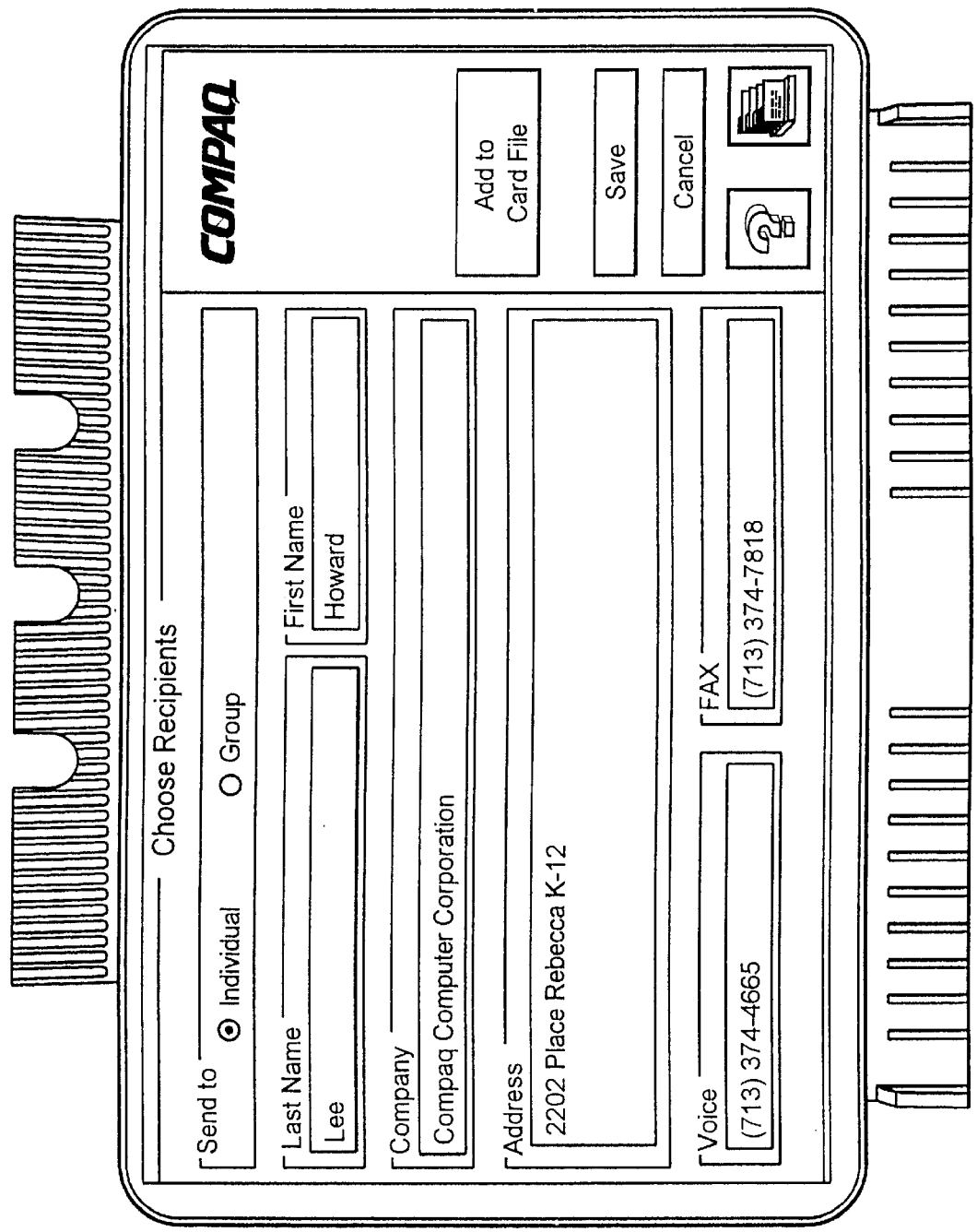
Figure 14J:
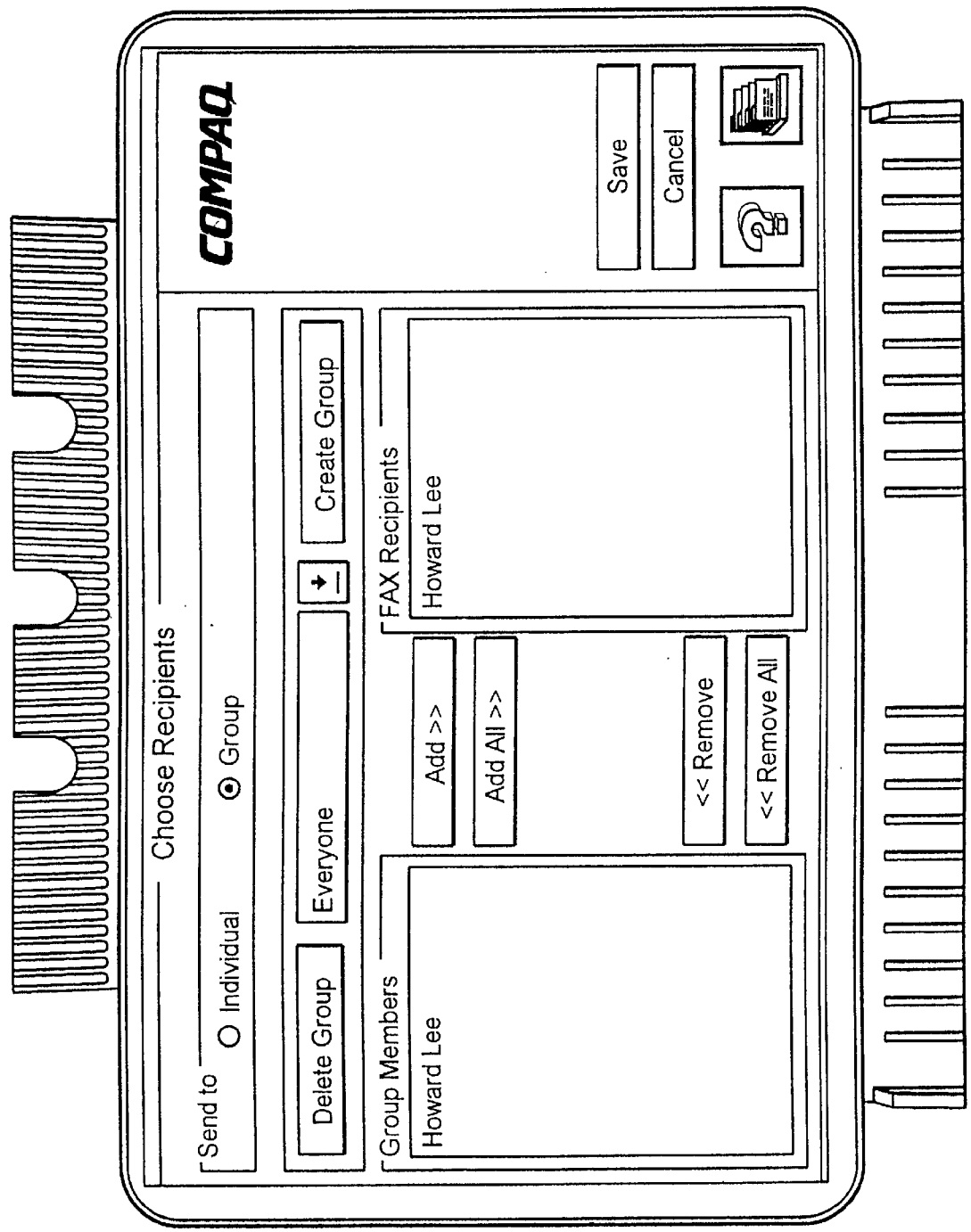

The Select Recipients screen lets you build the FAX's address list. Two modes are supported: individual and group FAX. Individual, of course, simply means one FAX—the recipient. Group FAX lets you queue a FAX to multiple addresses. The screens look like FIGS. 14I and 14J. The GUI alternates between these two screens based on the stat of the Individual and Group radio buttons. By default, Individual is always selected. Note that data should be retained between modes. In other words, click Individual, add data, click Group, click Individual again and the data you typed is still there. Table 18 shows the controls available.

TABLE 18

| Control | Type | Action |
|---|---|---|
| Individual | Radio Button | Inactive while in Individual Mode. In Group Mode, switches screens back to Individual Mode. |
| Group | Radio Button | Inactive while in Group Mode. In Individual Mode, switches screens back to Group Mode. |
| Cancel | Button | Returns to the Checklist screen with no changes. |
| Save | Button | Saves addressee data and returns to the Checklist screen. |
| Address Book | Button | Invokes the ECI Address Book. |
| Help | Button | Displays online help. |
| | | Individual Mode |
| Add to Address Book | Button | Adds the data currently in the fields to the ECI Address Book. Record is added in the alpha tab corresponding to the first character of the last name. Therefore, the button is grayed out until the last name field is provided. Blank fields are not updated. |
| Last Name | Editbox | See * below |
| First Name | Editbox | See * below |
| Company | Editbox | See * below |
| Address | Editbox | See * below |
| Voice | Editbox | See * below |
| FAX | Editbox | See * below |
| | | Group Mode |

TABLE 18-continued

| Control | Type | Action |
| --- | --- | --- |
| Delete Group | Button | Deletes the group named in the Group Listbox. |
| Create Group | Button | Creates the group named in the Group Listbox. |
| Group Listbox | ComboBox | (1) Lists the defined group names, (2) lets the user enter a new group name. |
| Group Members | Listbox | Lists the members of the group named in the Group Listbox. |
| FAX Recipients | Listbox | Lists the names of people who will receive a copy of this FAX. |
| Add | Button | Adds the selected name from the Group Members listbox to the FAX Recipients listbox. |
| Add All | Button | Adds all names from the Group Members listbox to the FAX Recipients listbox. |
| Remove | Button | Removes the selected name from the FAX Recipients listbox. |
| Remove All | Button | Removes all names from the FAX Recipients listbox. |

*The properties of all fields in the Individual recipient record match the corresponding fields in the ECI Address Book application.

In Individual Mode, only the FAX number field is required. Other fields are optional but mirror those used in the ECI Address Book. The user can click the Address Book icon (to invoke the ECI Address Book) and select a name. Upon return, all available data is inserted into the appropriate edit fields.

Group Addressing is very flexible:

The Group Name combobox lists all the user-defined groups plus a default one called Everyone (discussed later).

The Group Members listbox contains the names of all members in the selected group.

The FAX Recipients listbox will list the names of everyone who is to receive a copy of this FAX.

The object of the game is to choose names from the Group Members box and copy them to the FAX Recipients box. You do it by highlighting Group Member names and pressing Add to add them to the recipient list. Similarly, you can highlight a name in the recipient list and press Remove to remove it. The Add All button adds all names in the members list to the recipients list. Conversely, the Remove All button removes all names from the recipient list— effectively emptying it. The user can add names from one group, select another group and add more names, etc. until the recipient list is complete. A byproduct of this process can easily be a new group (subsets or supersets of other groups). To save a group, just type the new name in the Group Name combobox and press Save Group. Similarly, you can press Delete Group to delete the selected group. It responds with a typical Windows MessageBox( ), like FIG. 14K, asking confirmation.

Now, let's take a small step backward. Upon entry, a group called Everyone is displayed. This group is always available and references all entries in the ECI Address Book that have FAX numbers. Besides that, it serves as a launching pad for creating new groups. While the Everyone group is selected, the Save Group and Delete Group buttons are grayed out (e.g., you cannot delete the Everyone group). When you are finished creating the recipient list, just press Save Changes to go back to the Checklist screen.

Figure 14L:
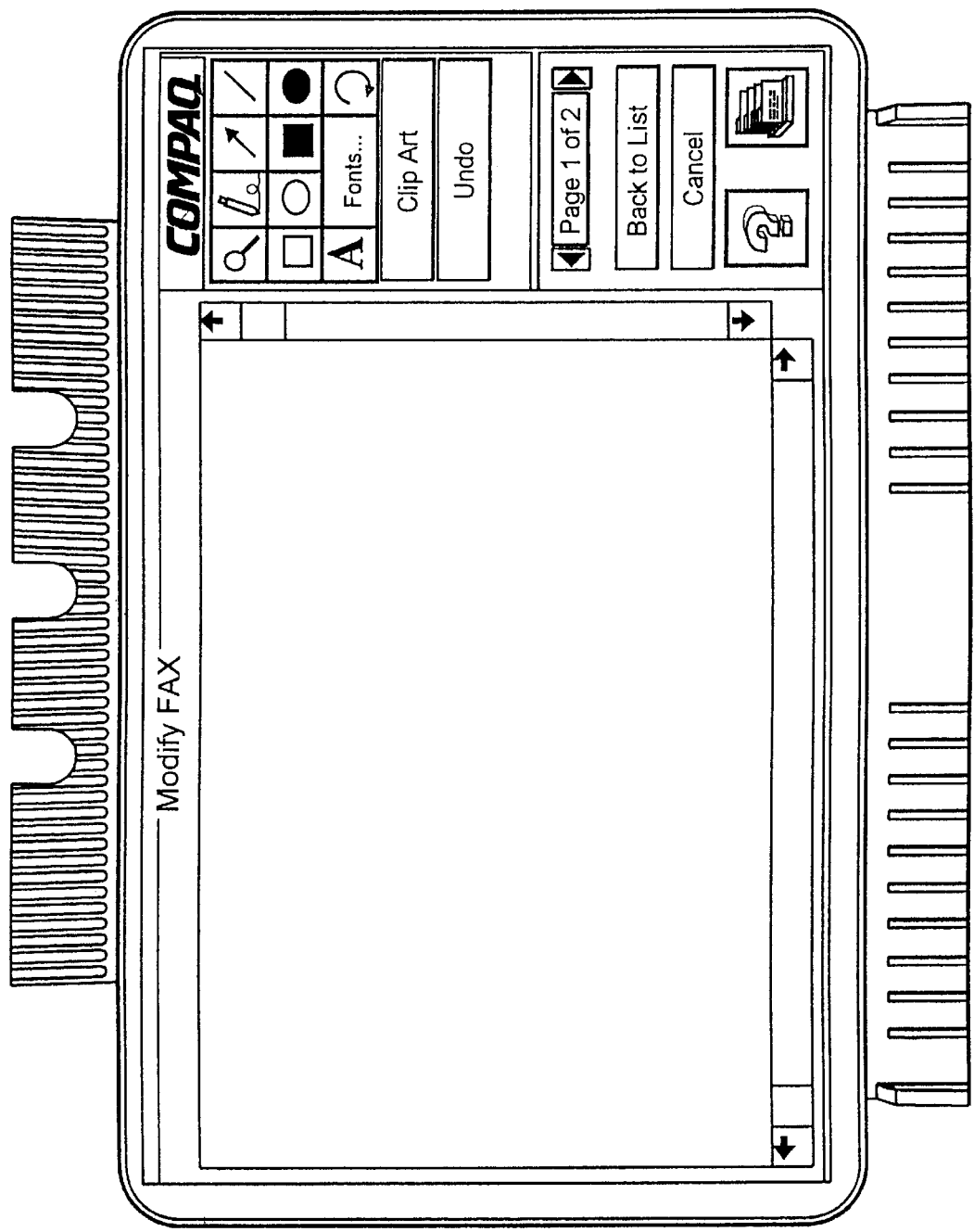

The Add Graphics screen lets the user see FAX pages as they will be transmitted (FIG. 14L). On entry, all available text, clipart, etc. is rasterized and placed on the pages in rubber band boxes. Boxes can be sized and moved (drag-n-drop) to new locations. Controls for the screen of FIG. 14L are shown in Table 19. Tool controls for FIG. 14L are shown in Table 20.

TABLE 19

| Control | Type | Action |
| --- | --- | --- |
| Left Arrow | Button | Displays the previous page. Inactive when page 1 is shown for a 1-page FAXes. |
| Right Arrow | Button | Displays the last page. Inactive when the last page is shown and for 1-page FAXes. |
| Help | Button Icon | Displays online help (TBD) |
| Address Book | Button Icon | Inactive |
| Clip Art | Button | Lets the user choose clip art (see discussion below). |
| Checklist | Button | Saves changes and returns to the Checklist screen. |
| Cancel | Button | Discards changes and returns to the Checklist screen. |

TABLE 20

| Control | Action |
| --- | --- |
| Magnifying Glass | Click On/Off. Zooms in on the selected item. Other buttons are inactive until the button is clicked again (screen is normalized). |
| Stylus | Begins drawing on the page. Position mouse cursor, hold left button down to draw - - just like MS Paint. |
| Arrow | Draws a line with an arrowhead. Position mouse, press and hold mouse button, snap line where button is released. Arrowhead goes on the first click location. |
| Line | Draws a line. Position mouse, press and hold mouse button, snap box line where button is released. |
| Box | Draws a box frame. Position mouse, press and hold mouse button, snap box line where button is released. |
| Circle | Draws a circle frame. Position mouse, press and hold mouse button, snap circle line where button is released as diameter. |
| Filled Box | Draws a black-filled box. Position mouse, press and hold mouse button, snap box line where button is released. |
| Filled Circle | Draws a black-filled circle. Position mouse, press and hold mouse button, snap circle using line where button is released as diameter. |
| A(lpha) | Click on/off. Lets you type alphanumeric characters over the page. Position the mouse and click the left mouse button . . I-beam cursor appears. Draw all alphanumeric characters typed until the button is clicked again or another button is clicked. |
| Rotate | Rotates the image 90 degrees right. |
| Fonts | Displays a standard Windows Font common dialog box. This font is applied to any text the user enters using the A(lpha) command. |
| Undo | Undoes the last action. |

Figure 14M:
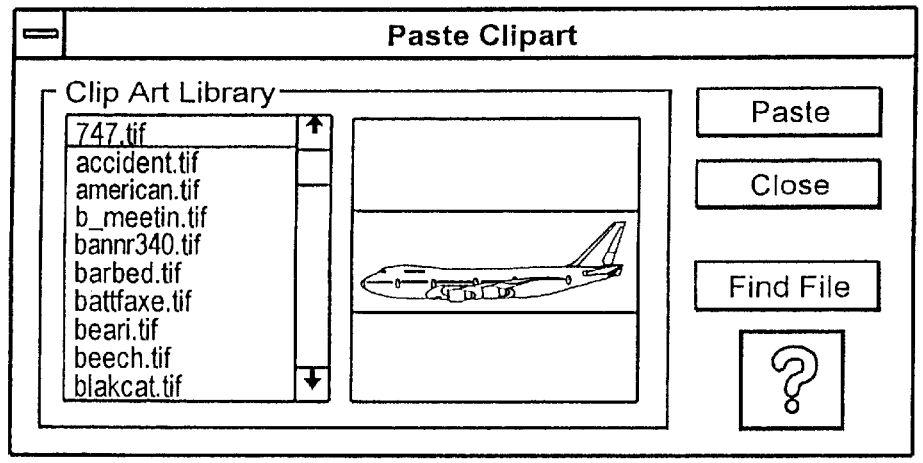
Figure 14N:
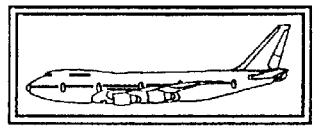

The Clip Art button lets the user select clip art to appear in the current FAX page. It launches the dialog box like FIG. 14M. The Clip Art Library is a collection of TIF or BMP clipart files. It's where we will provide sample coversheets, cool pictures, logos, etc. The user can scroll about the listbox—each highlighted file is displayed (thumbnail) in the box on the right to let the user sample each one. Both BMP and TIF file formats should be supported. This provides a variety of ways for users to create and edit their files. To use a file, just click Paste. To return without selecting a file, click Close. To add a file to the collection, press Find File to launch a standard Windows Find File common dialog box. If a file is selected, it is added to the "collection", the listbox is updated, and it is selected and displayed. When Paste is selected, the selected file is superimposed on the active FAX page, center screen, in a rubber band box like FIG. 14N. The user can drag-n-drop the box to move the object, or they can resize it by dragging the size boxes. Note that "center screen" assumes the object is applied to a standard 8½×11 page. The file itself could consume the entire page—for example, a form letter or company stationery. Oversize images should be shrunk, proportionally, to fit on the page.

Figure 14O:
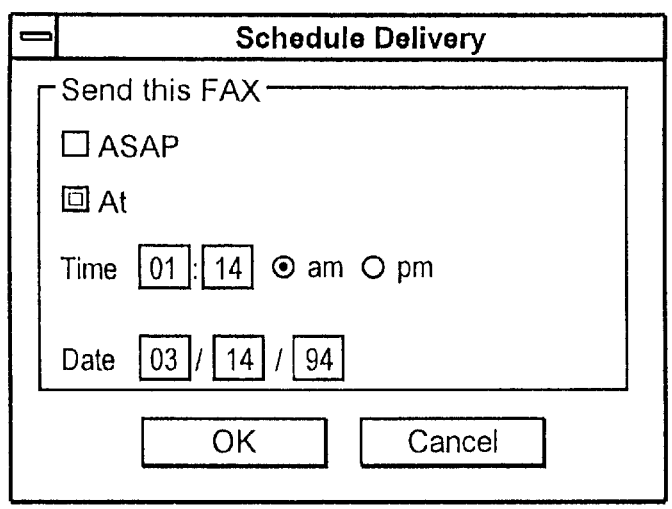

A Schedule Delivery screen like FIG. 14O lets you choose when the FAX is to be sent—ASAP (now) or at a specified time and date. While the other screens overlay the main graphic, this screen is a simple pop-up dialog box since it is so small. The only consideration for this screen is time/date presentation. The format must follow the user's choice in Control Panel—12/24 hour clock, date format, separator characters (:and/), and am/pm labels.

The Send command is available from the main screen (while Inbox and OUTbox contents are showing) and is used to forward a FAX to another individual/group. This command works exactly like Create FAX, with the following exceptions:

The Enter Text choice is removed, or possible Checked and inactive.

The complete FAX includes the original coversheet.

User can go into Add Graphics and use the toolbar to annotate the FAX.

Select Recipients and Schedule work as before.

When you select a FAX and press Forward (on the main screen), you essentially perform the same steps as creating a new FAX, except the rasterized image of the original FAX is appended to the new one. A slightly modified Checklist screen (like FIG. 9C) is used for forwarding a FAX.

The View command is available from the main screen (while the Inbox and OUTbox contents are showing) and is used to view a FAX. The screen looks like FIG. 9D. This is the same basic screen as create FAX's Add Graphics page viewer with the edit controls removed. Controls for FIG. 9D are shown in Table 21.

TABLE 21

| Control | Type | Action |
|---|---|---|
| Left Arrow | Button | Displays the previous page. Inactive when page 1 is shown and for 1-page FAXes. |
| Right Arrow | Button | Displays the next page. Inactive when the last page is shown and for 1-page FAXes. |
| Help | Button Icon | Displays online help (TBD) |
| Address Book | Button Icon | Inactive |
| Tools | Button | Launches the viewer toolbar (see below) |
| Magnifying Glass | Button | Click On/Off. Zooms in on the selected item. Other buttons are inactive until the button is clicked again (screen is normalized). |
| Rotate | Button | Rotates the image 90 degrees right. |
| Close | Button | Returns to the main screen |

We will not discuss the FAX Engine's behavior in this specification since the Eclipse engine is complete and essentially behaves as intended. We anticipate that the engine will show its own dialog box containing relevant progress messages as FAXes are received and sent. Note, however, that the FAX engine must support sending FAXes both from the ECI GUI and from the traditional way of printing to the FAX driver. When someone prints to the FAX driver from outside the ECI GUI, the checklist should appear with the "Edit Text" button checked. The user can complete the other steps via the checklist.

In order for programs to locate ECI applications (tell whether they are running), each application must have a static Windows Class name. In doing so, programs can simply use FindWindow( ) to locate a given ECI application. See Table 22. Note that these class names are NOT translated.

TABLE 22

| ECI Application | Class Name |
|---|---|
| Operator | Compaq Operator |
| TAM | Compaq TAM |
| FAX | Compaq FAX |
| Multimedia Sound System | Compaq Mmediass |
| ECI Address Book | Compaq Address Book |

All hardware configuration information, serial port selection, etc. will be recorded in Plug and Play BIOS. Given the hardware dependency of this project, the software will refuse to run unless the conditions of Table 23 are met. These conditions are in addition to any file, DLL, driver, etc. dependencies the software may have. If any test fails, the software will produce an applicable error message in a standard MessageBox( ) and then exit.

TABLE 23

| Condition | Application |
|---|---|
| Running on a Compaq PC | All |
| Windows version 3.1 | All |
| Bombay modem/TAM audio driver present | FAX.TAM |
| ESS Audio Driver/hardware present | TAM. Media Rack |
| Speaker(s) present | TAM. Media Rack |

In order to coordinate access to the ESS audio hardware, all applications must use a similar method for controlling their audio settings. We have tentatively chosen Microsoft's MSMIXMGR.DLL from Windows Sound System 2.0

FIG. 15A describes the operation of each of the controls on the MiniPilot remote control. FIG. 15B describes the operation of each of the controls on the TV remote control.

We claim:

1. An interactive graphical interface which associates a computer resource with a corresponding office device, the computer resource comprising a plurality of functional components and enabling the computer to function like the office device, the graphical interface comprising:

a surrealistic image of the office device, the surrealistic image having a plurality of physical features resembling corresponding features of the office device, each physical feature representing a functional component of the computer resource, and a routine which enables the user to individually select the physical features of the image, permits execution of a computer application for each of the user selected physical features of the image, and animates the image in response to the user selection, each computer application requesting the functional component of the computer resource corresponding to the selected feature, the animation occurring in a manner which simulates the expected response of the office device if the corresponding feature of the office device had been selected, the routine arbitrating requests from the computer applications for the use of the functional component of the computer resource based on availability of the functional component.

2. A graphical computer interface for enabling a user to control a computer hardware resource, comprising a displayed surrealistic image representing a consumer device and having visual features which are individually selectable by the user and which correspond to functional features of the computer hardware resource, and a process which enables the user to select one of the visual features of the image, permits execution of a computer application for each of the user selected visual features of the image, changes the displayed surrealistic image, and each computer application, in response to the user selecting a visual feature requests a corresponding functional feature of the computer hardware resource to be invoked so as to operate in a manner that simulates the operation of the real consumer device, the process arbitrating requests from the computer applications for the use of the functional feature of the computer hardware resource based on availability of the functional feature.

3. The graphical computer interface of claim 2 wherein change in the displayed surrealistic image is effected through animated motion resembling motion made by the real consumer device.

4. The graphical computer interface of claim 2 wherein the computer hardware resource comprises a modem and the displayed surrealistic image comprises an image of one of the following: a telephone, an answering machine, a telephone/answering machine, a speakerphone, or a facsimile machine.

5. The graphical computer interface of claim 2 wherein the appearance of the displayed surrealistic image resembles the appearance of the real consumer device and each of the visual features of the surrealistic image is related to a corresponding functional feature of the computer hardware resource.

6. The graphical computer interface of claim 5 wherein the displayed surrealistic image comprises the image of a telephone and one of the visual features comprises an image of a handset in a cradle, and wherein dialing a telephone number causes the image of the handset to move away from the cradle.

* * * * *